US008177626B2

(12) United States Patent
Okada et al.

(10) Patent No.: US 8,177,626 B2
(45) **Date of Patent: *May 15, 2012**

(54) GAMING MACHINE

(75) Inventors: Kazuo Okada, Tokyo (JP); Masatsugu Kobayashi, Tokyo (JP); Toshiya Ogawa, Tokyo (JP); Mayumi Takeda, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 93 days.

This patent is subject to a terminal disclaimer.

(21) Appl. No.: 12/631,620

(22) Filed: Dec. 4, 2009

(65) Prior Publication Data

US 2010/0081495 A1 Apr. 1, 2010

Related U.S. Application Data

(63) Continuation of application No. 11/235,245, filed on Sep. 27, 2005, now Pat. No. 7,651,393.

(30) Foreign Application Priority Data

Sep. 28, 2004 (JP) ................................ 2004-281486
Sep. 28, 2004 (JP) ................................ 2004-281487
Sep. 29, 2004 (JP) ................................ 2004-284808

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................... 463/20; 463/25; 463/27

(58) Field of Classification Search .................... 463/20, 463/25, 27
See application file for complete search history.

(56) References Cited

U.S. PATENT DOCUMENTS

| | | | | |
|---|---|---|---|---|
| 5,927,714 | A * | 7/1999 | Kaplan | 273/143 R |
| 5,941,770 | A | 8/1999 | Miers et al. | |
| 6,206,782 | B1 | 3/2001 | Walker et al. | |
| 6,506,116 | B1 * | 1/2003 | Sunaga et al. | 463/20 |
| 7,140,963 | B2 * | 11/2006 | Kojima | 463/20 |
| 2003/0114217 | A1 | 6/2003 | Walker et al. | |

FOREIGN PATENT DOCUMENTS

| | | | |
|---|---|---|---|
| DE | 44 11 836 | A1 | 10/1995 |
| DE | 198 59 218 | A1 | 6/2000 |
| EA | 000233 | | 12/1998 |
| JP | 4-58965 | | 2/1992 |
| WO | WO 2004/036518 | A2 | 4/2004 |

* cited by examiner

*Primary Examiner* — David L Lewis
*Assistant Examiner* — Adetokunbo Torimiro
(74) *Attorney, Agent, or Firm* — Oblon, Spivak, McClelland, Maier & Neustadt, L.L.P.

(57) ABSTRACT

When a player starts playing a game by operating a MAXBET button (e.g. when the bet count is 30 bets) and determined that the currently owned credit count is insufficient to the credit count required for the MAX bet, the current game rate set in a slot machine (the credit count per bet required for betting) is changed to a lower game rate.

10 Claims, 33 Drawing Sheets

FIG. 4

55

| DESCRIPTION | RANDOM NUMBER RANGE |
|---|---|
| TRIGGER OF FREE GAME | 0-121 |
| 7 | 122-353 |
| 3BAR | 354-427 |
| 2BAR | 428-473 |
| 1BAR | 474-825 |
| CHERRY | 826-1025 |
| FAILURE | 1026-16383 |

FIG. 5

56

| DESCRIPTION | AWARD |
|---|---|
| TRIGGER OF FREE GAME | TRANSITION TO FREE GAME (ADDITION OF NUMBER OF FREE GAMES) |
| 7 | x 100 |
| 3BAR | x 30 |
| 2BAR | x 20 |
| 1BAR | x 10 |
| CHERRY | x 2 |
| FAILURE | 0 |

FIG. 16

255

| DESCRIPTION | RANDOM NUMBER RANGE |
|---|---|
| TRIGGER OF FREE GAME | 0-121 |
| 7 | 122-353 |
| 3BAR | 354-427 |
| 2BAR | 428-473 |
| 1BAR | 474-825 |
| CHERRY | 826-1025 |
| FAILURE | 1026-16383 |

FIG. 17

256

| DESCRIPTION | AWARD |
|---|---|
| TRIGGER OF FREE GAME | TRANSITION TO FREE GAME (ADDITION OF NUMBER OF FREE GAMES) |
| 7 | x 100 |
| 3BAR | x 30 |
| 2BAR | x 20 |
| 1BAR | x 10 |
| CHERRY | x 2 |
| FAILURE | 0 |

FIG. 28

601 — FIRST REEL BAND

| CODE NO. | SYMBOL |
|---|---|
| 00 | J |
| 01 | Q |
| 02 | LOBSTER |
| 03 | J |
| 04 | Q |
| 05 | CRAB |
| 06 | A |
| 07 | WORM |
| 08 | K |
| 09 | FISH |
| 10 | PUNK |
| 11 | Q |
| 12 | SHARK |
| 13 | WILD |
| 14 | K |
| 15 | A |
| 16 | OCTOPUS |
| 17 | J |
| 18 | Q |
| 19 | FISH |
| 20 | K |
| 21 | J |
| 22 | SARDINE |
| 23 | CRAB |
| 24 | WILD |
| 25 | WORM |
| 26 | Q |
| 27 | CRAB |
| 28 | A |
| 29 | FISH |

602 — SECOND REEL BAND

| CODE NO. | SYMBOL |
|---|---|
| 00 | OCTOPUS |
| 01 | A |
| 02 | LOBSTER |
| 03 | OCTOPUS |
| 04 | K |
| 05 | WILD |
| 06 | FISH |
| 07 | WORM |
| 08 | J |
| 09 | CRAB |
| 10 | OCTOPUS |
| 11 | A |
| 12 | SARDINE |
| 13 | WORM |
| 14 | J |
| 15 | OCTOPUS |
| 16 | SHARK |
| 17 | J |
| 18 | OCTOPUS |
| 19 | CRAB |
| 20 | Q |
| 21 | PUNK |
| 22 | CRAB |
| 23 | WILD |
| 24 | J |
| 25 | WORM |
| 26 | CRAB |
| 27 | K |
| 28 | OCTOPUS |
| 29 | WORM |

603 — THIRD REEL BAND

| CODE NO. | SYMBOL |
|---|---|
| 00 | A |
| 01 | K |
| 02 | LOBSTER |
| 03 | WORM |
| 04 | Q |
| 05 | LOBSTER |
| 06 | PUNK |
| 07 | A |
| 08 | J |
| 09 | SARDINE |
| 10 | WILD |
| 11 | Q |
| 12 | WORM |
| 13 | K |
| 14 | FISH |
| 15 | Q |
| 16 | CRAB |
| 17 | A |
| 18 | WILD |
| 19 | SHARK |
| 20 | Q |
| 21 | K |
| 22 | OCTOPUS |
| 23 | Q |
| 24 | A |
| 25 | WORM |
| 26 | J |
| 27 | Q |
| 28 | PUNK |
| 29 | K |

604 — FOURTH REEL BAND

| CODE NO. | SYMBOL |
|---|---|
| 00 | Q |
| 01 | J |
| 02 | LOBSTER |
| 03 | Q |
| 04 | WILD |
| 05 | LOBSTER |
| 06 | A |
| 07 | K |
| 08 | SARDINE |
| 09 | A |
| 10 | K |
| 11 | CRAB |
| 12 | PUNK |
| 13 | K |
| 14 | SHARK |
| 15 | WORM |
| 16 | A |
| 17 | OCTOPUS |
| 18 | FISH |
| 19 | K |
| 20 | WILD |
| 21 | PUNK |
| 22 | A |
| 23 | FISH |
| 24 | CRAB |
| 25 | K |
| 26 | Q |
| 27 | OCTOPUS |
| 28 | WORM |
| 29 | Q |

605 — FIFTH REEL BAND

| CODE NO. | SYMBOL |
|---|---|
| 00 | J |
| 01 | A |
| 02 | LOBSTER |
| 03 | J |
| 04 | A |
| 05 | FISH |
| 06 | CRAB |
| 07 | PUNK |
| 08 | K |
| 09 | SARDINE |
| 10 | Q |
| 11 | CRAB |
| 12 | K |
| 13 | WORM |
| 14 | FISH |
| 15 | WILD |
| 16 | OCTOPUS |
| 17 | Q |
| 18 | WORM |
| 19 | J |
| 20 | Q |
| 21 | OCTOPUS |
| 22 | A |
| 23 | PUNK |
| 24 | WORM |
| 25 | Q |
| 26 | CRAB |
| 27 | WILD |
| 28 | K |
| 29 | OCTOPUS |

FIG. 33

568

| CODE NO. | RANDOM NUMBER |
|---|---|
| 00 | 0 |
| 01 | 1 |
| 02 | 2 |
| 03 | 3 |
| 04 | 4 |
| 05 | 5 |
| 06 | 6 |
| 07 | 7 |
| 08 | 8 |
| 09 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |

FIG. 34

569

| | 2K | 3K | 4K | 5K | |
|---|---|---|---|---|---|
| LOBSTER | 10 | 320 | 2500 | 6000/JP | LEFT → RIGHT |
| SHARK | 3 | 25 | 150 | 1000 | LEFT → RIGHT |
| FISH | 2 | 15 | 120 | 500 | LEFT → RIGHT |
| PUNK | 2 | 10 | 120 | 400 | LEFT → RIGHT |
| OCTOPUS | 2 | 8 | 50 | 300 | LEFT → RIGHT |
| CRAB | | 7 | 50 | 200 | LEFT → RIGHT |
| WORM | | 6 | 40 | 150 | LEFT → RIGHT |
| A | | 5 | 25 | 120 | LEFT → RIGHT |
| K | | 5 | 25 | 120 | LEFT → RIGHT |
| Q | | 5 | 20 | 100 | LEFT → RIGHT |
| J | | 5 | 20 | 100 | LEFT → RIGHT |
| SARDINE | 2 | 5 | 10 | 125 | SCATTER/TRIGGER |

GAMING MACHINE

CROSS-REFERENCE TO THE RELATED APPLICATION(S)

The present application is a continuation of U.S. patent application Ser. No. 11/235,245, filed Sep. 27, 2005, and is based upon and claims a priority from prior Japanese Patent Applications No. 2004-281486 filed on Sep. 28, 2004, No. 2004-281487 filed on Sep. 28, 2004, and No. 2004-284808 filed on Sep. 29, 2004. The entire contents of these applications are incorporated herein by reference.

BACKGROUND

1. Field of the Invention

The present invention relates to a gaming machine for a player to bet a predetermined bet count on a game based on a value of a game medium per bet previously stored and in particular to a gaming machine such as a slot machine for improving the convenience of the player by changing the value of a game medium per bet based on the credited game medium value.

The present invention relates to a gaming machine for a player to bet based on the previously stored value of a game medium of a minimum unit that can be bet and in particular to a gaming machine for improving the convenience of the player and securing the profit of the game arcade by changing the value of a game medium of the minimum unit based on the credited game medium value.

The present invention relates to a gaming machine for a player to play a game by setting a predetermined number of pay lines as activated pay lines by betting and in particular to a gaming machine such as a slot machine for improving the convenience of a player by changing the value of a game medium required for setting one pay line as an activated pay line based on the credited game medium value.

2. Description of the Related Art

With a gaming machine (e.g., a slot machine, a roulette game machine, and a card game machine) for a player to use a coin such as a five-cent coin and a 25-cent coin as a game medium, the player can start to play a game by inputting a coin into the gaming machine, and if the player wins the game, a predetermined number of coins are paid out to the player. The gaming machine in the related art is provided with a hopper for storing input coins, counting a predetermined number of coins, and ejecting the coins. However, the hopper ejects the coins depending on the size and the thickness of each coin, and only one type of coin can be used with one gaming machine.

However, some players want to bet a five-cent coin at a time to play a game and some players want to bet one dollar at a time to play a game. Therefore, to meet such player's demands, the game arcade must install a plurality of gaming machines different only in the type of coin that can be input (denomination of coin to be bet), and a wide installation space is required.

In consideration of such circumstances, recent gaming machines often have adopted a method of printing out a receipt describing the number of coins or the value instead of the method of directly paying out coins using the hopper as a coin payout unit, for example, as shown in JP-A-4-058965. When the coins are paid out, the player can carry the printed receipt to a counter of an game arcade for exchanging the receipt for a prize, conforming to the number of coins or the value descried on the receipt. As the need for carrying coins is eliminated, the burden on the player is lightened.

Therefore, to use the payout unit with a receipt as described above, it is made possible to pay out based on any other coin denomination than the type of input coin (for example, even a slot machine which allows the player to use only a one-dollar coin can pay out 25 or 50 cents to the player based on the receipt), and if more than one type of consumed game medium per bet (so-called game rate) is adopted, a problem does not occur at the payout time. Then, for example, U.S. Pat. No. 6,506,116 describes a slot machine including a rate change switch for enabling a player to select any desired game rate from among different game rates for allowing the player to play a game at any of the different game rates with the single gaming machine.

SUMMARY

However, in the slot machine described in JP-A-4-058965, the game rate cannot be changed. In the slot machine described in U.S. Pat. No. 6,506,116, the game rate (for example, one dollar) can be changed manually, but the player changes the game rate only of his or her own will.

In the above-described gaming machine for the player to use a coin such as a five-cent coin or a 25-cent coin, as a game medium, the coins input to the gaming machine and the paid-out coins are once electronically credited (stored) in the gaming machine. Particularly, if a large amount of coins is credited, usually the player bets continuously for a comparatively short time based on the credit value without inputting any new coin.

That is, when the player bets his or her desired bet count (such as the maximum bet count or the same bet count as the preceding), often the player is not aware that the current credit count is insufficient to the credit count required for the bet.

In such a case, the slot machine described in U.S. Pat. No. 6,506,116 does not allow the player to start playing a game; after being aware that the current credit count is insufficient to the required credit count, the player needs to input a new coin, decrease the bet count, or reduce the game rate manually by operating the rate change switch. Forcing such operation upon the player leads to burden on the player, resulting in lacking the convenience of the player to play a game.

In the slot machine described in JP-A-4-058965, the game rate cannot be changed. In the slot machine described in U.S. Pat. No. 6,506,116, the game rate (for example, one dollar) can be changed manually, but it is feared that the player may change the game rate freely of his or her own will.

That is, the player can play a game according to the spent amount of money based on the current situation by changing the game rate as desired and when a fraction occurs in the amount of money, the player can spend all amount of money by lowering the game rate and thus the convenience of the player is improved; for the game arcade, however, if the players continue to play a game only at a low game rate with the installed gaming machines, the amount of money spent per unit time lessens and the sales are decreased.

In the slot machine described in JP-A-4-058965, the game rate cannot be changed. In the slot machine described in U.S. Pat. No. 6,506,116, the game rate (for example, one dollar) can be changed manually, but the player changes the game rate only of his or her own will.

In the above-described gaming machine for the player to use a coin of such as a five-cent coin or a 25-cent coin, as a game medium, the coins input to the gaming machine and the paid-out coins are once electronically credited (stored) in the gaming machine. Particularly, if a large amount of coins is credited, etc., usually the player bets continuously for a comparatively short time based on the credit value without inputting any new coin. That is, when the player bets with desired number of activated pay lines (such as the maximum number of lines or the same number of lines as the preceding), often the player is not aware that the current credit count is insufficient to the credit count required for the bet.

In such a case, the slot machine described in U.S. Pat. No. 6,506,116 does not allow the player to start playing a game; the player needs to be aware that the current credit count is insufficient to the required credit count, input a new coin, decrease the number of activated pay lines, or reduce the game rate manually by operating the rate change switch. Forcing such operation upon the player leads to burden on the player, resulting in lacking the convenience of the player to play a game.

The present invention provides at least one of:

(1) A gaming machine that enables a player to continue playing a game according to any desired bet count based on the automatically changed unit game value without performing special operation, whereby the player can play a game concentratedly and comfortably without concern for the remaining credited game media and the convenience of the player is improved.

(2) A gaming machine that enables a player to play a game based on the automatically changed minimum game value without performing special operation if a fraction occurs in stored game media and enabling the player to spend all game media to play a game if a fraction occurs in the game media and also making it possible to secure the profit of the game arcade.

(3) A gaming machine that enables a player to continue playing a game according to any desired number of lines based on the automatically changed unit game value without performing special operation, whereby the player can play a game concentratedly and comfortably without concern for the remaining credited game media and the convenience of the player is improved.

According to a first aspect of the invention, there is provided a gaming machine including: a game processing unit that performs game processing to provide a game to a player; a game medium storing unit that stores a game medium; a betting unit that allows the player to bet the game medium stored in the game medium storing unit by a predetermined bet count in the game provided by the game processing unit; a game rate storing unit that stores a game rate that declares a counter value of the game medium per one bet that is bet by the player through the betting unit; a payout unit that pays out a predetermined amount of the game medium in accordance with the bet count, the game rate, and a result of the game; a determination unit that determines whether or not a value of the game medium stored in the game medium storing unit is insufficient to a value of the game medium required for the bet, which is calculated by multiplying the bet count by the game rate; and a game rate changing unit that changes the game rate stored in the game rate storing unit from a first game rate that is presently stored into a second game rate that is lower than the first game rate, when the determination unit determines that the value of the game medium stored in the game medium storing unit is insufficient to the value of the game medium required for the bet.

According to a second aspect of the invention, there is provided a gaming machine including: a game processing unit that performs game processing to provide a game to a player, the game processing unit including (1) a variable display that variably displays a plurality of symbols on a plurality of pay lines, and (2) a controller that controls the symbols to be stopped on the pay lines; a game medium storing unit that stores a game medium; a betting unit that allows the player to bet the game medium stored in the game medium storing unit by a predetermined bet count in the game provided by the game processing unit to activate a predetermined number of the pay lines as activated pay lines; a game rate storing unit that stores a game rate that declares a counter value of the game medium per pay line to activate; a payout unit that pays out a predetermined amount of the game medium in accordance with the game rate and a combination of the symbols stopped on the variable display on the activated pay lines; a determination unit that determines whether or not a value of the game medium stored in the game medium storing unit is insufficient to a value of the game medium required for activating the predetermined number of pay lines as the activated pay lines, which is calculated by multiplying the number of the activated pay lines by the game rate; and a game rate changing unit that changes the game rate stored in the game rate storing unit from a first game rate that is presently stored into a second game rate that is lower than the first game rate, when the determination unit determines that the value of the game medium stored in the game medium storing unit is insufficient to the value of the game medium required for activating the predetermined number of pay lines.

BRIEF DESCRIPTION OF THE DRAWINGS

In the accompanying drawings:

FIG. 4 is a schematic drawing to show a lottery table of the slot machine according to the first embodiment;

FIG. 5 is a schematic drawing to show an award table of the slot machine according to the first embodiment;

FIG. 16 is a schematic drawing to show a lottery table of the slot machine according to the second embodiment;

FIG. 17 is a schematic drawing to show an award table of the slot machine according to the second embodiment;

FIG. 28 is a schematic drawing to show symbol rows variably displayed on the variable display sections according to a first reel band to a fifth reel band;

FIG. 33 is a drawing to show a symbol lottery table for determining the symbols to be displayed on the variable display sections by lottery;

FIG. 34 is a drawing to show an award table to list winning combinations and their awards;

DETAILED DESCRIPTION OF THE EMBODIMENTS

First Embodiment

Figure 1:
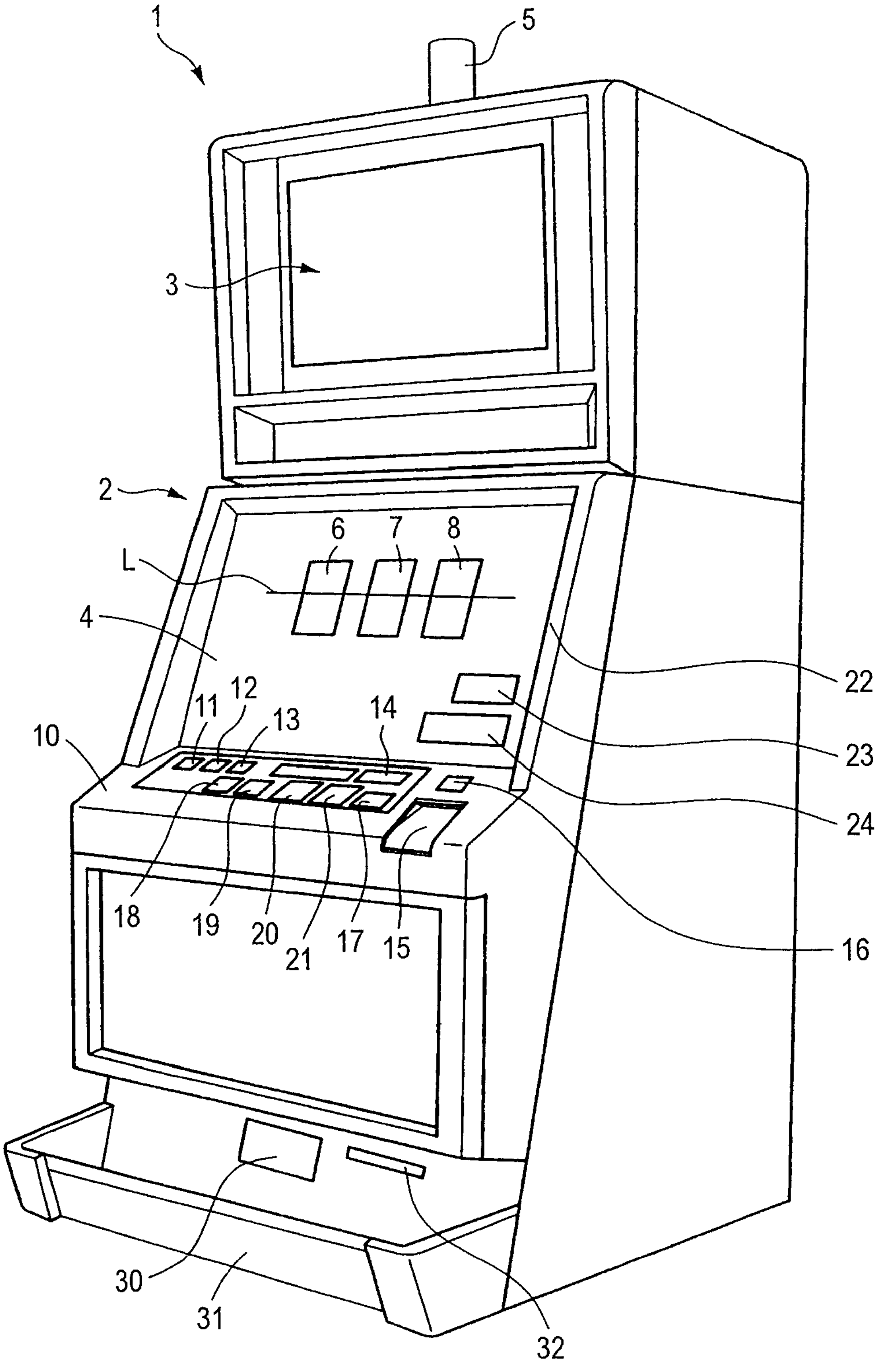
FIG. 1 is a perspective view of a slot machine according to a first embodiment.
Figure 2:
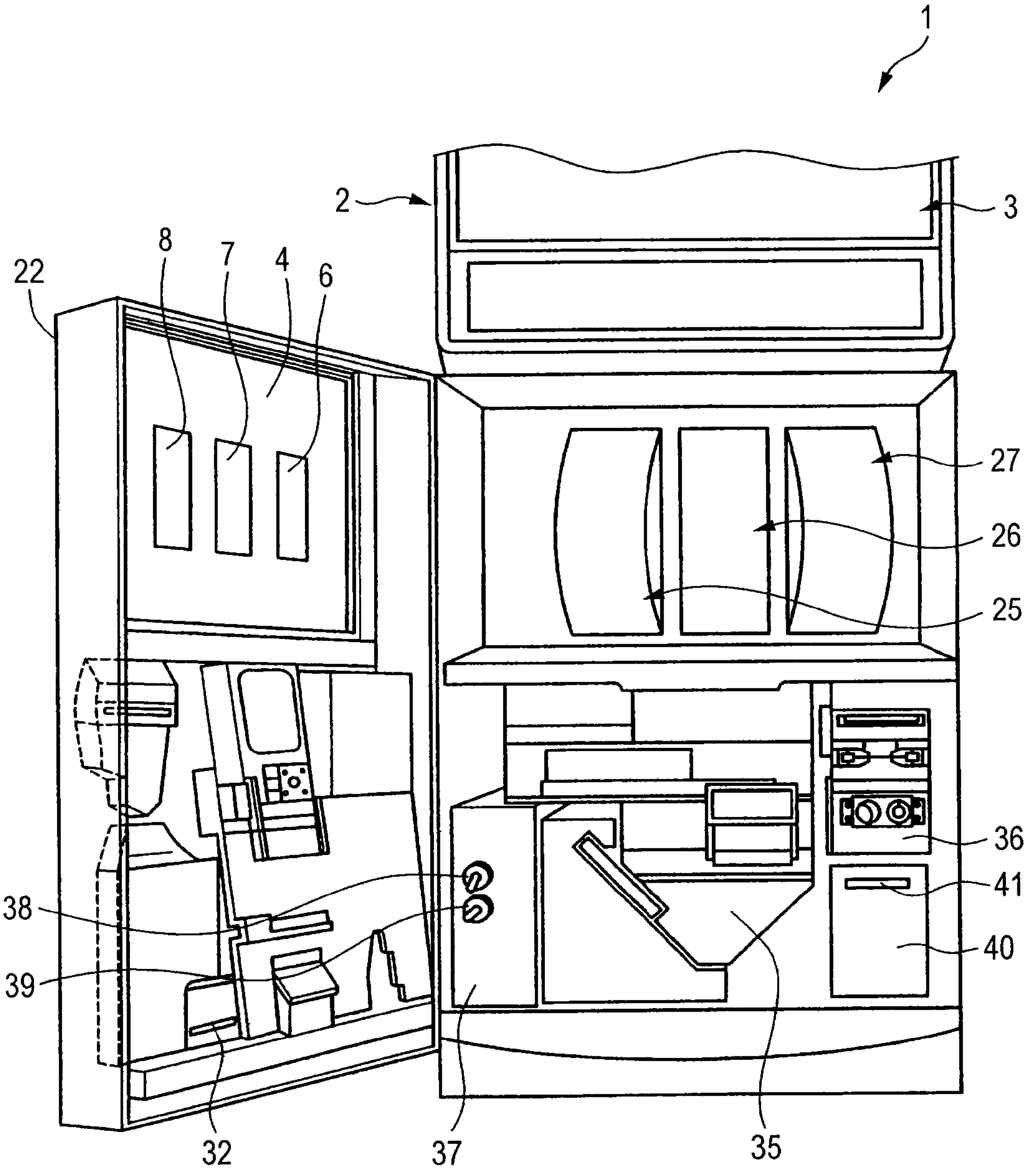
FIG. 2 is a front view to show the internal structure of a cabinet of the slot machine according to the first embodiment.

A slot machine according to a first embodiment will be described in detail with reference to the accompanying drawings. FIG. 1 is a perspective view of the slot machine according to the first embodiment and FIG. 2 is a front view to show the internal structure of a cabinet of the slot machine according to the first embodiment.

As shown in FIG. 1, a slot machine 1 has a cabinet 2, and an upper liquid crystal display 3 is disposed on a front top portion of the cabinet 2. A lower liquid crystal display 4 is disposed in a front center portion of the cabinet 2. The upper liquid crystal display 3 is implemented as a generally used liquid crystal display, and the lower liquid crystal display 4 is implemented as a so-called transparent liquid crystal display. The upper liquid crystal display 3 displays help information for helping the player perform game operation, such as a gaming manner, the types of winning combinations, and their awards, and information of various effects concerning the game. A lamp 5 is provided on the top of the upper liquid crystal display 3. The lamp 5 is lit to call a shop assistant of a game arcade when an error occurs.

Three variable display sections 6, 7, and 8 are displayed in the lower liquid crystal display 4 as shown in FIG. 1, and various symbols are variably displayed from the top to the bottom on the variable display sections 6 to 8 while the symbols are scrolled. Provided in the lower right corner of the lower liquid crystal display 4 are a game rate display section 23 for displaying the credit count per bet required for the player to bet using a BET button (described later), which will be hereinafter referred to as game rate, and a credit count display section 24 for displaying the current credit count owned by the player (one credit has the value of one dollar). The basic structure of the transparent liquid crystal display is already known and therefore will not be discussed here.

An operation table 10 projected to the front is provided below the lower liquid crystal display 4. A CHANGE button 11, a CASHOUT button 12, and a HELP button 13 are placed on the operation table 10 from the left to the right viewed from the position opposed to the front of the gaming machine. A coin insertion section 14, a bill insertion section 15, and a game rate change button 16 are provided to the right of the HELP button 13. A 1-BET button 18, a REPEAT BET button 19, a 10-BET button 20, a MAXBET button 21, and a start button 17 are placed from the left on the front side of the operation table 10.

In the lower portion of the cabinet 2, a coin payout opening 30 is formed and a coin receiving tray 31 for receiving coins (for example, one-dollar coins) paid out from the coin payout opening 30 is provided. A coin detection section 76 including a sensor is placed in the coin payout opening 30 for detecting the number of coins paid out from the coin payout opening 30.

A receipt ejection opening 32 having a long-hole shape is provided on one side of the coin payout opening 30. The receipt ejection opening 32 is an ejection opening for printing out a receipt printing the current credit count owned by the player displayed on the credit count display section 24 when the player presses the CASHOUT button 12. In the embodiment, a receipt is held in a state in which the receipt is ejected 30 mm (the length can be changed as desired) from the receipt ejection opening 32. The player draws out the held receipt and carries the receipt to a prize exchange place, etc., whereby it is made possible for the player to exchange the receipt for a prize, etc., responsive to the credit count described on the receipt. In the slot machine 1 according to the embodiment, when the player presses the CASHOUT button 12, usually a receipt is used as payout, but as many coins as the number of coins corresponding to the credit count may be paid out from the coin payout opening 30 by a hopper 35 (described later).

Reels 25, 26, and 27 are provided for rotation in the center of the inside of the cabinet 2 when a front panel 22 provided on the front of the cabinet 2 is opened, as shown in FIG. 2. A symbol row including symbols is drawn on the outer peripheral surface of each of the reels 25, 26, and 27.

A change machine 36 and a power box unit 37 are provided on sides of the hopper 35 in the cabinet 2. A main switch 38 for turning on and off the power required for operating the slot machine 1 and a reset switch 39 for initializing the state of the slot machine 1 are provided on the front of the power box unit 37.

A receipt print unit 40 is provided below the change machine 36, and as a receipt ejected from the receipt ejection opening 32, first the current credit count owned by the player is printed on roll paper (not shown) stored in the receipt print unit 40 on a printer (not shown). Then, the printed roll paper is transported from a transport opening 41 toward the receipt ejection opening 32 and is also cut to a predetermined length (for example, 100 mm) by a cutter (not shown) in the receipt print unit 40.

The CHANGE button 11 is a button pressed by the player to change a bill input to the bill insertion section 15, and coins into which a bill is changed by the internal change machine 36 are paid out to the coin receiving tray 31 from the coin payout opening 30 provided In the lower portion of the cabinet 2. A CHANGE switch 65 (described later) is disposed in the CHANGE button 11. As the CHANGE button 11 is pressed, a switch signal is output from the CHANGE switch 65 to a CPU 61.

The CASHOUT button 12 is a button pressed by the player usually when a game is over. When the CASHOUT button 12 is pressed, a paper receipt printing the current credit count owned by the player containing the credit gained by playing the game is sent from the receipt ejection opening 32. A CASHOUT switch 66 (described later) is disposed in the CASHOUT button 12. As the CASHOUT button 12 is pressed, a switch signal is output from the CASHOUT switch 66 to the CPU 61.

The HELP button 13 is a button pressed by the player when the player is not aware of the game operation manner, etc. When the HELP button 13 is pressed, immediately a help screen providing various pieces of help information is displayed on the upper liquid crystal display 3. A HELP switch 67 (described later) is disposed in the HELP button 13. As the HELP button 13 is pressed, a switch signal is output from the HELP switch 67 to the CPU 61.

A coin sensor 74 (described later) is placed in the coin insertion section 14. When a coin of a predetermined denomination such as a one-dollar coin is input to the coin insertion section 14, a coin detection signal is output through the coin sensor 74 to the CPU 61. A bill sensor 75 is placed in the bill insertion section 15. When a bill is input to the bill insertion section 15, a bill detection signal is output through the bill sensor 75 to the CPU 61.

The 1-BET button 18 is a button to bet one at a time each time the player presses the 1-BET button 18. A 1-BET switch 68 (described later) is disposed in the 1-BET button 18. As the 1-BET button 18 is pressed, a switch signal is output from the 1-BET switch 68 to the CPU 61.

The REPEAT BET button 19 is a button for starting various display of the symbols on the variable display sections 6 to 8 of the lower liquid crystal display 4 to start a game according to the current bet count or the preceding bet count as the REPEAT BET button 19 is pressed. A repeat bet switch 69 (described later) is disposed in the REPEAT BET button 19. As the REPEAT BET button 19 is pressed, a switch signal is output from the repeat bet switch 69 to the CPU 61. The possible bet count as the REPEAT BET button 19 is pressed is in the range of 1 to 30 (MAX).

The 10-BET button 20 is a button to bet 10 at a time each time the player presses the 10-BET button 20. A 10-BET switch 70 (described later) is disposed in the 10-BET button 20. When the 10-BET button 20 is pressed, a switch signal is output from the 10-BET switch 70 to the CPU 61.

The MAXBET button 21 is a button for starting a game according to the maximum bet count per game, namely, 30 as the MAXBET button 21 is pressed. A MAXBET switch 71 (described later) is disposed in the MAXBET button 21. As the MAXBET button 21 is pressed, a switch signal is output from the MAXBET switch 71 to the CPU 61.

The start button 17 is a button for starting rotation of the reels 25, 26, and 27 based on the bet count entered by pressing any of the BET buttons 18 to 21. A start switch 72 is disposed in the start button 17. When the start button 17 is pressed, a switch signal generated from the start switch 72 is output to the CPU 61. The symbols scrolled in the variable display sections 6 to 8 are stopped in order starting at the variable display section 6 at the left of the front after the passage of a given time (in the embodiment, about three seconds after the start button is pressed).

The game rate change button 16 is a button to change the current game rate (the credit count per bet required for betting) each time the player presses the game rate change button 16. The game rate that can be set in the slot machine 1 according to the embodiment involves the three types of "one dollar (one credit)," "25 cents (0.25 credit)," and "five cents (0.05 credit);" as the player presses the game rate change button 16, the game rate is changed in the order of one dollar to 25 cents to five cents to one dollar to . . . . The current game rate is displayed on the game rate display section 23 of the lower liquid crystal display 4. Therefore, the player can change the game rate to play a game without moving to any other slot machine in response to the current possession situation; the convenience of the player is improved. A game rate change switch 73 (described later) is disposed in the game rate change button 16. As the game rate change button 16 is pressed, a switch signal is output from the game rate change switch 73 to the CPU 61.

Subsequently, the reels provided for rotation in the cabinet 2 at the rear of the lower liquid crystal display 4 will be discussed.

At the lower liquid crystal display 4, the three reels 25 to 27 are supported side by side for rotation separately, and as the reels 25 to 27 are rotated, a base game and a free game (described later) are played. The left reel 25 viewed from the front of the slot machine 1 is opposed to the variable display section 6 formed on the lower liquid crystal display 4 (see FIGS. 1 and 2), the center reel 26 is opposed to the variable display section 7 formed on the lower liquid crystal display 4 (see FIGS. 1 and 2), and the right reel 27 is opposed to the variable display section 8 formed on the lower liquid crystal display 4 (see FIGS. 1 and 2).

Figure 3:
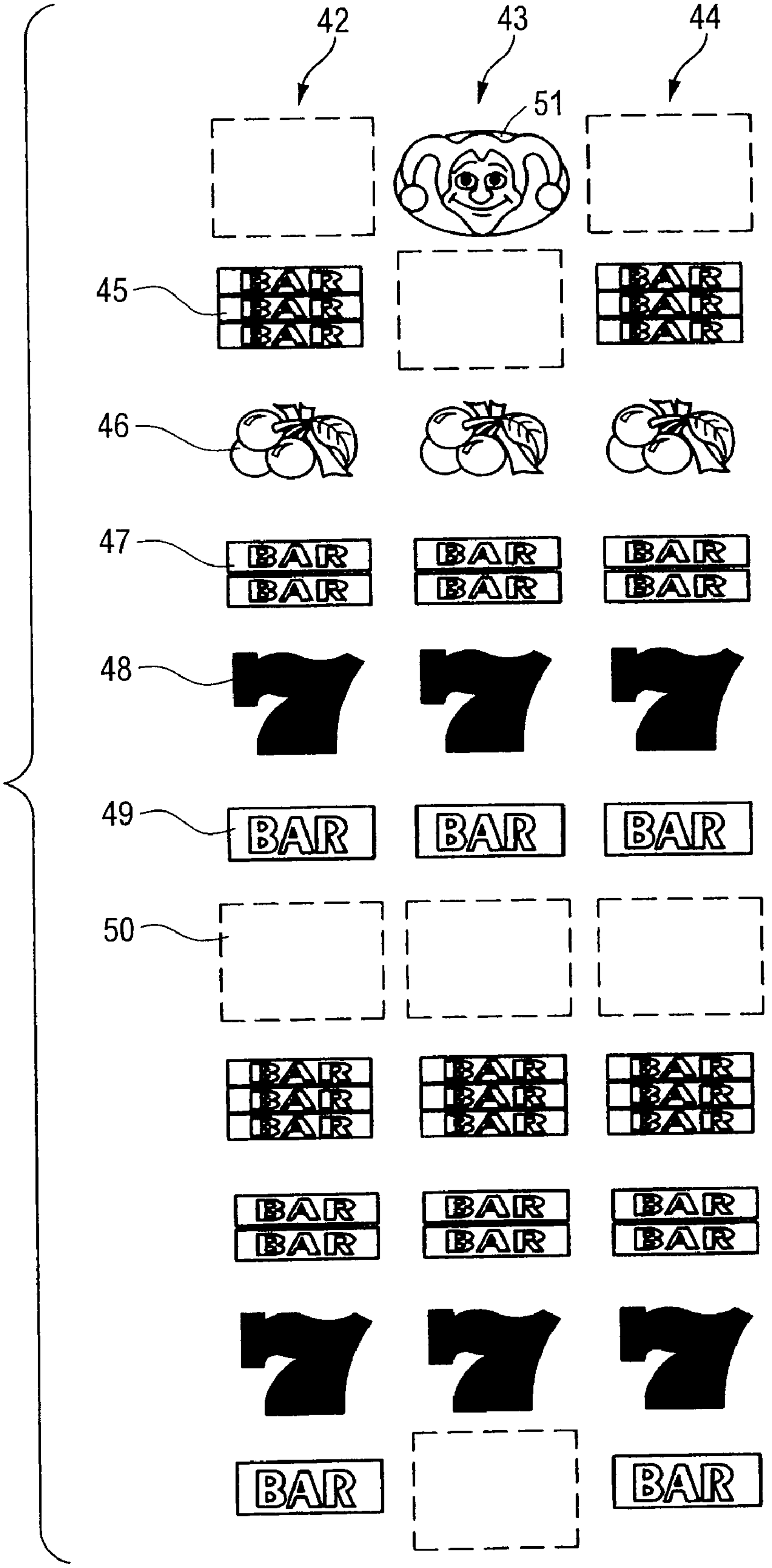
FIG. 3 is a schematic representation to schematically show symbol rows variably displayed in variable display sections according to the first embodiment.

Subsequently, the symbol rows drawn on the surfaces of the reels 25 to 27 and scrolled and variably displayed with rotation of the reels 25 to 27 in the variable display sections 6 to 8 will be discussed with reference to FIG. 3. FIG. 3 is a schematic drawing to show the symbol rows drawn on the reels 25 to 27.

In FIG. 3, a symbol row 42 is a symbol row variably displayed in the variable display section 6, a symbol row 43 is a symbol row variably displayed in the variable display section 7, and a symbol row 44 is a symbol row variably displayed in the variable display section 8.

To form various symbols on the peripheral surfaces of the reels 25 to 27, it is a common practice to previously print the symbols on long reel sheets each matching the width and the peripheral length of each of the reels 25 to 27 and then put the reel sheets on the peripheral surfaces of the reels 25 to 27. However, the symbols can be formed by any other method than the above-described method.

The symbol rows 42 and 44 have each the same symbol arrangement. Each of the symbol rows 42 and 44 includes 11 symbols as an appropriate combination of triple BAR 45, cherry 46, double BAR 47, seven 48, single BAR 49, and blank (area where no symbol exists) 50.

The symbol row 43 is the same as the symbol row 42, 44 in that it is provided by combining triple BAR 45, cherry 46, double BAR 47, seven 48, single BAR 49, and blank 50; it differs in that it further involves one trigger symbol 51. The trigger symbol 51 is a symbol to make a transition to a free game; when stop display is produced on an activated pay line L in the variable display section 7, a transition can be made to a free game.

The free game is a game played continuously after a base game is played; generally it is often an advantageous game for the player. When a transition is made to the free game, the player can play 10, 20, or 30 successive games in response to the rank of the free game without betting any credit. The free games include various advantageous games for the player following the base game, such as a bonus game and a second game.

If the symbol rows 42 to 44 scrolled in the variable display sections 6 to 8 are stopped on the display, the three symbols are stopped in the variable display sections. The symbols stopped on the display at the time are determined based on the result of internal lottery described later, and the reels 25 to 27 are stopped based on the result.

Various winning combinations are preset based on different types of combinations of the symbols and when the symbol combination corresponding to the winning combination stops on the activated pay line L (see FIG. 1), credit is added in response to the winning combination.

To play a game with the slot machine 1, a lottery table used in determining the winning combination by lottery and an award table based on the winning combinations will be discussed with reference to FIG. 4. FIG. 4 shows a lottery table of a winning combination in playing a base game and a free game. FIG. 5 shows an award table to show the award of credit based on each winning combination.

As shown in FIGS. 4 and 5, the range of random numbers used in the winning combination lottery table is 0 to 16383 and if the random number sampled through a random number sampling circuit 119 is in the range of 0 to 121, a trigger of a free game is won. In this case, the trigger symbol 51 is stopped on the activated pay line L in the variable display section 7 and if the game is a base game, a transition is made to a free game. On the other hand, if the game is a free game, the current number of free games is added.

If the random number sampled through the random number sampling circuit 119 is in the range of 122 to 353, a winning combination of seven (7) is won. In this case, seven 48 is stopped on the pay line L and the credit count based on the bet count and the current game rate is added as the award. That is, the bet count multiplied by the game rate multiplied by the award multiplying factor (×100) (for example, if the game is played as MAX (30) bet and at the one-dollar rate, 3000 credits) is added to as the award.

Likewise, if the sampled random number is in the range of 354 to 427, a winning combination of triple BAR is won. If the sampled random number is in the range of 428 to 473, a winning combination of double BAR is won. If the sampled random number is in the range of 474 to 825, a winning combination of single BAR is won. If the sampled random number is in the range of 826 to 1025, a winning combination of cherry is won.

The award multiplying factors of "×30 to ×2" are set for the winning combinations, and the credit count based on the bet count and the current game rate is added as the award (for example, if the winning combination of cherry is won and a game is played as 10 bets and at the 25-cent rate, five credits are added as the award).

If the sampled random number is in the range of 1026 to 16383, a failure is won. In this case, a failure symbol combination not corresponding to any winning combination described above is stopped on the pay line L and no credit is added as the award.

Figure 6:
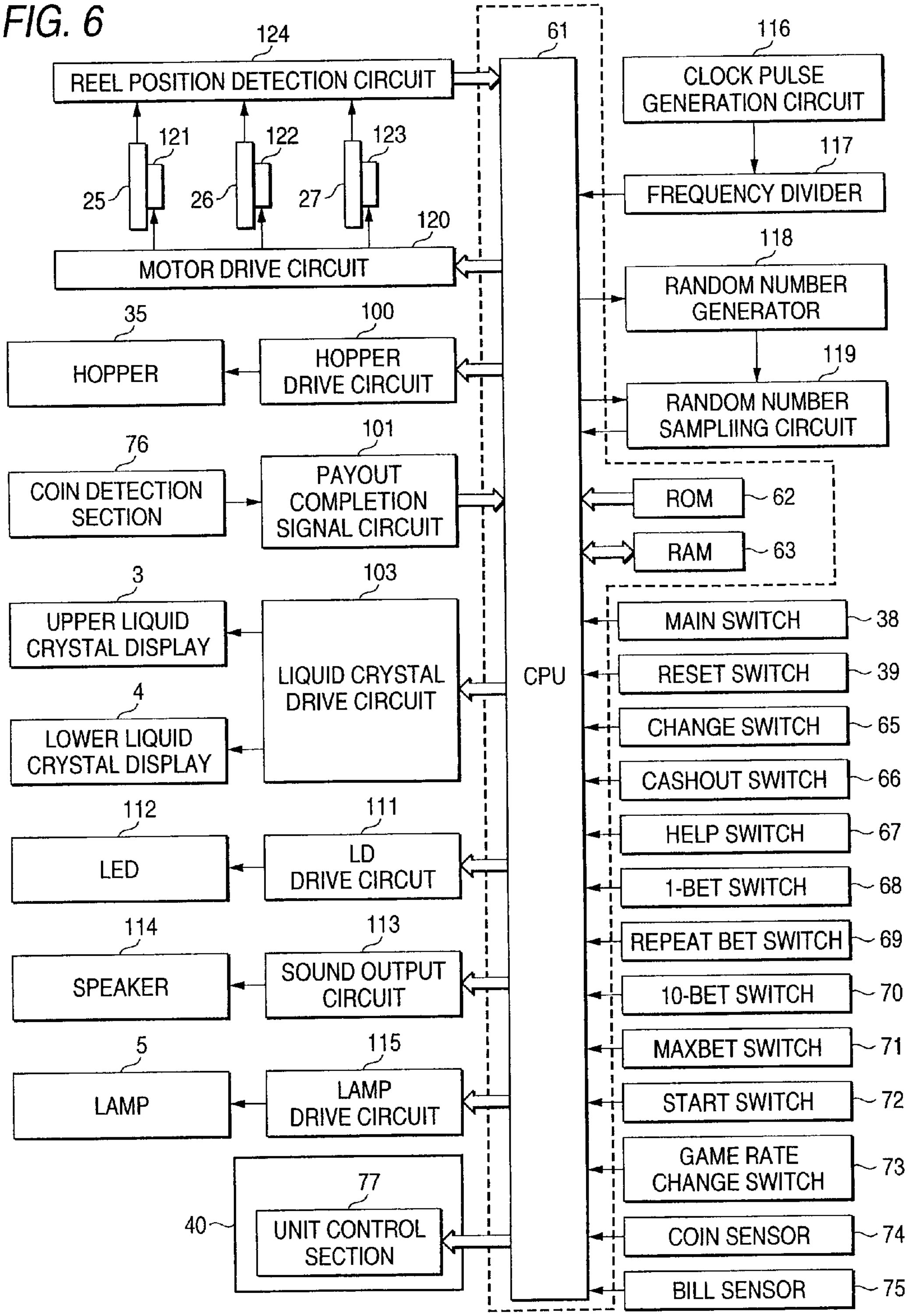
FIG. 6 is a block diagram to schematically show a control system of the slot machine according to the first embodiment.

Next, the configuration of a control system of the slot machine 1 will be discussed with reference to FIG. 6. FIG. 6 is a block diagram to schematically show the control system of the slot machine according to the embodiment.

In FIG. 6, the control system of the slot machine 1 basically has the CPU 61 as the nucleus to which ROM 62 and RAM 63 are connected. The ROM 62 stores a main processing program described later, a base game processing program, a free game processing program, various effect programs for producing various effects on the upper liquid crystal display 3 and the lower liquid crystal display 4 with the progress of a game, the lottery table 55 for determining the stopped symbols of a base game and a free game by lottery (see FIG. 4), the award table 56 based on the winning combinations (see FIG. 5), and other various programs, data tables, etc., required for controlling the slot machine 1. The RAM 63 is memory for temporarily storing the current credit count owned by the player, the current game rate set in the slot machine 1, and various pieces of data on which the CPU 61 performed operations.

Figure 7:
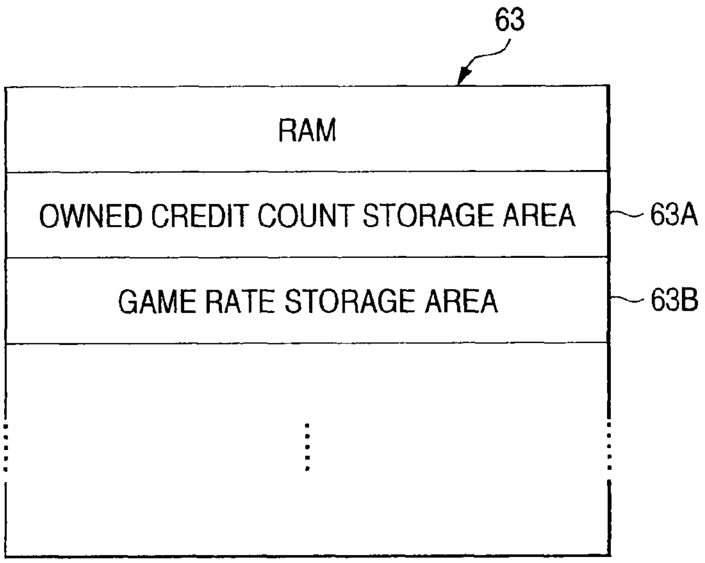
FIG. 7 is a schematic drawing to show storage areas of RAM of the slot machine according to the first embodiment.

FIG. 7 is a schematic drawing to show various storage areas provided in the RAM 63. As shown in FIG. 7, the RAM 63 is provided with an owned credit count storage area 63A for storing the current credit count owned by the player. It is also provided with a game rate storage area 63B for storing the current game rate of the slot machine 1. The current credit count owned by the player stored in the owned credit count storage area 63A is displayed on the credit count display section 24 of the lower liquid crystal display 4 (see FIG. 1). The current game rate stored in the game rate storage area 63B is displayed on the game rate display section 23 (see FIG. 1).

A clock pulse generation circuit 116 for generating a reference clock pulse and a frequency divider 117 are connected to the CPU 61, and a random number generator 118 for generating a random number and a random number sampling circuit 119 are also connected to the CPU 61. The random number sampled through the random number sampling circuit 119 is used for various lotteries of winning combinations, effects, etc. Further, connected to the CPU 61 are the main switch 38, the reset switch 39, the CHANGE switch 65 added to the CHANGE button 11, the CASHOUT switch 66 added to the CASHOUT button 12, the HELP switch 67 added to the HELP button 13, the 1-BET switch 68 added to the 1-BET button 18, the repeat bet switch 69 added to the REPEAT BET button 19, the 10-BET switch 70 added to the 10-BET button 20, the MAXBET switch 71 added to the MAXBET button 21, the start switch 72 added to the start button 17, and the game rate change switch 73 added to the game rate change button 16. The CPU 61 controls the slot machine to execute the corresponding operation based on the switch signal output from each switch as each button is pressed, etc.

Three step motors 121 to 123 for rotating the reels 25 to 27 through a motor drive circuit 120 are connected to the CPU 61, and a reel position detection circuit 124 is also connected to the CPU 61. When the CPU 61 outputs a motor drive signal to the motor drive circuit 120, the step motors 121 to 123 are driven by the motor drive circuit 120. Accordingly, the reels 25 to 27 are rotated.

At this time, the number of drive pulses supplied to each of the step motors 121 to 123 after rotation of each of the reels 25 to 27 is started is calculated, and the calculation value is written into a predetermined area of the RAM 63. From each of the reels 25 to 27, a reset pulse is output every revolution and is input to the CPU 61 through the reel position detection circuit 124. When the result pulse is thus input to the CPU 61, the calculation value written into the RAM 63 is cleared to 0, and the CPU 61 recognizes the rotation position of the symbol on each of the reels 25 to 27 based on the calculation value corresponding to the rotation position within the range of one revolution of each of the reels 25 to 27 and a symbol table stored in the ROM 62 listing the correspondence between the rotation position of each of the reels 25 to 27 and the symbol formed on the peripheral surface of each of the reels 25 to 27.

The coin sensor 74 placed in the coin insertion section 14 and the bill sensor 75 placed in the bill insertion section 15 are connected to the CPU 61. The coin sensor 74 detects a coin such as a one-dollar coin input from the coin insertion section 14, and the CPU 61 calculates the number of input coins based on the coin detection signal output from the coin sensor 74. The CPU 61 increments the credit count (one credit per dollar) stored in the owned credit count storage area 63A of the RAM 63 based on the calculated number of coins.

The bill sensor 75 detects the denomination of each bill input from the bill insertion section 15. The CPU 61 calculates the number of one-dollar coins equivalent to the denomination of the input bill based on the bill detection signal output from the bill sensor 75 (for example, if a 10-dollar bill is input, it is calculated as 10 one-dollar coins), and pays out 10 one-dollar coins to the player through the hopper 35.

The hopper 35 is connected to the CPU 61 through a hopper drive circuit 100. When the CPU 61 outputs a drive signal to the hopper drive circuit 100, the hopper 35 pays out a predetermined number of coins from the coin payout opening 30.

The coin detection section 76 is connected to the CPU 61 through a payout completion signal circuit 101. The coin detection section 76 is placed in the coin payout opening 30. If the coin detection section 76 detects that a predetermined number of coins have been paid out from the coin payout opening 30, the coin detection section 76 outputs a coin payout detection signal to the payout completion signal circuit 101, which then outputs a payout completion signal to the CPU 61. Further, the upper liquid crystal display 3 and the lower liquid crystal display 4 are connected to the CPU 61 through a liquid crystal drive circuit 103 and are controlled by the CPU 61.

Figure 8:
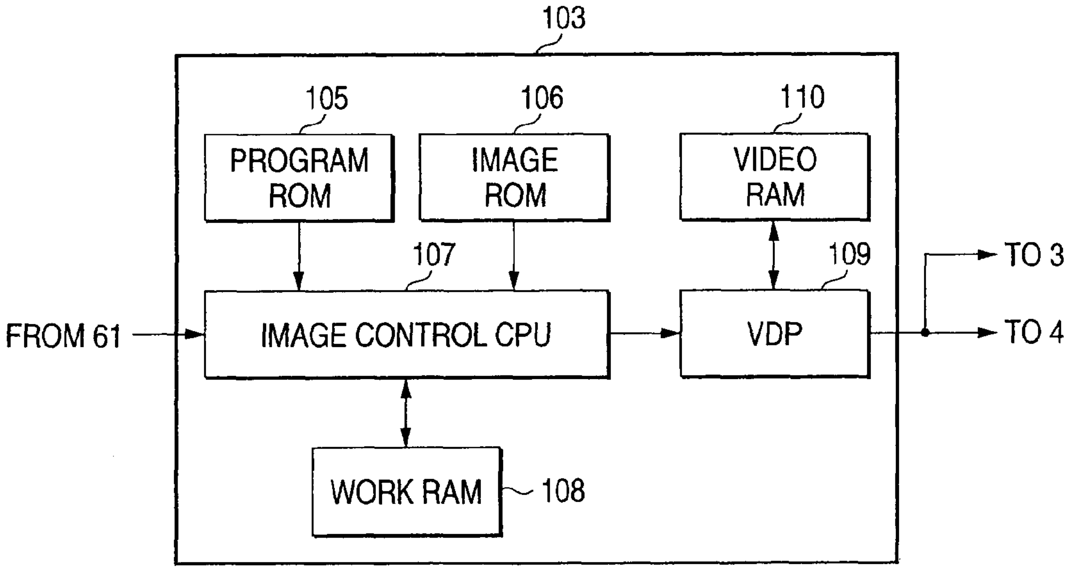
FIG. 8 is a block diagram to schematically show a liquid crystal drive circuit of an upper liquid crystal display and a lower liquid crystal display.

The liquid crystal drive circuit 103 includes program ROM 105, image ROM 106, an image control CPU 107, work RAM 108, a VDP (Video Display Processor) 109, video RAM 110, etc., as shown in FIG. 8. The program ROM 105 stores an image control program and various selection tables involved in display on the upper liquid crystal display 3 and the lower liquid crystal display 4. The image ROM 106 stores dot data (bitmap data) to form images to be displayed on the upper liquid crystal display 3 and the lower liquid crystal display 4, for example. The image control CPU 107 determines the images to be displayed on the upper liquid crystal display 3 and the lower liquid crystal display 4 from among the dot data previously stored in the image ROM 106 in accordance with the image control program previously stored in the program ROM 105 based on the parameters set in the CPU 61. The work RAM 108 is provided as temporary storage means for the image control CPU 107 to execute the image control program. The VDP 109 forms an image responsive to the display contents determined by the image control CPU 107 and outputs the image to the upper liquid crystal display 3 and the lower liquid crystal display 4. The video RAM 110 is provided as temporary storage means for the VDP 109 to form an image.

LEDs 112 are also connected to the CPU 61 through an LED drive circuit 111. A large number of LEDs 112 are disposed on the front of the slot machine 1 and are lighted under the control of the LED drive circuit 111 based on a drive signal from the CPU 61 in producing various effects. A sound output circuit 113 and a speaker 114 are also connected to the CPU 61. The speaker 114 produces various effect sounds in producing various effects based on an output signal from the sound output circuit 113. Further, a lamp drive circuit 115 and a lamp 5 are connected to the CPU 61 for lighting the lamp 5 based on an output signal from the lamp drive circuit 115.

A receipt print unit 40 is also connected to the CPU 61. The receipt print unit 40 is a unit including a paper transport unit, a printer, a cutter, etc., and a unit control section 77 controls them based on a command transmitted from the CPU 61. Specifically, as a signal of the CASHOUT switch 66 is input, the CPU 61 transmits a command for starting to transport paper, and the unit control section 77 starts transporting roll paper by the paper transport unit. Further, the CPU 61 transmits data of the credit count to be printed on paper based on the credit count stored in the owned credit count storage area 63A of the RAM 63, and the unit control section 77 controls the printer to print the corresponding credit count on roll paper. When roll paper of a predetermined length has been transported, the unit control section 77 drives the cutter for cutting the roll paper and creates a receipt printing the game play result.

Figure 9:
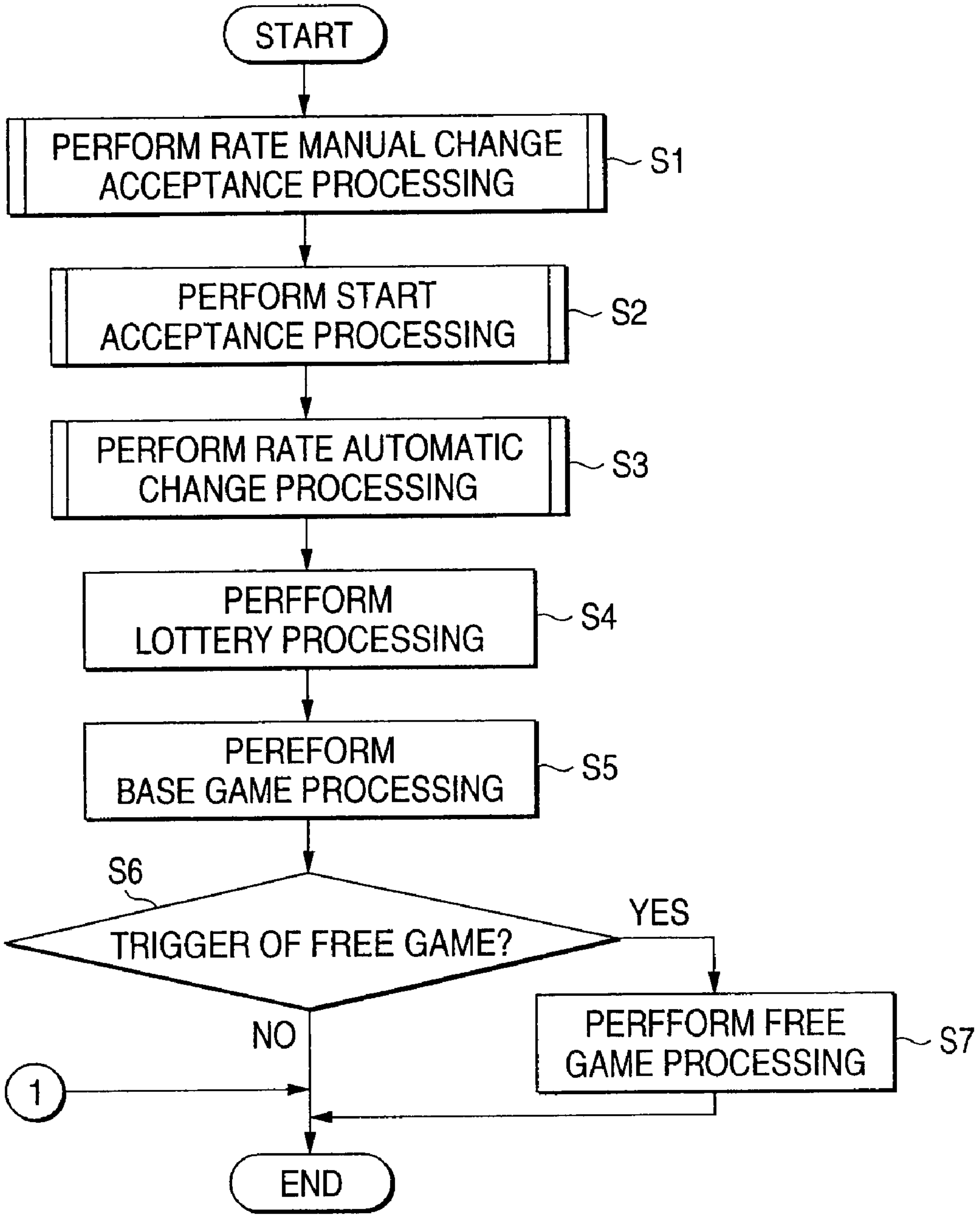
FIG. 9 is a flowchart of a main processing program of the slot machine according to the first embodiment.

Subsequently, the main processing program executed in the slot machine 1 will be discussed with reference to FIG. 9. FIG. 9 is a flowchart of the main processing program of the slot machine according to the embodiment. Programs shown below in flowcharts of FIGS. 9 to 12 are stored in the ROM 62 and the RAM 63 included in the slot machine 1 and are executed by the CPU 61.

First, at step 1 (S1), rate manual change acceptance processing is performed. This processing is processing of changing the current game rate (the credit count per bet required for betting) based on operation of the game rate change button 16. In the slot machine 1 according to the embodiment, the current game rate is changed among the three types of "one dollar (one credit)," "25 cents (0.25 credit)," and "five cents (0.05 credit)."

Next, at S2, start acceptance processing is performed. This processing is processing of accepting a switch signal output from the start switch 72, the repeat bet switch 69, the 1-BET switch 68, the 10-BET switch 70, or the MAXBET switch 71 based on operation of the start button 17, operation of the REPEAT BET button 19, operation of the 1-BET button 18, operation of the 10-BET button 20, or operation of the MAXBET button 21. When the switch signal output from the repeat bet switch 69, the MAXBET switch 71, or the start switch 72 is accepted, a game is started.

Subsequently, at S3, rate automatic change processing is performed. This processing is processing of calculating the necessary credit count particularly when the player operates the MAXBET button 21 based on the switch signal accepted at S2 and lowering the current game rate if the current credit count is insufficient to the credit count required for the MAX bet for allowing the player to play a game. Then, the process proceeds to S4.

At S4, various types of lottery processing are performed based on the switch signal output from the start switch 72, the repeat bet switch 69, the 1-BET switch 68, the 10-BET switch 70, or the MAXBET switch 71. Specifically, a lottery of a winning combination in a base game played using the variable display sections 6 to 8 is held using the random number sampled in the random number sampling circuit 119 and the lottery table 55 (see FIG. 4), and the symbols to be stopped on the display are determined.

At S5, base game processing (variable display and stop display of symbols, credit payout, etc.,) is performed. At S6, whether or not the player wins a trigger of a free game (trigger symbol 51 (see FIG. 3)) is determined at the result of the lottery at S4.

If the player does not win a trigger of a free game (NO at S6), the main processing is terminated. On the other hand, if the player wins a trigger of a free game (YES at S6), the number of free games that can be played successively by the player is determined and then free game processing is performed (S7). After the free game processing is performed, the main processing is terminated.

The number of free games generally is preset as 10 games, 20 games, or 30 games.

Figure 10:
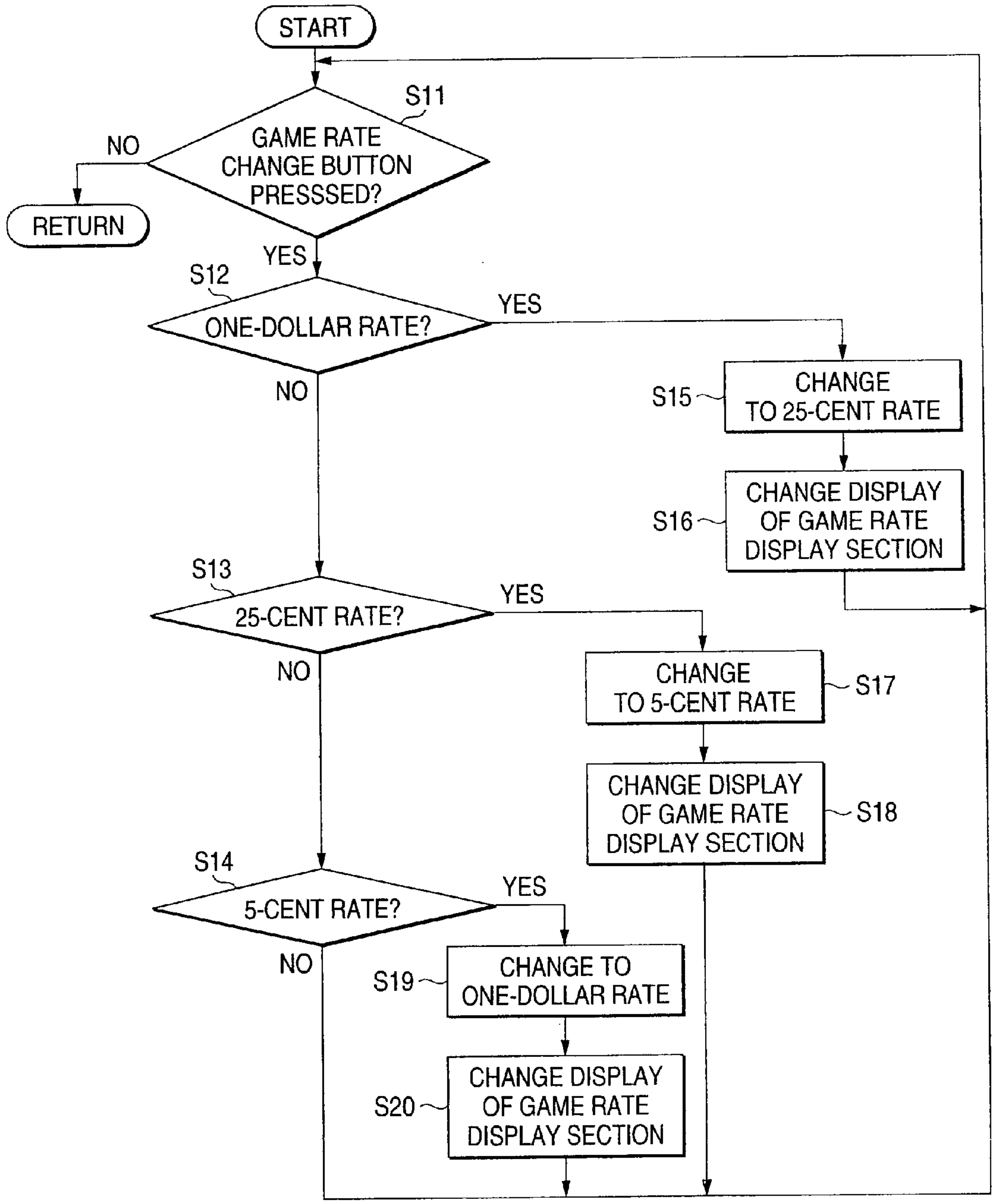
FIG. 10 is a flowchart of a rate manual change acceptance processing program of the slot machine according to the first embodiment.

Subsequently, the rate manual change acceptance processing program at S1 executed in the slot machine 1 will be discussed with reference to FIG. 10. FIG. 10 is a flowchart of the rate manual change acceptance processing program according to the embodiment. The rate manual change acceptance processing is processing of changing the current game rate (the credit count per bet required for betting) among the three types of "one dollar (one credit)," "25 cents (0.25 credit)," and "five cents (0.05 credit)" based on operation of the game rate change button 16.

First, at S11, the CPU 61 determines whether or not the game rate change button 16 is pressed based on the switch signal from the game rate change switch 73. If it is not determined that the game rate change button 16 is pressed (NO at S11), the rate manual change acceptance processing is exited and the subroutine is returned to the main processing.

On the other hand, if it is determined that the game rate change button 16 is pressed (YES at S11), the game rate stored in the game rate storage area 63B of the RAM 63 is read and the current game rate of the slot machine 1 is determined according to S12 to S14.

If the current game rate is determined the one-dollar rate (YES at S12), the current game rate is changed from "one dollar (one credit)" to "25 cents (0.25 credit)." Specifically, the game rate stored in the game rate storage area 63B of the RAM 63 is updated to "25 cents" (S15) and the display of the game rate display section 23 of the lower liquid crystal display 4 is changed to "25 cents" (S16). Accordingly, the credit consumed per bet is changed from one credit to 0.25 credit.

If the current game rate is not determined the one-dollar rate (NO at S12) and is determined the 25-cent rate (YES at S13), the current game rate is changed from "25 cents (0.25 credit)" to "five cents (0.05 credit)." Specifically, the game rate stored in the game rate storage area 63B of the RAM 63 is updated to "five cents" (S17) and the display of the game rate display section 23 of the lower liquid crystal display 4 is changed to "five cents" (S18). Accordingly, the credit consumed per bet is changed from 0.25 credit to 0.05 credit.

If the current game rate is not determined the 25-cent rate (NO at S13) and is determined the five-cent rate (YES at S14), the current game rate is changed from "five cents (0.05 credit)" to "one dollar (one credit)." Specifically, the game rate stored in the game rate storage area 63B of the RAM 63 is updated to "one dollar" (S19) and the display of the game rate display section 23 of the lower liquid crystal display 4 is changed to "one dollar" (S20). Accordingly, the credit consumed per bet is changed from 0.05 credit to one credit.

If the current game rate is not determined the five-cent rate (NO at S14), the process returns to S11 and again the processing is continued.

Figure 11:
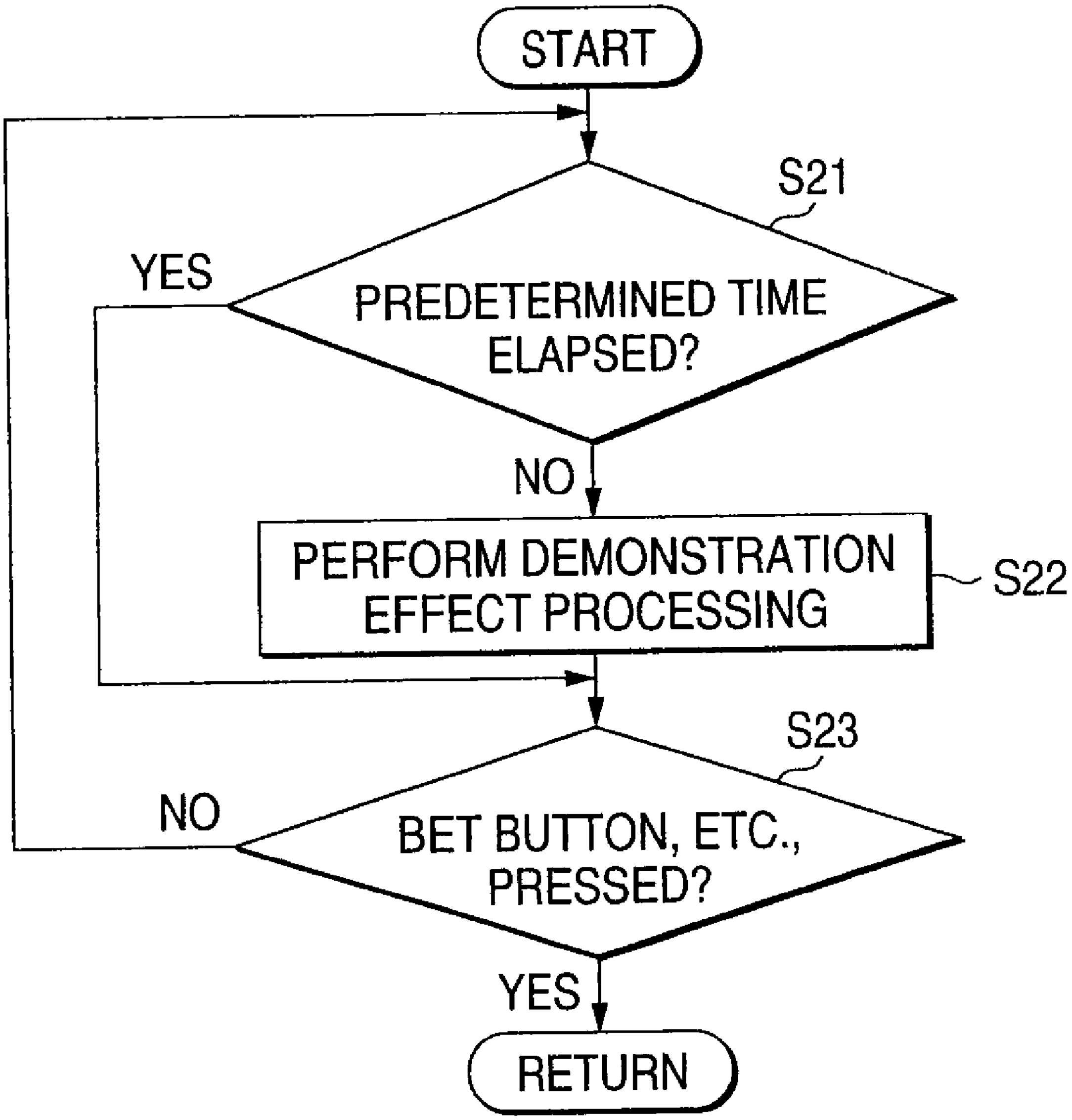
FIG. 11 is a flowchart of a start acceptance processing program of the slot machine according to the first embodiment.

Subsequently, the start acceptance processing program at S2 executed in the slot machine 1 will be discussed with reference to FIG. 11. FIG. 11 is a flowchart of the start acceptance processing program according to the embodiment.

First, at S21, whether or not a predetermined time (in the embodiment, 15 seconds) has elapsed is determined. If it is not determined that the predetermined time has elapsed (NO at S21), the process proceeds to S23. On the other hand, if it is determined that the predetermined time has elapsed (YES at S21), demonstration effects are produced on the upper liquid crystal display 3 and the lower liquid crystal display 4 at S22 and then the process proceeds to S23.

At S23, whether or not the player operates the start button 17, the REPEAT BET button 19, or the MAXBET button 21 is determined. If the player operates the start button 17, a game is started according to the bet count set with the 1-BET button 18 and the 10-BET button 20. If the player operates the REPEAT BET button 19, a game is started according to the same bet count as set in the preceding game. If the player operates the MAXBET button 21, a game is started according to the maximum bet count allowed in one game (in the embodiment, 30 bets).

If it is determined that the player does not operate any of the buttons (NO at S23), the process proceeds to S21 and the above-described processing is repeated. On the other hand, if it is determined that the player operates any of the buttons (YES at S23), the subroutine is returned to the main processing program in FIG. 9 (S3) even if the demonstration is being executed.

Figure 12:
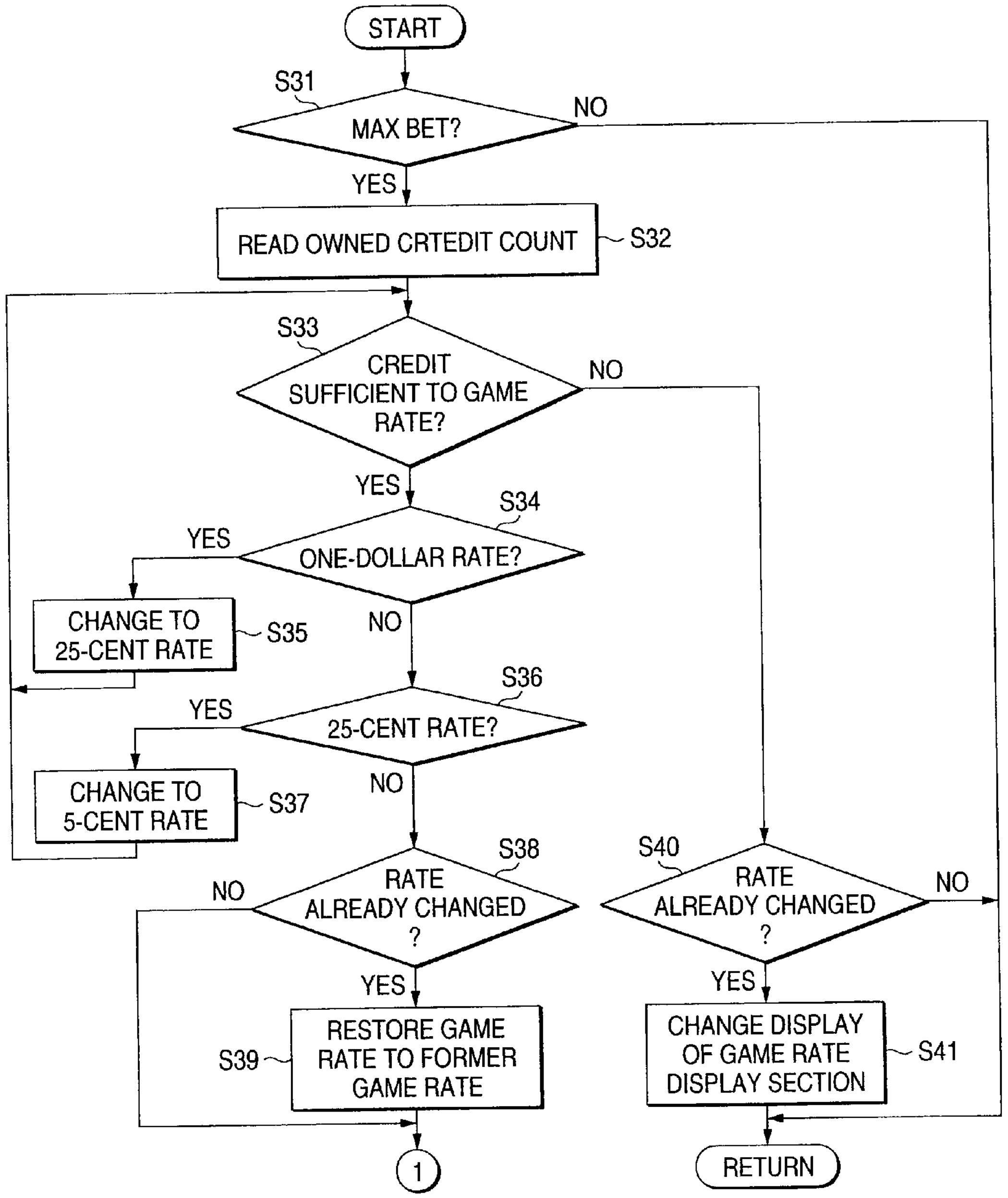
FIG. 12 is a flowchart of a rate automatic change processing program of the slot machine according to the first embodiment.

Next, the rate automatic change processing program at S3 executed in the slot machine 1 will be discussed with reference to FIG. 12. FIG. 12 is a flowchart of the rate automatic change processing program according to the embodiment. The rate automatic change processing is processing of changing the current game rate (the credit count per bet required for betting) to the lower rate among the three types of "one dollar (one credit)," "25 cents (0.25 credit)," and "five cents (0.05 credit)" when the player plays a game setting the bet count to the MAX bet count and the current credit count is insufficient to the credit count required for betting.

First, at S31, the CPU 61 determines whether or not the current game is started as the MAX bet count (30 bets) based on the switch signal accepted in the start acceptance processing at S2. If it is not determined that the current game is started as the MAX bet count (NO at S31), the rate automatic change processing is exited and the subroutine is returned to the main processing.

On the other hand, if it is determined that the game is started as the MAX bet count (YES at S31), subsequently the current credit count owned by the player stored in the owned credit count storage area 63A of the RAM 63 is read (S32).

Further, the CPU 61 compares between the read owned credit count and the credit count required for the MAX bet count for determining whether or not the owned credit is sufficient for the required credit count (S33). The credit count required for the MAX bet count varies depending on the current game rate of the slot machine 1; it is 30 credits if the current game rate is the "one-dollar rate;" 7.5 credits if the current game rate is the "25-cent rate;" or 1.5 credits if the current game rate is the "5-cent rate."

If it is determined that the owned credit is insufficient to the required credit count (YES at S33), subsequently whether or not the current game rate set in the slot machine 1 is "one dollar (one credit)" is determined (S34). The current game rate of the slot machine 1 is derived by reading the value stored in the game rate storage area 63B of the RAM 63.

If the current game rate is one dollar (YES at S34), the game rate is changed from "one dollar (one credit)" to "25 cents (0.25 credit)" at S35. Specifically, the game rate stored in the game rate storage area 63B of the RAM 63 is updated to "25 cents."

On the other hand, if the current game rate is not determined the one-dollar rate (NO at S34) and is determined the 25-cent rate (YES at S36), the current game rate is changed from "25 cents (0.25 credit)" to "five cents (0.05 credit)" at S37. Specifically, the game rate stored in the game rate storage area 63B of the RAM 63 is updated to "five cents."

Further, if the current game rate is not determined the 25-cent rate (NO at S36), namely, is determined the five-cent rate, subsequently whether or not the game rate is changed at S35 or S37 is determined (S38). If it is determined that the game rate is changed (YES at S38), the game rate is restored to the former game rate (S39). Then, the subroutine is returned to the main processing and the processing is terminated.

On the other hand, if it is not determined that the game rate is changed (NO at S38), the game rate is not changed and then the subroutine is returned to the main processing and the processing is terminated.

If the game rate is set to five cents, when it is determined that the owned credit is insufficient to the required credit count (YES at S33), the game rate cannot be lowered any more and therefore the player needs to input a new coin or lessen the bet count to start playing a game.

If it is determined that the owned credit is sufficient for the required credit count (NO at S33), subsequently whether or not the game rate is changed at S35 or S37 is determined (S40). If it is determined that the game rate is changed (YES at S40), the display of the game rate display section 23 of the lower liquid crystal display 4 is changed based on the new game rate (S41). On the other hand, if it is not determined that the game rate is changed (NO at S40), the rate automatic change processing is exited and the subroutine is returned to the main processing.

As described above, in the slot machine 1 according to the embodiment, if the player starts playing a game by operating the MAXBET button 21 (the bet count is 30 bets) (YES at S31) and it is determined that the current owned credit count is insufficient to the credit count required for the MAX bet (YES at S33), the current game rate set in the slot machine 1 (the credit count per bet required for betting) is changed to a lower game rate (S35, S37). Thus, the player can continue playing a game according to any desired MAX bet count based on the automatically changed game rate without adding any coin or operating the game rate change button 16. Therefore, the player can play a game concentratedly and comfortably without concern for the remaining credit count owned by the player at present; the convenience of the player is improved.

Particularly, the convenience of the player who bets successively in a comparatively short time according to the maximum bet count every time is improved.

If it is determined that the current owned credit count is insufficient to the credit count required for the MAX bet (YES at S33), first the current game rate is lowered to the game rate closest to the current game rate among the preset game rates (in the embodiment, the three types of "one dollar," "25 cents," and "five cents") and again whether or not the current owned credit count is insufficient to the required credit count is checked (S33). Thus, if the stored credit count is insufficient to the required credit count, it is made possible for the player to play a game under the game play condition closest to the condition desired by the player. Therefore, there is no fear that the player may be given an unforeseen disadvantage.

Further, the current game rate set in the slot machine 1 is displayed on the game rate display section 23 of the lower liquid crystal display 4, so that if the game rate changes, the player can be informed that the game rate changes. Therefore, if the game rate is changed against player's will, there is no fear that the player may be given an unforeseen disadvantage.

It is to be understood that the present invention is not limited to the first embodiment thereof and various improvements and modifications may be made without departing from the spirit and the scope of the present invention.

For example, in the first embodiment, when the player makes the MAX bet, whether or not the owned credit count is insufficient to the credit count required for the MAX bet is determined and if the owned credit count is insufficient to the required credit count, the current game rate is changed to the lower rate. However, the bet count of the player is not limited to the MAX bet.

For example, if the player presses the REPEAT BET button 19 in the start acceptance processing (S2), the bet count is set to the same bet count as the preceding bet count (containing the MAX bet) and a game is started. At the time, the credit count required for betting may be calculated based on the setup bet count and may be compared with the current owned credit count and if the owned credit count is insufficient to the required credit count, the current game rate may be changed to the lower rate.

Accordingly, the player who bets successively in a comparatively short time according to the same bet count every time using the REPEAT BET button 19 can also continue playing a game according to any desired bet count based on the automatically changed game rate without adding any coin or operating the game rate change button 16. Therefore, the player can play a game concentratedly and comfortably without concern for the remaining credit count owned by the player at present; the convenience of the player is improved.

Further, the necessary credit count may be calculated for any desired bet count set by the player operating the BET button in addition to the above-mentioned bet counts and may be compared with the current owned credit count and if the owned credit count is insufficient to the necessary credit count, the current game rate may be changed to the lower rate.

In the embodiment, a winning combination is determined by lottery based on the lottery table shown in FIG. 4, but the stopped symbol may be determined by lottery for each variable display section.

Specifically, a correspondence table between the symbols on the symbol rows 42 to 44 variably displayed on the variable display sections 6 to 8 used with a game and code numbers is provided, and a lottery table listing the correspondence between the code numbers of the symbols on each symbol row and random numbers is provided. The symbol to be stopped on the pay line L is determined by lottery for each variable display section and the corresponding winning combination is detected based on the stopped symbols and if the player wins the game, the award is determined.

In the slot machine according to the embodiment, if the player presses the CASHOUT button 12, a receipt describing the credit count is ejected as payout, but as many coins as the number of coins corresponding to the credit count may be paid out using the hopper 35. At the time, the part corresponding to the credit less than the denomination of the used coin is discarded (for example, if 1.25 credit is to be paid out from a slot machine that can accept only one-dollar coins, only a one-dollar coin corresponding to one credit is paid out).

Second Embodiment

Figure 13:
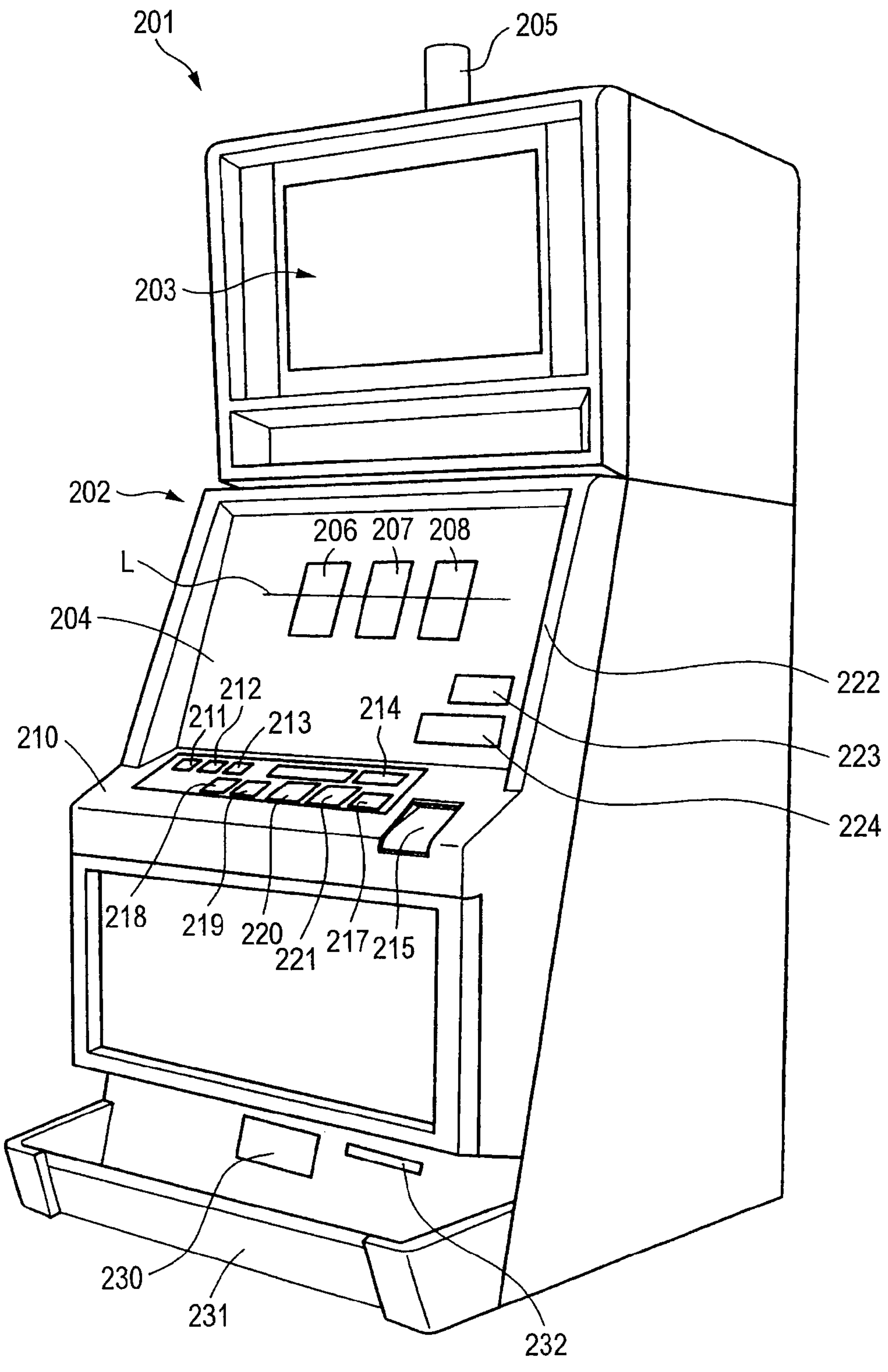
FIG. 13 is a perspective view of a slot machine according to a second embodiment.
Figure 14:
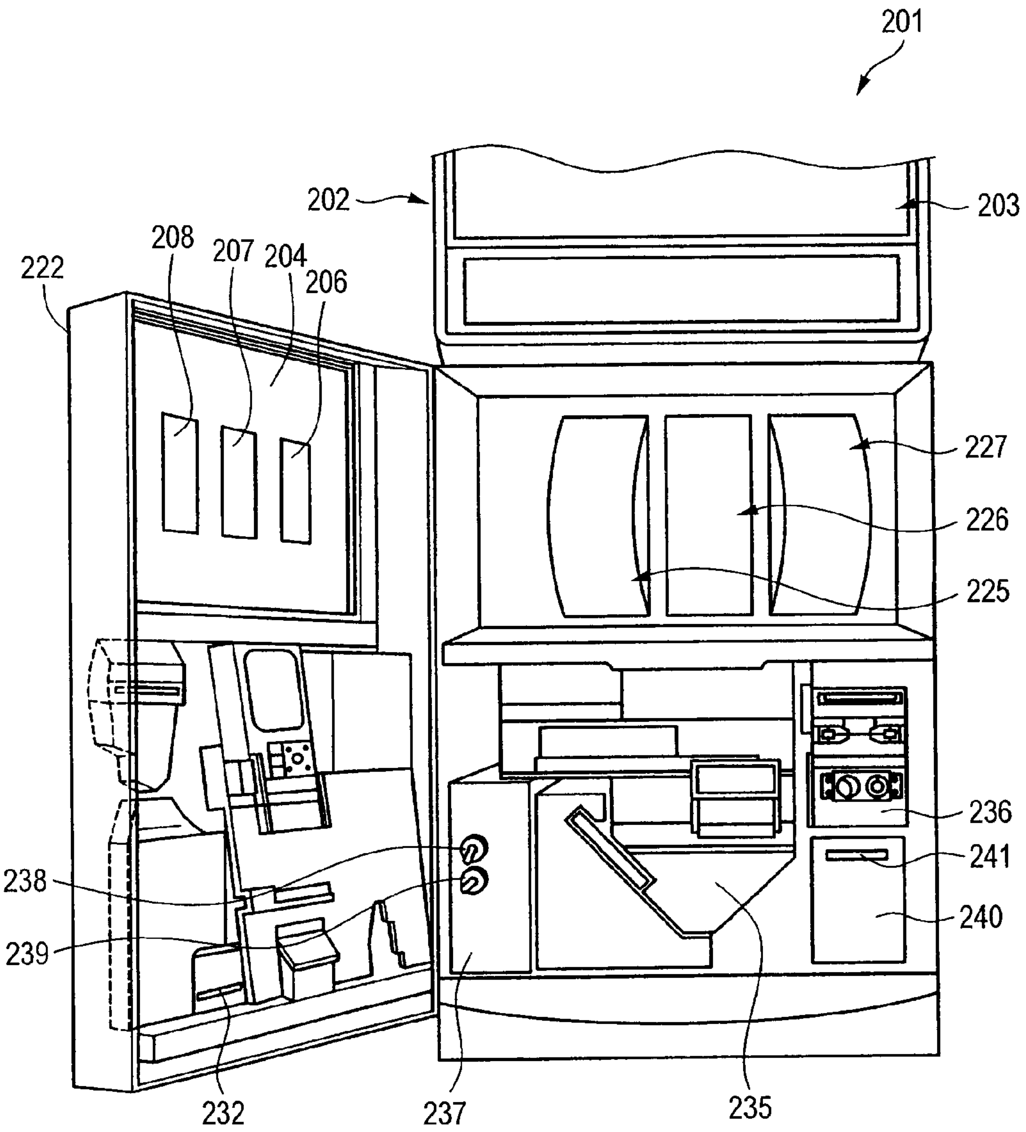
FIG. 14 is a front view to show the internal structure of a cabinet of the slot machine according to the second embodiment.

A slot machine according to a second embodiment will be discussed in detail with reference to the accompanying drawings. To begin with, the schematic configuration of the slot machine according to the embodiment will be discussed based on FIGS. 13 and 14. FIG. 13 is a perspective view of the slot machine according to the embodiment and FIG. 14 is a front view to show the internal structure of a cabinet of the slot machine according to the embodiment.

In FIG. 13, a slot machine 201 has a cabinet 202 forming the periphery of the slot machine, and an upper liquid crystal display 203 is disposed on the front top of the cabinet 202. A lower liquid crystal display 204 is disposed in the front center of the cabinet 202. The upper liquid crystal display 203 is implemented as a generally used liquid crystal display, and the lower liquid crystal display 204 is implemented as a transparent liquid crystal display. The upper liquid crystal display 203 displays help information of helping the player perform game operation, such as a gaming manner, the types of winning combinations, and their awards, and information of various effects concerning the game. A lamp 205 lightened if an error occurs, to call a shop assistant of a game arcade is provided on the top of the upper liquid crystal display 203.

Further, basically three variable display sections 206, 207, and 208 are displayed in the lower liquid crystal display 204 as shown in FIG. 13, and various symbols are variably displayed from the top to the bottom in the variable display sections 206 to 208 while the symbols are scrolled. Provided in the lower right corner of the lower liquid crystal display 204 are a gamerate display section 223 for displaying the credit count required for one bet of the minimum bet unit for the player to bet using a BET button (described later), which will be hereinafter referred to as game rate, and a credit count display section 224 for displaying the current credit count owned by the player (one credit has the value of one dollar). The game rate set in the slot machine 201 according to the embodiment involves the three types of “one dollar (one credit),” “25 cents (0.25 credit),” and “five cents (0.05 credit) .” Usually, the game rate is set to “one dollar (one credit).” If the owned credit count falls below one credit, the game rate is lowered to “25 cents (0.25 credit)” or “five cents (0.05 credit) .”

The basic structure of the transparent liquid crystal display is already known and therefore will not be discussed here.

An operation table 210 projected to the front is provided below the lower liquid crystal display 204. A CHANGE button 211, a CASHOUT button 212, and a HELP button 213 are placed on the operation table 210 from the left to the right viewed from the position opposed to the front of the gaming machine. A coin insertion section 214 and a bill insertion section 215 are provided to the right of the HELP button 213. A 1-BET button 218, a REPEAT BET button 219, a 10-BET button 220, a MAXBET button 221, and a start button 217 are placed from the left on the front side of the operation table 210.

In the lower portion of the cabinet 202, a coin payout opening 230 is formed and a coin receiving tray 231 for receiving coins (for example, one-dollar coins) paid out from the coin payout opening 230 is provided. A coin detection section 276 including a sensor is placed in the coin payout opening 230 for detecting the number of coins paid out from the coin payout opening 230.

A receipt ejection opening 232 having a long-hole shape is provided on one side of the coin payout opening 230. The receipt ejection opening 232 is an ejection opening for printing out a receipt printing the current credit count owned by the player displayed on the credit count display section 224 when the player presses the CASHOUT button 212. In the second embodiment, a receipt is held in a state in which the receipt is ejected 30 mm (the length can be changed as desired) from the receipt ejection opening 232. The player draws out the held receipt and carries the receipt to a prize exchange place, whereby it is made possible for the player to exchange the receipt for a prize responsive to the credit count described on the receipt. In the slot machine 201 according to the embodiment, when the player presses the CASHOUT button 212, usually a receipt is used as payout, but as many coins as the number of coins corresponding to the credit count may be paid out from the coin payout opening 230 by a hopper 235 (described later).

Reels 225, 226, and 227 are provided for rotation in the center of the inside of the cabinet 202 when a front panel 222 provided on the front of the cabinet 202 is opened, as shown in FIG. 14. A symbol row including symbols is drawn on the outer peripheral surface of each of the reels 225, 226, and 227.

A change machine 236 and a power box unit 237 are provided on sides of the hopper 235 in the cabinet 202. A main switch 238 for turning on and off the power required for operating the slot machine 201 and a reset switch 239 for initializing the state of the slot machine 201 are provided on the front of the power box unit 237.

Further, a receipt print unit 240 is provided below the change machine 236, and as a receipt ejected from the receipt ejection opening 232, first the current credit count owned by the player is printed on roll paper (not shown) stored in the receipt print unit 240 on a printer (not shown). Then, the printed roll paper is transported from a transport opening 241 toward the receipt ejection opening 232 and is also cut to a predetermined length (for example, 100 mm) by a cutter (not shown) in the receipt print unit 240.

The CHANGE button 211 is a button pressed by the player to change a bill input to the bill insertion section 215, and coins into which a bill is changed by the internal change machine 236 are paid out to the coin receiving tray 231 from the coin payout opening 230 provided In the lower portion of the cabinet 202. A CHANGE switch 265 (described later) is disposed in the CHANGE button 211. As the CHANGE button 211 is pressed, a switch signal is output from the CHANGE switch 265 to a CPU 261.

The CASHOUT button 212 is a button pressed by the player usually when a game is over. When the CASHOUT button 212 is pressed, a paper receipt printing the current credit count owned by the player containing the credit gained by playing the game is sent from the receipt ejection opening 232. A CASHOUT switch 266 (described later) is disposed in the CASHOUT button 212. As the CASHOUT button 212 is pressed, a switch signal is output from the CASHOUT switch 266 to the CPU 261.

The HELP button 213 is a button pressed by the player when the player is not aware of the game operation manner. When the HELP button 213 is pressed, immediately a help screen providing various pieces of help information is displayed on the upper liquid crystal display 203. A HELP switch 267 (described later) is disposed in the HELP button 213. As the HELP button 213 is pressed, a switch signal is output from the HELP switch 267 to the CPU 261.

A coin sensor 274 (described later) is placed in the coin insertion section 214. When a coin of a predetermined denomination such as a one-dollar coin is input to the coin insertion section 214, a coin detection signal is output through the coin sensor 274 to the CPU 261. A bill sensor 275 is placed in the bill insertion section 215. When a bill is input to the bill insertion section 215, a bill detection signal is output through the bill sensor 275 to the CPU 261.

The 1-BET button 218 is a button to bet one at a time each time the player presses the 1-BET button 218. A 1-BET switch 268 (described later) is disposed in the 1-BET button 218. As the 1-BET button 218 is pressed, a switch signal is output from the 1-BET switch 268 to the CPU 261.

The REPEAT BET button 219 is a button for starting various display of the symbols on the variable display sections 206 to 208 of the lower liquid crystal display 204 to start a game according to the current bet count or the preceding bet count as the REPEAT BET button 219 is pressed. A repeat bet switch 269 (described later) is disposed in the REPEAT BET button 219. As the REPEAT BET button 219 is pressed, a switch signal is output from the repeat bet switch 269 to the CPU 261. The possible bet count as the REPEAT BET button 219 is pressed is in the range of 1 to 30 (MAX).

The 10-BET button 220 is a button to bet 10 at a time each time the player presses the 10-BET button 220. A 10-BET switch 270 (described later) is disposed in the 10-BET button 220. When the 10-BET button 220 is pressed, a switch signal is output from the 10-BET switch 270 to the CPU 261.

The MAXBET button 221 is a button for starting a game according to the maximum bet count per game, namely, 30 as the MAXBET button 221 is pressed. A MAXBET switch 271 (described later) is disposed in the MAXBET button 221. As the MAXBET button 221 is pressed, a switch signal is output from the MAXBET switch 271 to the CPU 261.

The start button 217 is a button for starting rotation of the reels 225, 226, and 227 based on the bet count entered by pressing any of the BET buttons 218 to 221. A start switch 272 is disposed in the start button 217. When the start button 217 is pressed, a switch signal generated from the start switch 272 is output to the CPU 261. The symbols scrolled in the variable display sections 206 to 208 are stopped in order starting at the variable display section 206 at the left of the front after the passage of a given time (in the second embodiment, about three seconds after the start button is pressed).

Subsequently, the reels provided for rotation in the cabinet 202 at the rear of the lower liquid crystal display 204 will be discussed.

At the lower liquid crystal display 204, the three reels 225 to 227 are supported side by side for rotation separately, and as the reels 225 to 227 are rotated, a base game and a free game (described later) are played. The left reel 225 viewed from the front of the slot machine 201 is opposed to the variable display section 206 formed on the lower liquid crystal display 204 (see FIGS. 13 and 14), the center reel 226 is opposed to the variable display section 207 formed on the lower liquid crystal display 204 (see FIGS. 13 and 14), and the right reel 227 is opposed to the variable display section 208 formed on the lower liquid crystal display 204 (see FIGS. 13 and 14).

Figure 15:
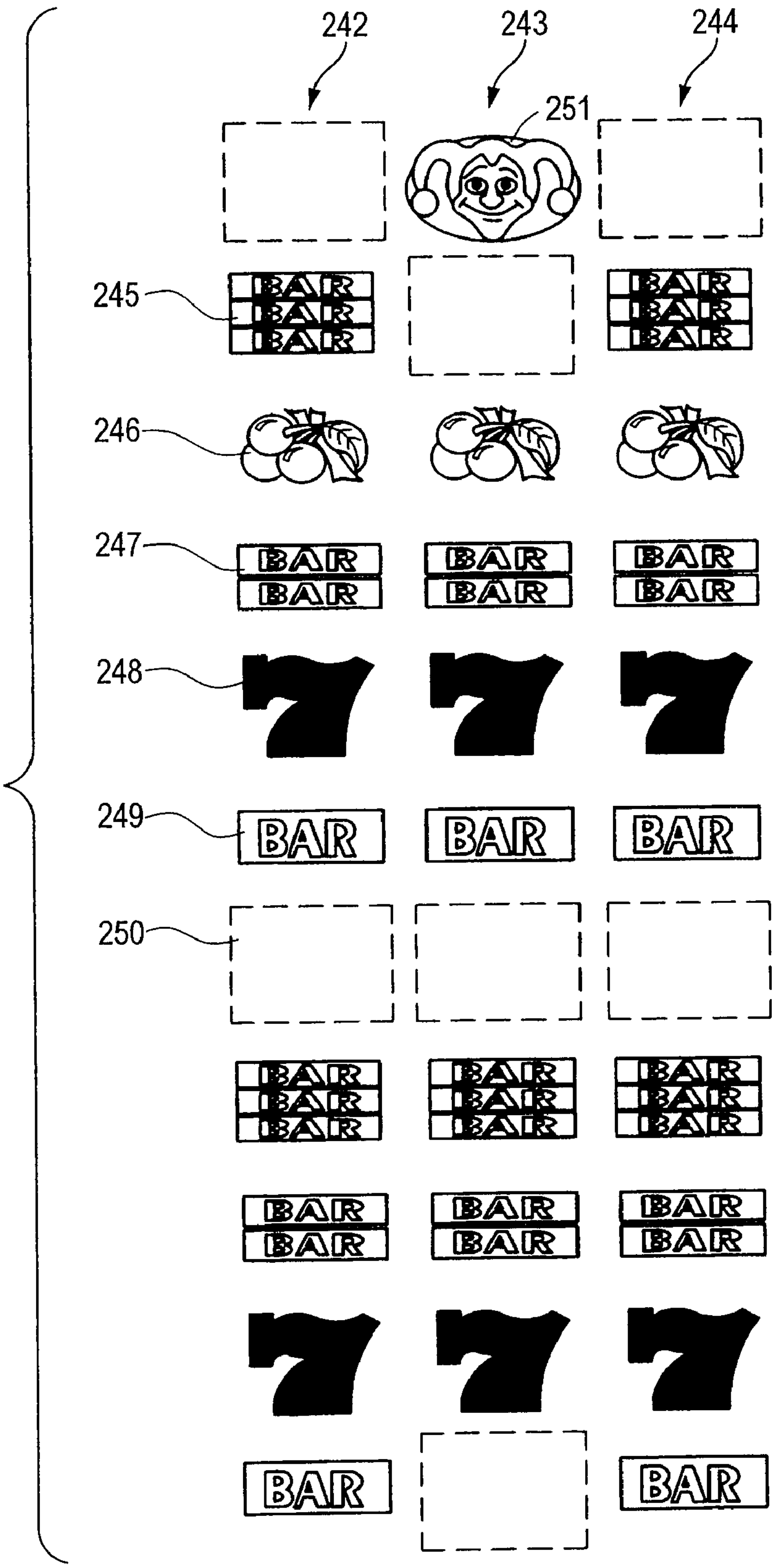
FIG. 15 is a schematic representation to schematically show symbol rows variably displayed in variable display sections according to the second embodiment.

Subsequently, the symbol rows drawn on the surfaces of the reels 225 to 227 and scrolled and variably displayed with rotation of the reels 225 to 227 in the variable display sections 206 to 208 will be discussed with reference to FIG. 15. FIG. 15 is a schematic drawing to show the symbol rows drawn on the reels 225 to 227.

In FIG. 15, a symbol row 42 is a symbol row variably displayed in the variable display section 206, a symbol row 243 is a symbol row variably displayed in the variable display section 207, and a symbol row 244 is a symbol row variably displayed in the variable display section 208.

To form various symbols on the peripheral surfaces of the reels 225 to 227, it is a common practice to previously print the symbols on long reel sheets each matching the width and the peripheral length of each of the reels 225 to 227 and then put the reel sheets on the peripheral surfaces of the reels 225 to 227. However, the symbols can be formed by any other method than the above-described method.

The symbol rows 242 and 244 have each the same symbol arrangement. Each of the symbol rows 242 and 244 includes 11 symbols as an appropriate combination of triple BAR 245, cherry 246, double BAR 247, seven 248, single BAR 249, and blank (area where no symbol exists) 250.

The symbol row 243 is the same as the symbol row 242, 244 in that it is provided by combining triple BAR 245, cherry 246, double BAR 247, seven 248, single BAR 249, and blank 250; it differs in that it further involves one trigger symbol 251. The trigger symbol 251 is a symbol to make a transition to a free game; when stop display is produced on an activated pay line L in the variable display section 207, a transition can be made to a free game.

The free game is a game played continuously after a base game is played; generally it is often an advantageous game for the player. When a transition is made to the free game, the player can play 10, 20, or 30 successive games in response to the rank of the free game without betting any credit. The free games include various advantageous games for the player following the base game, such as a bonus game and a second game.

If the symbol rows 242 to 244 scrolled in the variable display sections 206 to 208 are stopped on the display, the three symbols are stopped in the variable display sections. The symbols stopped on the display at the time are determined based on the result of internal lottery described later, and the reels 225 to 227 are stopped based on the result.

Various winning combinations are preset based on different types of combinations of the symbols and when the symbol combination corresponding to the winning combination stops on the activated pay line L (see FIG. 13), credit is added in response to the winning combination.

To play a game with the slot machine 201, a lottery table used in determining the winning combination by lottery and an award table based on the winning combinations will be discussed with reference to FIG. 16. FIG. 16 shows a lottery table of a winning combination in playing a base game and a free game. FIG. 17 shows an award table to show the award of credit based on each winning combination.

As shown in FIGS. 16 and 17, the range of random numbers used in the winning combination lottery table is 0 to 16383 and if the random number sampled through a random number sampling circuit 319 is in the range of 0 to 121, a trigger of a free game is won. In this case, the trigger symbol 251 is stopped on the activated pay line L in the variable display section 207 and if the game is a base game, a transition is made to a free game. On the other hand, if the game is a free game, the current number of free games is added.

If the random number sampled through the random number sampling circuit 319 is in the range of 122 to 353, a winning combination of seven (7) is won. In this case, seven 248 is stopped on the pay line L and the credit count based on the bet count and the current game rate is added as the award. That is, the bet count multiplied by the game rate multiplied by the award multiplying factor (×100) (for example, if the game is played as MAX (30) bet and at the one-dollar rate, 3000 credits) is added to as the award.

Likewise, if the sampled random number is in the range of 354 to 427, a winning combination of triple BAR is won. If the sampled random number is in the range of 428 to 473, a winning combination of double BAR is won. If the sampled random number is in the range of 474 to 825, a winning combination of single BAR is won. If the sampled random number is in the range of 826 to 1025, a winning combination of cherry is won.

The award multiplying factors of "×30 to ×2" are set for the winning combinations, and the credit count based on the bet count and the current game rate is added as the award (for example, if the winning combination of cherry is won and a game is played as 10 bets and at the 25-cent rate, five credits are added as the award).

If the sampled random number is in the range of 1026 to 16383, a failure is won. In this case, a failure symbol combination not corresponding to any winning combination described above is stopped on the pay line L and no credit is added as the award.

Figure 18:
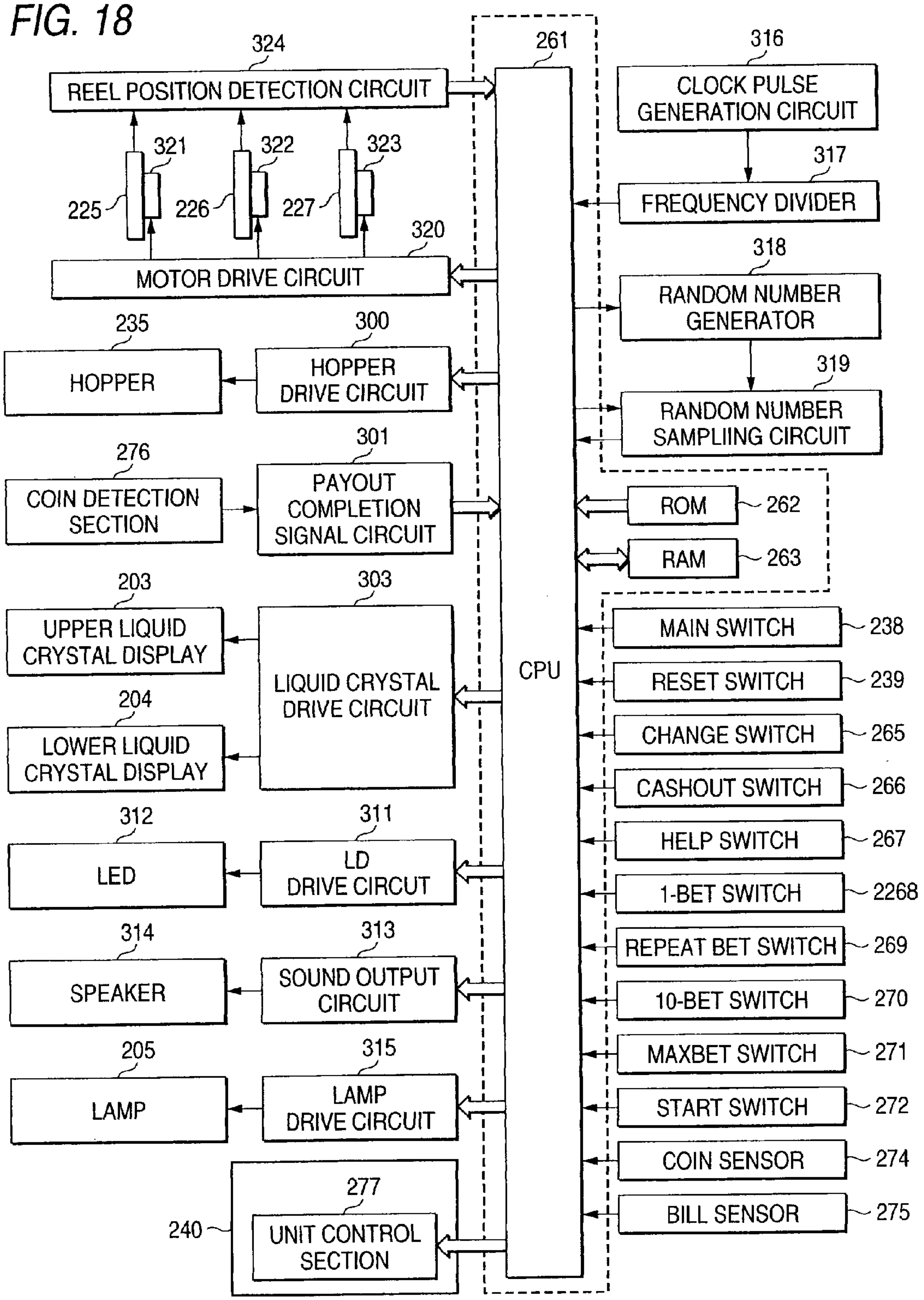
FIG. 18 is a block diagram to schematically show a control system of the slot machine according to the second embodiment.

Next, the configuration of a control system of the slot machine 201 will be discussed with reference to FIG. 18. FIG. 18 is a block diagram to schematically show the control system of the slot machine according to the second embodiment.

In FIG. 18, the control system of the slot machine 201 basically has the CPU 261 as the nucleus to which ROM 262 and RAM 263 are connected. The ROM 262 stores a main processing program described later, a base game processing program, a free game processing program, various effect programs for producing various effects on the upper liquid crystal display 203 and the lower liquid crystal display 204 with the progress of a game, the lottery table 255 for determining the stopped symbols of a base game and a free game by lottery (see FIG. 16), the award table 56 based on the winning combinations (see FIG. 17), and other various programs, data tables, etc., required for controlling the slot machine 201. The RAM 263 is memory for temporarily storing the current credit count owned by the player, the current game rate set in the slot machine 201, and various pieces of data on which the CPU 261 performed operations.

Figure 19:
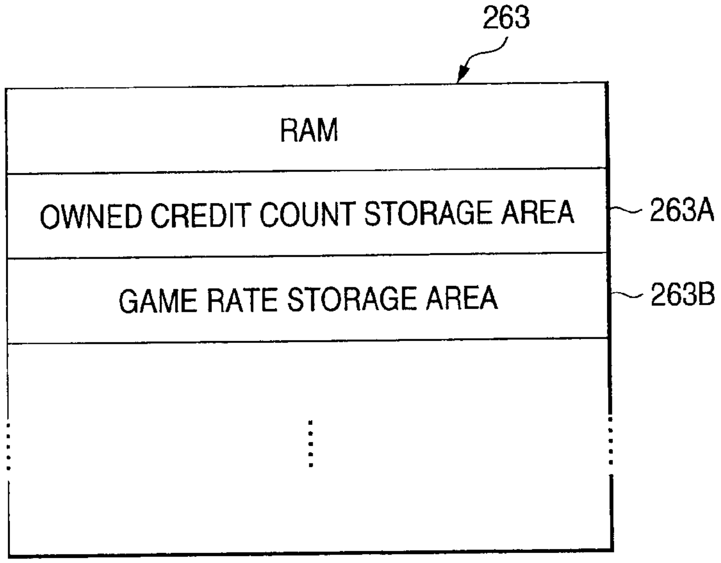
FIG. 19 is a schematic drawing to show storage areas of RAM of the slot machine according to the second embodiment.

FIG. 19 is a schematic drawing to show various storage areas provided in the RAM 263. As shown in FIG. 19, the RAM 263 is provided with an owned credit count storage area 263A for storing the current credit count owned by the player. It is also provided with a game rate storage area 263B for storing the current game rate of the slot machine 201. The current credit count owned by the player stored in the owned credit count storage area 263A is displayed on the credit count display section 224 of the lower liquid crystal display 204 (see FIG. 13). The current game rate stored in the game rate storage area 263B is displayed on the game rate display section 223 (see FIG. 13).

A clock pulse generation circuit 316 for generating a reference clock pulse and a frequency divider 317 are connected to the CPU 261, and a random number generator 318 for generating a random number and a random number sampling circuit 319 are also connected to the CPU 261. The random number sampled through the random number sampling circuit 319 is used for various lotteries of winning combinations and effects. Further, connected to the CPU 261 are the main switch 238, the reset switch 239, the CHANGE switch 265 added to the CHANGE button 211, the CASHOUT switch 266 added to the CASHOUT button 212, the HELP switch 267 added to the HELP button 213, the 1-BET switch 268 added to the 1-BET button 218, the repeat bet switch 269 added to the REPEAT BET button 219, the 10-BET switch 270 added to the 10-BET button 220, the MAXBET switch 271 added to the MAXBET button 221, and the start switch 272 added to the start button 217. The CPU 261 controls the slot machine to execute the corresponding operation based on the switch signal output from each switch as each button is pressed.

Three step motors 321 to 323 for rotating the reels 225 to 227 through a motor drive circuit 320 are connected to the CPU 261, and a reel position detection circuit 324 is also connected to the CPU 261. When the CPU 261 outputs a motor drive signal to the motor drive circuit 320, the step motors 321 to 323 are driven by the motor drive circuit 320. Accordingly, the reels 225 to 227 are rotated.

At this time, the number of drive pulses supplied to each of the step motors 321 to 323 after rotation of each of the reels 225 to 227 is started is calculated, and the calculation value is written into a predetermined area of the RAM 263. From each of the reels 225 to 227, a reset pulse is output every revolution and is input to the CPU 261 through the reel position detection circuit 324. When the result pulse is thus input to the CPU 261, the calculation value written into the RAM 263 is cleared to 0, and the CPU 261 recognizes the rotation position of the symbol on each of the reels 225 to 227 based on the calculation value corresponding to the rotation position within the range of one revolution of each of the reels 225 to 227 and a symbol table stored in the ROM 262 listing the correspondence between the rotation position of each of the reels 225 to 227 and the symbol formed on the peripheral surface of each of the reels 225 to 227.

Further, the coin sensor 274 placed in the coin insertion section 214 and the bill sensor 275 placed in the bill insertion section 215 are connected to the CPU 261. The coin sensor 274 detects a coin such as a one-dollar coin input from the coin insertion section 214, and the CPU 261 calculates the number of input coins based on the coin detection signal output from the coin sensor 274. The CPU 261 increments the credit count (one credit per dollar) stored in the owned credit count storage area 263A of the RAM 263 based on the calculated number of coins.

The bill sensor 275 detects the denomination of each bill input from the bill insertion section 215. The CPU 261 calculates the number of one-dollar coins equivalent to the denomination of the input bill based on the bill detection signal output from the bill sensor 275 (for example, if a 10-dollar bill is input, it is calculated as 10 one-dollar coins), and pays out 10 one-dollar coins to the player through the hopper 235.

The hopper 235 is connected to the CPU 261 through a hopper drive circuit 300. When the CPU 261 outputs a drive signal to the hopper drive circuit 300, the hopper 235 pays out a predetermined number of coins from the coin payout opening 230.

The coin detection section 276 is connected to the CPU 261 through a payout completion signal circuit 301. The coin detection section 276 is placed in the coin payout opening 230. If the coin detection section 276 detects that a predetermined number of coins have been paid out from the coin payout opening 230, the coin detection section 276 outputs a coin payout detection signal to the payout completion signal circuit 301, which then outputs a payout completion signal to the CPU 261. Further, the upper liquid crystal display 203 and the lower liquid crystal display 204 are connected to the CPU 261 through a liquid crystal drive circuit 303 and are controlled by the CPU 261.

Figure 20:
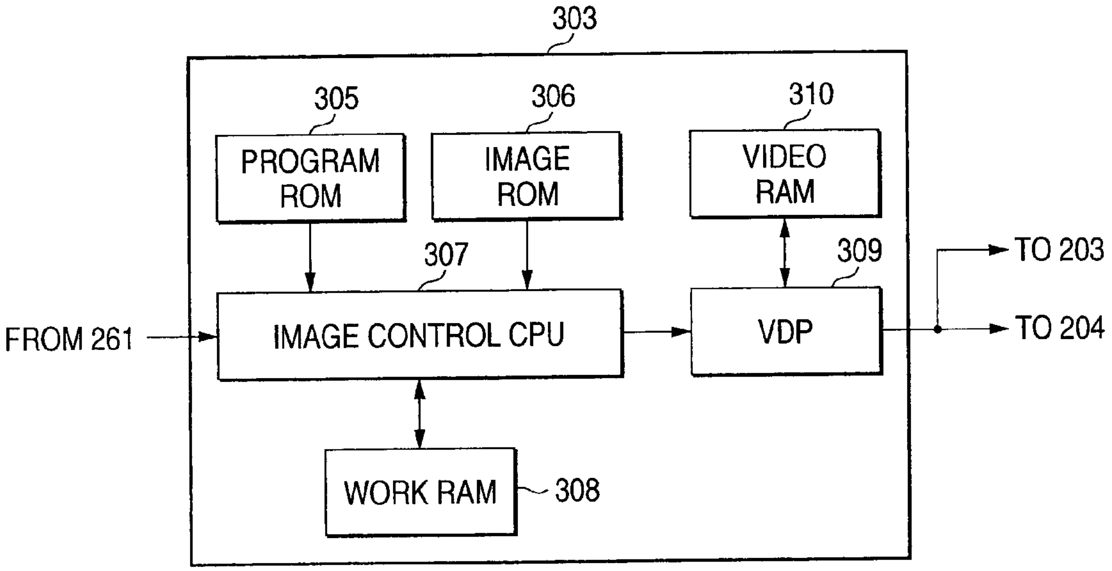
FIG. 20 is a block diagram to schematically show a liquid crystal drive circuit of an upper liquid crystal display and a lower liquid crystal display.

The liquid crystal drive circuit 303 includes program ROM 305, image ROM 306, an image control CPU 307, work RAM 308, a VDP (Video Display Processor) 309, and video RAM 310, as shown in FIG. 20. The program ROM 305 stores an image control program and various selection tables involved in display on the upper liquid crystal display 203 and the lower liquid crystal display 204. The image ROM 306 stores dot data to form images to be displayed on the upper liquid crystal display 203 and the lower liquid crystal display 204, for example. The image control CPU 307 determines the images to be displayed on the upper liquid crystal display 203 and the lower liquid crystal display 204 from among the dot data previously stored in the image ROM 306 in accordance with the image control program previously stored in the program ROM 305 based on the parameters set in the CPU 261. The work RAM 308 is provided as temporary storage means for the image control CPU 307 to execute the image control program. The VDP 309 forms an image responsive to the display contents determined by the image control CPU 307 and outputs the image to the upper liquid crystal display 203 and the lower liquid crystal display 204. The video RAM 310 is provided as temporary storage means for the VDP 309 to form an image.

LEDs 312 are also connected to the CPU 261 through an LED drive circuit 311. A large number of LEDs 312 are disposed on the front of the slot machine 201 and are lighted under the control of the LED drive circuit 311 based on a drive signal from the CPU 261 in producing various effects. A sound output circuit 313 and a speaker 314 are also connected to the CPU 261. The speaker 314 produces various effect sounds in producing various effects based on an output signal from the sound output circuit 313. Further, a lamp drive circuit 315 and a lamp 205 are connected to the CPU 261 for lighting the lamp 205 based on an output signal from the lamp drive circuit 315.

A receipt print unit 240 is also connected to the CPU 261. The receipt print unit 240 is a unit including a paper transport unit, a printer, and a cutter, and a unit control section 277 controls the receipt print unit 240 based on a command transmitted from the CPU 261. Specifically, as a signal of the CASHOUT switch 266 is input, the CPU 261 transmits a command for starting to transport paper, and the unit control section 277 starts transporting roll paper by the paper transport unit. Further, the CPU 261 transmits data of the credit count to be printed on paper based on the credit count stored in the owned credit count storage area 263A of the RAM 263, and the unit control section 277 controls the printer to print the corresponding credit count on roll paper. When roll paper of a predetermined length has been transported, the unit control section 277 drives the cutter for cutting the roll paper and creates a receipt printing the game play result.

Figure 21:
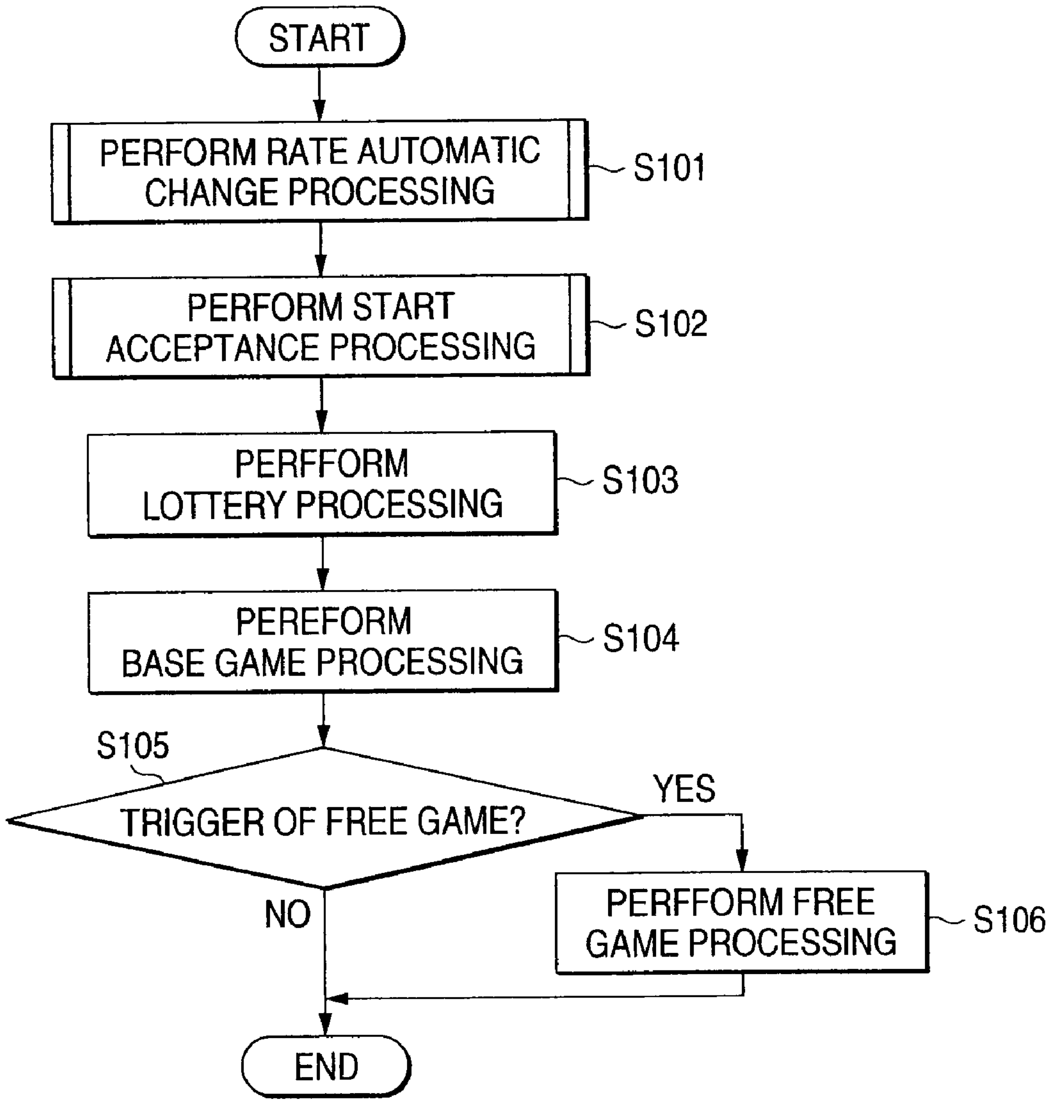
FIG. 21 is a flowchart of a main processing program of the slot machine according to the second embodiment.

Subsequently, the main processing program executed in the slot machine 201 will be discussed with reference to FIG. 21. FIG. 21 is a flowchart of the main processing program of the slot machine 201 according to the embodiment. Programs shown below in flowcharts of FIGS. 21 to 24 are stored in the ROM 262 and the RAM 263 included in the slot machine 201 and are executed by the CPU 261.

First, at step 101 (S101), rate automatic change processing is performed. In this processing, if the current credit count owned by the player is less than the game rate (the credit count required for one bet of the minimum bet unit for the player to bet (in the embodiment, usually one credit)), the game rate is changed in response to the owned credit count. Then, the process proceeds to S102.

Next, at S102, start acceptance processing is performed. This processing is processing of accepting a switch signal output from the start switch 272, the repeat bet switch 269, the 1-BET switch 268, the 10-BET switch 270, or the MAXBET switch 271 based on operation of the start button 217, operation of the REPEAT BET button 219, operation of the 1-BET button 218, operation of the 10-BET button 220, or operation of the MAXBET button 221. When the switch signal output from the repeat bet switch 269, the MAXBET switch 271, or the start switch 272 is accepted, a game is started.

Subsequently, at S103, various types of lottery processing is performed based on the switch signal output from the start switch 272, the repeat bet switch 269, the 1-BET switch 268, the 10-BET switch 270, or the MAXBET switch 271. Specifically, a lottery of a winning combination in a base game played using the variable display sections 206 to 208 is held using the random number sampled in the random number sampling circuit 319 and the lottery table 255 (see FIG. 16), and the symbols to be stopped on the display are determined.

At S104, base game processing (variable display and stop display of symbols, and credit payout) is performed. At S105, whether or not the player wins a trigger of a free game (trigger symbol 251 (see FIG. 15)) is determined at the result of the lottery at S103.

If the player does not win a trigger of a free game (NO at S105), the main processing is terminated. On the other hand, if the player wins a trigger of a free game (YES at S105), the number of free games that can be played successively by the player is determined and then free game processing is performed (S106). After the free game processing is performed, the main processing is terminated.

The number of free games generally is preset as 10 games, 20 games, or 30 games.

Figure 22:
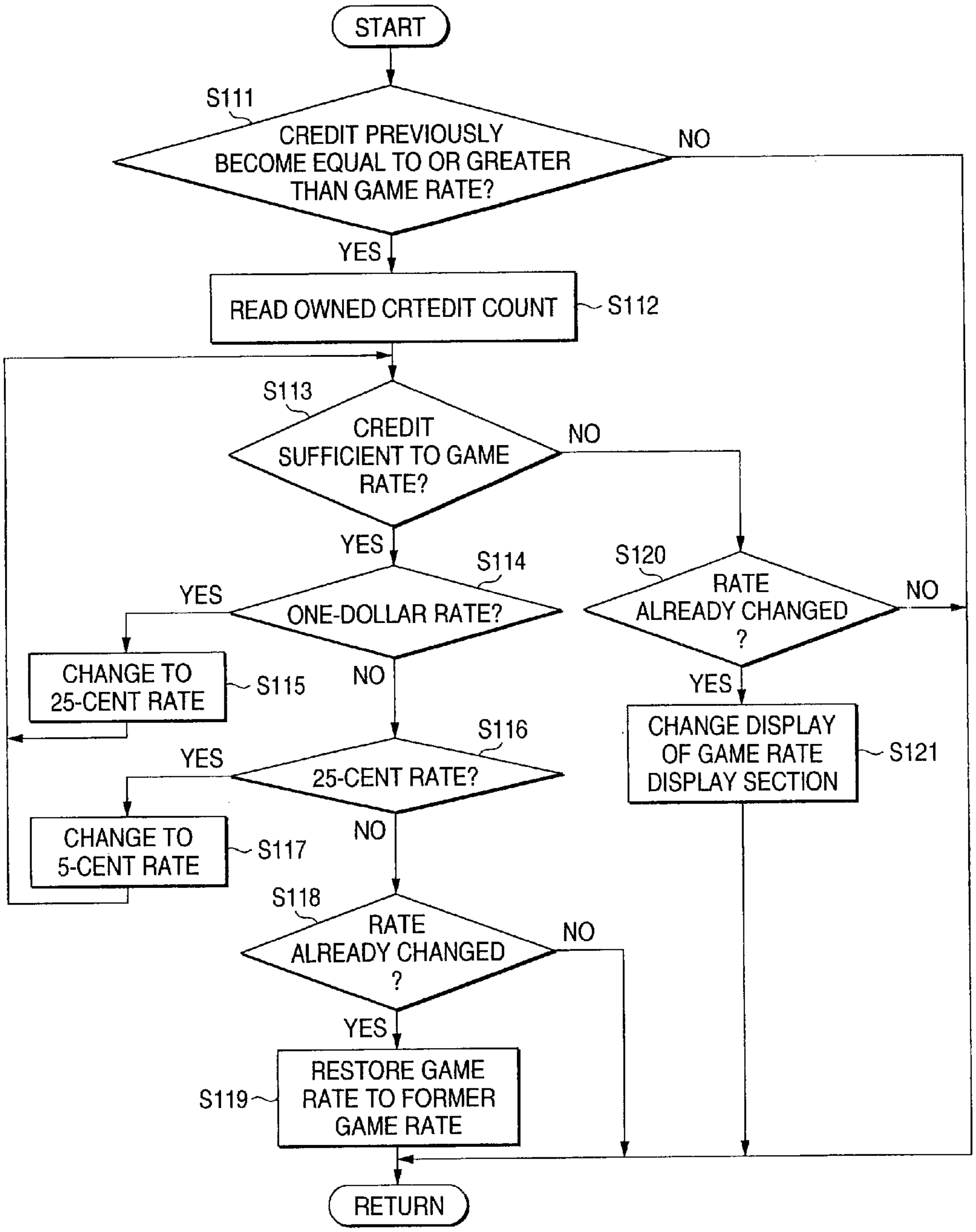
FIG. 22 is a flowchart of a rate automatic change processing program of the slot machine according to the second embodiment.

Next, the rate automatic change processing program at S101 executed in the slot machine 201 will be discussed with reference to FIG. 22. FIG. 22 is a flowchart of the rate automatic change processing program according to the embodiment. In the rate automatic change processing, if the current credit count owned by the player is less than the game rate (the credit count required for one bet of the minimum bet unit for the player to bet (in the embodiment, usually one credit)), the game rate is changed in response to the owned credit count.

First, at S111, whether or not the owned credit of the player previously became one credit or more is determined. The reason why this determination is made is that if the current player does not input one dollar or more from the beginning, lowering the game rate is contrary to the significance of the invention for enabling the player to play a game using a faction of the credit occurring as the result of the game.

If it is not determined that the owned credit previously became one credit or more (NO at S111), the rate automatic change processing is exited and the subroutine is returned to the main processing.

On the other hand, if it is determined that the owned credit previously became one credit or more (YES at S111), subsequently the current credit count owned by the player stored in the owned credit count storage area 263A of the RAM 263 is read (S112).

Further, the CPU 261 compares between the read owned credit count and the credit count corresponding to the current setup game rate (the initial value is one credit) for determining whether or not the owned credit is sufficient for the credit count of the game rate (S113). The initial value of the credit count set as the game rate is "one credit (one dollar)," but may be changed to "0.25 credit (25 cents)" or "0.05 credit (five cents)" exceptionally as game rate change processing described later is performed.

If it is determined that the owned credit is insufficient to the game rate (YES at S113), subsequently whether or not the current game rate set in the slot machine 201 is "one dollar (one credit)" is determined (S114). The current game rate of the slot machine 201 is derived by reading the value stored in the game rate storage area 263B of the RAM 263.

If the current game rate is one dollar (YES at S114), the game rate is changed from "one dollar (one credit)" to "25 cents (0.25 credit)" at S15. Specifically, the game rate stored in the game rate storage area 263B of the RAM 263 is updated to "25 cents." Accordingly, the credit consumed per bet is changed to 0.25 credit exceptionally.

On the other hand, if the current game rate is not determined the one-dollar rate (NO at S114) and is determined the 25-cent rate (YES at S116), the current game rate is changed from "25 cents (0.25 credit)" to "five cents (0.05 credit)" at S117. Specifically, the game rate stored in the game rate storage area 263B of the RAM 263 is updated to "five cents." Accordingly, the credit consumed per bet is changed to 0.05 credit exceptionally.

Further, if the current game rate is not determined the 25-cent rate (NO at S116), namely, is determined the five-cent rate, subsequently whether or not the game rate is changed at S115 or S117 is determined (S118). If it is determined that the game rate is changed (YES at S118), the game rate is restored to the former game rate (S119). Then, the rate automatic change processing is exited and the subroutine is returned to the main processing.

On the other hand, if it is not determined that the game rate is changed (NO at S118), the game rate is not changed and the rate automatic change processing is exited and the subroutine is returned to the main processing.

If the game rate is set to five cents, when it is determined that the owned credit is insufficient to the required credit count (YES at S113), the game rate cannot be lowered any more and therefore the player needs to input a new coin to start playing a game.

If it is determined that the owned credit is sufficient for the required credit count (NO at S113), subsequently whether or not the game rate is changed at S115 or S117 is determined (S120). If it is determined that the game rate is changed (YES at S120), the display of the game rate display section 223 of the lower liquid crystal display 204 is changed based on the new game rate (S121).

On the other hand, if it is not determined that the game rate is changed (NO at S120), the rate automatic change processing is exited and the subroutine is returned to the main processing.

Figure 23:
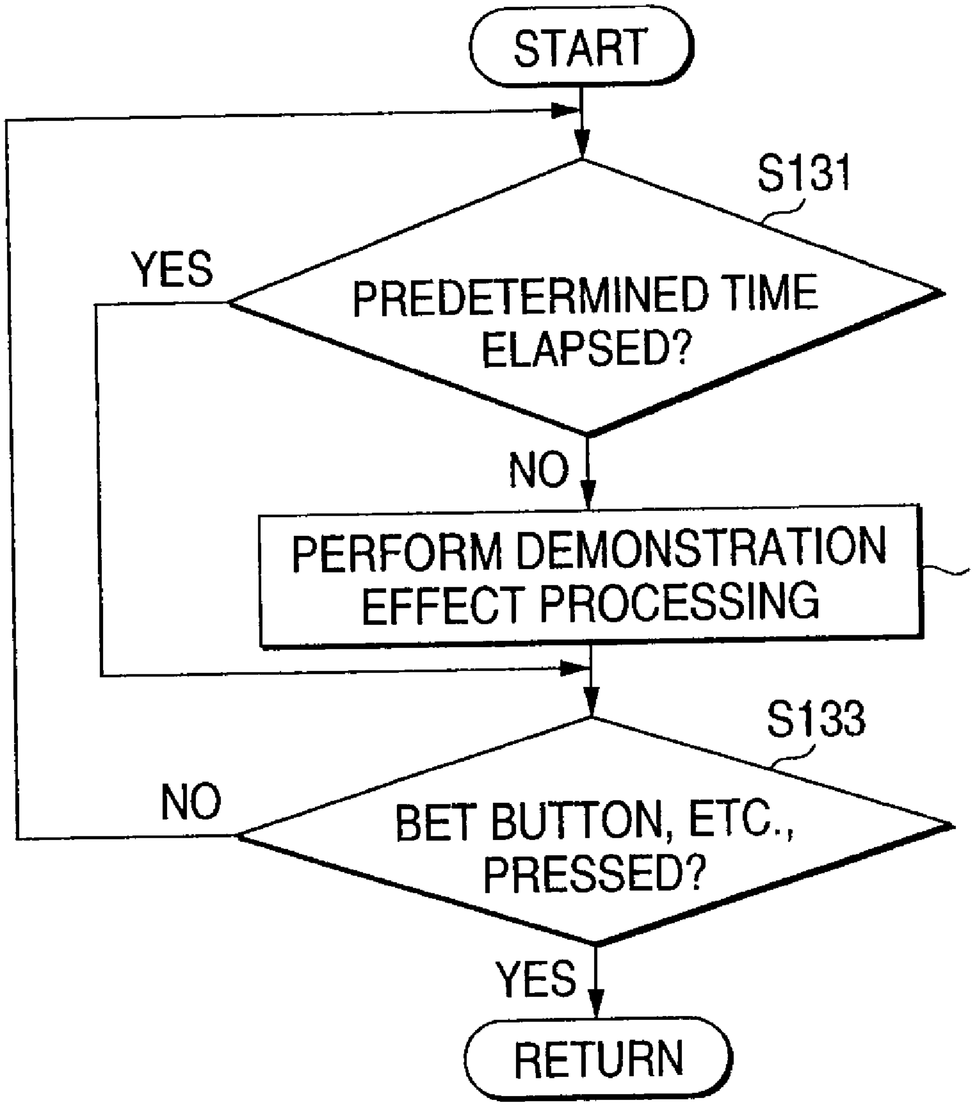
FIG. 23 is a flowchart of a start acceptance processing program of the slot machine according to the second embodiment.

Subsequently, the start acceptance processing program at S102 executed in the slot machine 201 will be discussed with reference to FIG. 23. FIG. 23 is a flowchart of the start acceptance processing program according to the second embodiment.

First, at S131, whether or not a predetermined time (in the second embodiment, 15 seconds) has elapsed is determined. If it is not determined that the predetermined time has elapsed (NO at S131), the process proceeds to S33. On the other hand, if it is determined that the predetermined time has elapsed (YES at S131), demonstration effects are produced on the upper liquid crystal display 203 and the lower liquid crystal display 204 at S132 and then the process proceeds to S133.

At S133, whether or not the player operates the start button 217, the REPEAT BET button 219, or the MAXBET button 231 is determined. If the player operates the start button 217, a game is started according to the bet count set with the 1-BET button 218 and the 10-BET button 220 and at the game rate changed by performing the rate automatic change processing at S101. If the player operates the REPEAT BET button 219, a game is started according to the same bet count as set in the preceding game and at the game rate changed by performing the rate automatic change processing at S101. If the player operates the MAXBET button 221, a game is started according to the maximum bet count allowed in one game (in the embodiment, 30 bets) and at the game rate changed by performing the rate automatic change processing at S101.

If it is determined that the player does not operate any of the buttons (NO at S133), the process proceeds to S131 and the above-described processing is repeated. On the other hand, if it is determined that the player operates any of the buttons (YES at S133), the subroutine is returned to the main processing program in FIG. 21 (S103) even if the demonstration is being executed.

As described above, in the slot machine 201 according to the second embodiment, if the current credit count owned by the player is less than the usual game rate set at present (the credit count required for one bet of the minimum bet unit for the player to bet (in the embodiment, one credit)) (YES at S113), the current game rate set in the slot machine 201 is changed from the usual rate to the lower game rate exceptionally in response to the credit count owned by the player (S115 and S117), so that if a fraction occurs in the owned credit (for example, when the usual game rate is one dollar, if 0.5 credit is left), the player can spend all credit to play a game without the need for moving to any other gaming machine adopting a lower game rate. Therefore, the convenience of the player is improved. On the other hand, for the game arcade, it is not feared that the player may change the game rate freely, so that it is not feared either that the profit may be remarkably decreased as the player continues playing a game only at a low game rate; a given profit is secured.

If it is determined that the current owned credit count is insufficient to the credit count set for the current game rate (YES at S113), first the current game rate is lowered to the game rate closest to the current game rate among the preset game rates (in the second embodiment, the three types of "one dollar," "25 cents," and "five cents") and again whether or not the current owned credit count is insufficient to the setup credit count is checked (S113). Thus, if a fraction occurs in the stored credit count, it is made possible for the player to play a game under the game play condition closest to the condition desired by the player.

Further, the current game rate set in the slot machine 201 is displayed on the gamerate display section 223 of the lower liquid crystal display 204, so that if the game rate changes, the player can be informed that the game rate changes. Therefore, if the game rate is changed against player's will, there is no fear that the player may be given an unforeseen disadvantage.

It is to be understood that the present invention is not limited to the second embodiment thereof and various improvements and modifications may be made without departing from the spirit and the scope of the present invention.

For example, in the second embodiment, the game rate is changed in response to the owned credit of the player from among the predetermined game rates (in the second embodiment, the three types of "one dollar," "25 cents," and "five cents"), but the current owned credit of the player may be set intact as the game rate. That is, usually the minimum credit unit consumed for the player to bet is one credit, but if the owned credit of the player at the game start time becomes 0.3 credit left, the game rate may be changed from one credit to 0.3 credit exceptionally by performing the rate automatic change processing (S101).

Accordingly, the player can surely spend all credit regardless of what count the current credit fraction is. Therefore, the convenience of the player is more improved.

In the embodiment, a winning combination is determined by lottery based on the lottery table shown in FIG. 16, but the stopped symbol may be determined by lottery for each variable display section.

Specifically, a correspondence table between the symbols on the symbol rows 242 to 244 variably displayed on the variable display sections 206 to 208 used with a game and code numbers is provided, and a lottery table listing the correspondence between the code numbers of the symbols on each symbol row and random numbers is provided. The symbol to be stopped on the pay line L is determined by lottery for each variable display section and the corresponding winning combination is detected based on the stopped symbols and if the player wins the game, the award is determined.

In the slot machine according to the second embodiment, if the player presses the CASHOUT button 212, a receipt describing the credit count is ejected as payout, but as many coins as the number of coins corresponding to the credit count may be paid out using the hopper 235. At the time, the part corresponding to the credit less than the denomination of the used coin is discarded (for example, if 1.25 credit is to be paid out from a slot machine that can accept only one-dollar coins, only a one-dollar coin corresponding to one credit is paid out).

Third Embodiment

Figure 24:
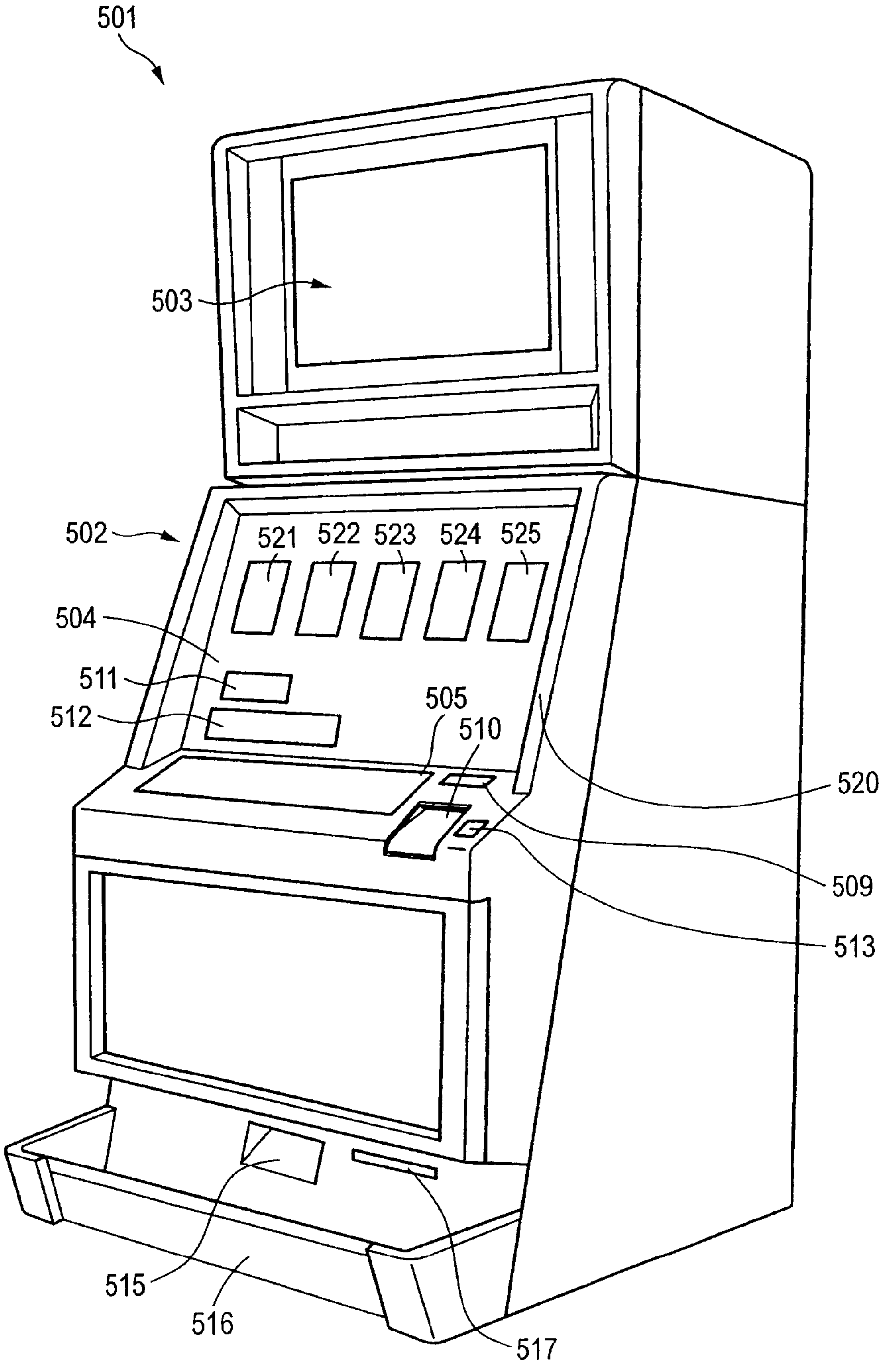
FIG. 24 is a perspective view to show the appearance of a slot machine according to a third embodiment.
Figure 25:
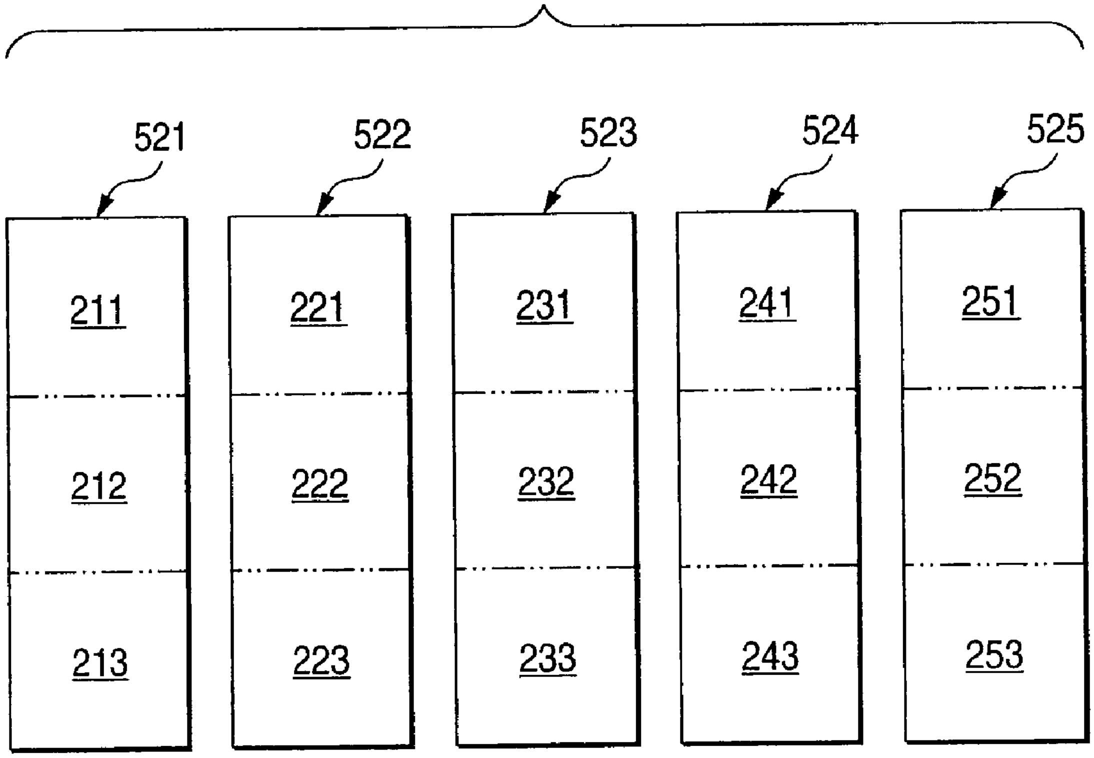
FIG. 25 is a front view to show variable display sections of the slot machine according to the third embodiment.
Figure 26:
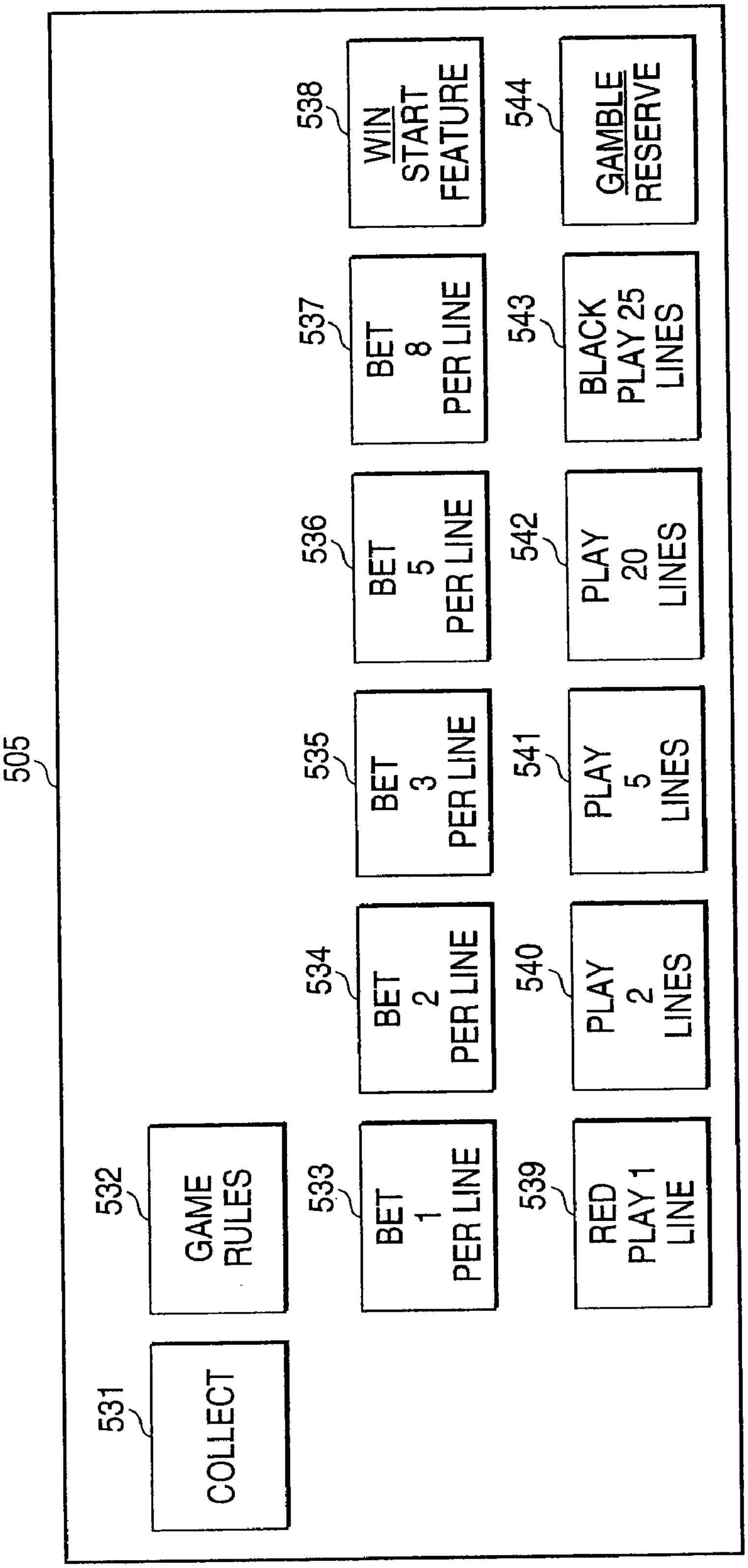
FIG. 26 is a front view to show an operation table of the slot machine according to the third embodiment.
Figure 27:
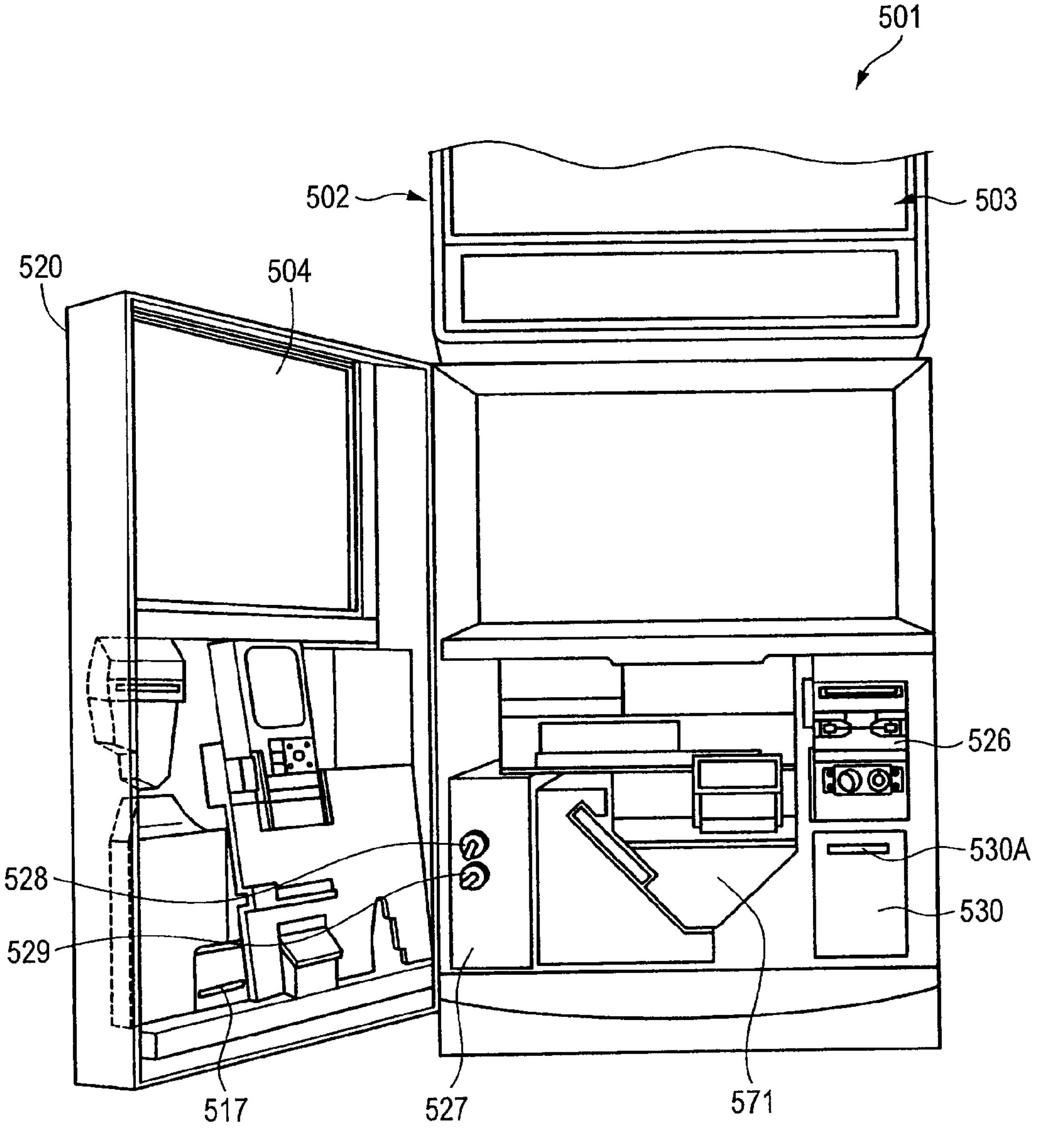
FIG. 27 is a front view to show the internal structure of a cabinet of the slot machine according to the third embodiment.

A slot machine according to the third embodiment will be discussed in detail with reference to the accompanying drawings. To begin with, the schematic configuration of the slot machine according to the embodiment will be discussed based on FIGS. 24 to 27. FIG. 24 is a perspective view to show the appearance of the slot machine according to the third embodiment. FIG. 25 is a front view to show variable display sections of the slot machine according to the third embodiment. FIG. 26 is a front view to show an operation table of the slot machine according to the third embodiment. FIG. 27 is a front view to show the internal structure of a cabinet of the slot machine according to the third embodiment.

In FIG. 24, a slot machine 501 has a cabinet 502 forming the periphery of the slot machine, and an upper liquid crystal display 503 is disposed on the front top of the cabinet 502. A lower liquid crystal display 504 is disposed on a front panel 520 provided in the front center of the cabinet 502. The upper liquid crystal display 503 is implemented as a generally used liquid crystal display, and the lower liquid crystal display 504 is also implemented as a generally used liquid crystal display.

The upper liquid crystal display 503 displays game information concerning a gaming manner, the types of winning combinations and their awards, and various effects, concerning the game. The lower liquid crystal display 504 displays the current credit owned by the player and produces five variable display sections 521, 522, 523, 524, and 525 in the vicinity of the center of the lower liquid crystal display 504. Various symbols (described later) are variably displayed from the top to the bottom while the symbols are scrolled, and then are stopped in the variable display sections 521 to 525. Provided in the lower left corner of the lower liquid crystal display 504 are a game rate display section 511 for displaying the credit count per bet required for the player to activate a pay line using a BET button (described later), which will be hereinafter referred to as game rate, and an owned credit count display section 512 for displaying the current credit count owned by the player (one credit has the value of one dollar).

The slot machine 501 of the embodiment is a video slot machine for the player to play a slot game (including two game modes of base game and bonus game) with video reels displayed on the variable display sections 521 to 525 of the lower liquid crystal display 504. In the slot game according to the embodiment (base game and bonus game), three symbols are stopped on each of the variable display sections 521 to 525 (15 symbols in total).

Specifically, as shown in FIG. 25, each of the variable display sections 521 to 525 is divided into a first stop display area 711, 721, 731, 741, 751, a second stop display area 712, 722, 732, 742, 752, and a third stop display area 713, 723, 733, 743, 753, and the symbols are stopped in the stop display areas 711 to 713, 721 to 723, 731 to 733, 741 to 743, and 751 to 753.

In the slot game (base game and bonus game), there are 25 pay lines each including five areas of the stop display areas 711 to 713, 721 to 723, 731 to 733, 741 to 743, and 751 to 753. If each pay line is activated, when the symbols are stopped and form a specific symbol combination on the pay line, an award is given to the player. The pay lines will be discussed.

A first pay line L1 is formed of the second stop display areas 712, 722, 732, 742, and 752. A second pay line L2 is formed of the first stop display areas 711, 721, 731, 741, and 751. A third pay line L3 is formed of the third stop display areas 713, 723, 733, 743, and 753. A fourth pay line L4 is formed of the first stop display areas 711, 721, 731, and 741 and the third stop display area 753. A fifth pay line L5 is formed of the first stop display area 751 and the third stop display areas 713, 723, 733, and 743. A sixth pay line L6 is formed of the first stop display areas 711, 721, 731, and 741 and the second stop display area 752. A seventh pay line L7 is formed of the second stop display area 752 and the third stop display areas 713, 723, 733, and 743. An eighth pay line L8 is formed of the first stop display areas 711, 721, 731, and 751 and the second stop display area 742. A ninth pay line L9 is formed of the second stop display area 742 and the third stop display areas 713, 723, 733, and 753. A tenth pay line L10 is formed of the first stop display areas 711, 721, and 731 and the third stop display areas 743 and 753. An eleventh pay line L11 is formed of the first stop display areas 741 and 751 and the third stop display areas 713, 723, and 733. A twelfth pay line L12 is formed of the first stop display areas 711, 721, 731, and 751 and the third stop display area 743. A thirteenth pay line L13 is formed of the first stop display area 741 and the third stop display areas 713, 723, 733, and 753. A fourteenth pay line L14 is formed of the first stop display areas 741 and 751 and the second stop display areas 712, 722, and 732. A fifteenth pay line L15 is formed of the second stop display areas 712, 722, and 732 and the third stop display areas 743 and 753. A sixteenth pay line L16 is formed of the first stop display area 741 and the second stop display areas 712, 722, 732, and 752. A seventeenth pay line L17 is formed of the second stop display areas 712, 722, 732, and 752 and the third stop display area 743. An eighteenth pay line L18 is formed of the first stop display area 751 and the second stop display areas 712, 722, 732, and 742. A nineteenth pay line L19 is formed of the second stop display areas 712, 722, 732, and 742 and the third stop display area 753. A twentieth pay line L20 is formed of the first stop display areas 741 and 751, the second stop display areas 712 and 722, and the third stop display area 733. A twenty-first pay line L21 is formed of the first stop display area 731, the second stop display areas 712 and 722, and the third stop display areas 743 and 753. A twenty-second pay line L22 is formed of the first stop display areas 721 and 741, the second stop display area 712, and the third stop display areas 733 and 753. A twenty-third pay line L23 is formed of the first stop display areas 731 and 751, the second stop display area 712, and the third stop display areas 723 and 743. A twenty-fourth pay line L24 is formed of the first stop display areas 711 and 731 and the third stop display areas 723, 743, and 753. A twenty-fifth pay line L25 is formed of the first stop display areas 721, 741, and 751 and the third stop display areas 713 and 733.

Here, the pay line of the 25 pay lines set as an activated pay line on which the player bets a predetermined credit count by performing bet operation (described later) is called "activated pay line."

An operation table 505 projected to the front is provided below the lower liquid crystal display 504. As shown in FIG. 26, a COLLECT button 531 and a GAME RULES button 532 are placed from the left to the right at the top stage of the operation table 505; a BET 1 PER LINE button 533, a BET 2 PER LINE button 534, a BET 3 PER LINE button 535, a BET 5 PER LINE button 536, a BET 8 PER LINE button 537, and a WIN START FEATURE button 538 are placed from the left to the right at the middle stage; and a RED PLAY 1 LINE button 539, a PLAY 2 LINES button 540, a PLAY 5 LINES button 541, a PLAY 20 LINES button 542, a BLACK PLAY 25 LINES button 543, and a GAMBLE RESERVE button 544 are disposed from the left to the right at the bottom stage. As shown in FIG. 24, a coin insertion section 509, a bill insertion section 510, and a game rate change button 513 are provided to the right of the operation table 505.

The COLLECT button 531 is a button pressed by the player usually when a game is over. When the COLLECT button 531 is pressed, a receipt describing the current credit count owned by the player is ejected from a receipt ejection opening 517 (described later). A COLLECT switch 545 is disposed in the COLLECT button 531. As the COLLECT button 531 is pressed, a switch signal is output to a CPU 550 (see FIG. 30).

The GAME RULES button 532 is a button pressed by the player when the player is not aware of the game operation manner. When the GAME RULES button 532 is pressed, various pieces of help information are displayed on the upper liquid crystal display 503 and the lower liquid crystal display 504. A GAME RULES switch 546 is disposed in the GAME RULES button 532. As the GAME RULES button 532 is pressed, a switch signal is output from the GAME RULES switch 546 to the CPU 550 (see FIG. 30).

A coin sensor 549 is placed in the coin insertion section 509. When a coin of a predetermined denomination such as a one-dollar coin is input to the coin insertion section 509, a coin detection signal is output through the coin sensor 549 to the CPU 550 (see FIG. 30) and the credit count corresponding to the input coin is added. A bill validation unit 526 including a bill sensor 567 is placed in the bill insertion section 510 (see FIG. 27). When a bill is input to the bill insertion section 510, the bill validation unit 526 determines the validity of the bill and outputs a bill detection signal through the bill sensor 567 to the CPU 550 (see FIG. 30) and the credit count corresponding to the input bill is added.

The BET 1 PER LINE button 533 is a button to bet the current credit owned by the player one at a time on each activated pay line each time the player presses the BET 1 PER LINE button 533. A 1-BET switch 557 is disposed in the BET 1 PER LINE button 533. As the BET 1 PER LINE button 533 is pressed, a switch signal is output from the 1-BET switch 557 to the CPU 550 (see FIG. 30). The BET 2 PER LINE button 534 is a button to start a game with two bets on each activated pay line as the player presses the BET 2 PER LINE button 534. A 2-BET switch 558 is disposed in the BET 2 PER LINE button 534. When the BET 2 PER LINE button 534 is pressed, a switch signal is output from the 2-BET switch 558 to the CPU 550 (see FIG. 30).

The BET 3 PER LINE button 535 is a button to start a game with three bets on each activated pay line as the player presses the BET 3 PER LINE button 535. A 3-BET switch 559 is disposed in the BET 3 PER LINE button 535. When the BET 3 PER LINE button 535 is pressed, a switch signal is output from the 3-BET switch 559 to the CPU 550 (see FIG. 30). The BET 5 PER LINE button 536 is a button to start a game with five bets on each activated pay line as the player presses the BET 5 PER LINE button 536. A 5-BET switch 560 is disposed in the BET 5 PER LINE button 536. As the BET 5 PER LINE button 536 is pressed, a switch signal is output from the 5-BET switch 560 to the CPU 550 (see FIG. 30).

The BET 8 PER LINE button 537 is a button to start a game with eight bets on each activated pay line as the player presses the BET 8 PER LINE button 537. An 8-BET switch 561 is disposed in the BET 8 PER LINE button 537. When the BET 8 PER LINE button 537 is pressed, a switch signal is output from the 8-BET switch 561 to the CPU 550 (see FIG. 30).

Therefore, there can be one, two, three, five, and eight bets as the bet counts that can be bet as the player presses the BET 1 PER LINE button 533, the BET 2 PER LINE button 534, the BET 3 PER LINE button 535, the BET 5 PER LINE button 536, and the BET 8 PER LINE button 537.

The WIN START FEATURE button 538 is a button to start a bonus game (described later) or add the award gained in the bonus game to the credit. A WIN START switch 547 is disposed in the WIN START FEATURE button 538. When the WIN START FEATURE button 538 is pressed, a switch signal is output from the WIN START switch 547 to the CPU 550 (see FIG. 30).

The RED PLAY 1 LINE button 539 is a button to start a game with the number of activated pay lines as "one" as the player presses the RED PLAY 1 LINE button 539. A 1-LINE switch 562 is disposed in the RED PLAY 1 LINE button 539. As the RED PLAY 1 LINE button 539 is pressed, a switch signal is output from the 1-LINE switch 562 to the CPU 550 (see FIG. 30).

The PLAY 2 LINES button 540 is a button to start a game with the number of activated pay lines as "two" as the player presses the PLAY 2 LINES button 540. A 2-LINES switch 563 is disposed in the PLAY 2 LINES button 540. As the PLAY 2 LINES button 540 is pressed, a switch signal is output from the 2-LINES switch 563 to the CPU 550 (see FIG. 30).

The PLAY 5 LINES button 541 is a button to start a game with the number of activated pay lines as "five" as the player presses the PLAY 5 LINES button 541. A 5-LINES switch 564 is disposed in the PLAY 5 LINES button 541. As the PLAY 5 LINES button 541 is pressed, a switch signal is output from the 5-LINES switch 564 to the CPU 550 (see FIG. 30).

The PLAY 20 LINES button 542 is a button to start a game with the number of activated pay lines as "20" as the player presses the PLAY 20 LINES button 542. A 20-LINES switch 565 is disposed in the PLAY 20 LINES button 542. As the PLAY 20 LINES button 542 is pressed, a switch signal is output from the 20-LINES switch 565 to the CPU 550 (see FIG. 30).

The BLACK PLAY 25 LINES button 543 is a button to start a game with the number of activated pay lines as the maximum number of lines, "25," as the player presses the BLACK PLAY 25 LINES button 543. A 25-LINES switch 566 is disposed in the BLACK PLAY 25 LINES button 543. As the BLACK PLAY 25 LINES button 543 is pressed, a switch signal is output from the 25-LINES switch 566 to the CPU 550 (see FIG. 30).

Therefore, there can be "one" to "25 (maximum number of lines)" in response to the combination of the pressed buttons as the number of activated pay lines that can be determined bet as the player presses the RED PLAY 1 LINE button 539, the PLAY 2 LINES button 540, the PLAY 5 LINES button 541, the PLAY 20 LINES button 542, the BLACK PLAY 25 LINES button 543.

If the RED PLAY 1 LINE button 539 is pressed, the first pay line L1 is activated. If the PLAY 2 LINES button 540 is pressed, the first pay line L1 and the second pay line L2 are activated. If the PLAY 5 LINES button 541 is pressed, the first pay line L1 to the fifth pay line L5 are activated. If the PLAY 20 LINES button 542 is pressed, the first pay line L1 to the twentieth pay line L20 are activated. If the BLACK PLAY 25 LINES button 543 is pressed, all pay lines of the first pay line L1 to the twenty-fifth pay line L25 are activated.

As the player presses the RED PLAY 1 LINE button 539, the PLAY 2 LINES button 540, the PLAY 5 LINES button 541, the PLAY 20 LINES button 542, or the BLACK PLAY 25 LINES button 543, the pressed button also serves as a start button to start variable display of the symbols on the variable display sections 521 to 525 of the lower liquid crystal display 504 to start a game according to the current bet count and the number of activated pay lines.

The GAMBLE RESERVE button 544 is a button pressed by the player when the player leaves the seat or is a button to make a transition to a double down game after a bonus game is over. The double down game is a game played by the player using the credit gained in the bonus game with the RED PLAY 1 LINE button 539 and the BLACK PLAY 25 LINES button 543, but will not be discussed in detail.

A GAMBLE RESERVE switch 548 is disposed in the GAMBLE RESERVE button 544. As the GAMBLE RESERVE button 544 is pressed, a switch signal is output from the GAMBLE RESERVE switch 548 to the CPU 550 (see FIG. 30).

The game rate change button 513 is a button to change the current game rate (the credit count per bet required for activating a pay line) each time the player presses the game rate change button 513. The game rate that can be set in the slot machine 501 according to the embodiment involves the three types of "one dollar (one credit)," "25 cents (0.25 credit)," and "five cents (0.05 credit);" as the player presses the game rate change button 513, the game rate is changed in the order of one dollar to 25 cents to five cents and to one dollar. The current game rate is displayed on the game rate display section 523 of the lower liquid crystal display 504. Therefore, the player can change the game rate to play a game without moving to any other slot machine in response to the current possession situation; the convenience of the player is improved. A game rate change switch 576 (described later) is disposed in the game rate change button 513. As the game rate change button 513 is pressed, a switch signal is output from the game rate change switch 576 to the CPU 550.

In the lower portion of the cabinet 502, a coin payout opening 515 is formed and a coin receiving tray 516 for receiving coins paid out from the coin payout opening 515 is provided. A coin detection section 573 (described later) including a hopper 571 capable of ejecting one coin at a time, a sensor is placed in the coin payout opening 515 (see FIG. 30) for detecting the number of coins paid out from the coin payout opening 515.

A receipt ejection opening 517 having a long-hole shape is provided on one side of the coin payout opening 515. The receipt ejection opening 517 is an ejection opening for printing out a receipt printing the current credit count owned by the player displayed on the credit count display section 512 when the player presses the COLLECT button 531 (described later); in the third embodiment, a receipt is held in a state in which the receipt is ejected 30 mm (the length can be changed as desired) from the receipt ejection opening 517. The player draws out the held receipt and carries the receipt to a prize exchange place, whereby it is made possible for the player to exchange the receipt for a prize responsive to the credit count described on the receipt. In the slot machine 501 according to the embodiment, when the player presses the COLLECT button 531, usually a receipt is used as payout, but as many coins as the number of coins corresponding to the credit count may be paid out by the hopper 571.

The hopper 571, the bill validation unit 526, and a power box unit 527 are provided in the center of the inside of the cabinet 502 when the front panel 520 provided on the front of the cabinet 502 is opened, as shown in FIG. 27. A main switch 528 for turning on and off the power required for operating the slot machine 501 and a reset switch 529 for initializing the state of the slot machine 501 are provided on the front of the power box unit 527.

Further, a receipt print unit 530 is provided below the bill validation unit 526, and as a receipt ejected from the receipt ejection opening 517, first the current credit count owned by the player is printed on roll paper (not shown) stored in the receipt print unit 530 on a printer (not shown). Then, the printed roll paper is transported from a transport opening 30A toward the receipt ejection opening 517 and is also cut to a predetermined length (for example, 100 mm) by a cutter (not shown) in the receipt print unit 530.

Subsequently, symbol rows variably displayed while being scrolled on the variable display sections 521 to 525 of the lower liquid crystal display 504 in a base game and a bonus game will be discussed with reference to FIG. 28. In FIG. 28, a symbol row shown in a first reel band 601 is a symbol row variably displayed in the variable display section 521, a symbol row shown in a second reel band 602 is a symbol row variably displayed in the variable display section 522, a symbol row shown in a third reel band 603 is a symbol row variably displayed in the variable display section 523, a symbol row shown in a fourth reel band 604 is a symbol row variably displayed in the variable display section 524, and a symbol row shown in a fifth reel band 605 is a symbol row variably displayed in the variable display section 525.

Figure 31:
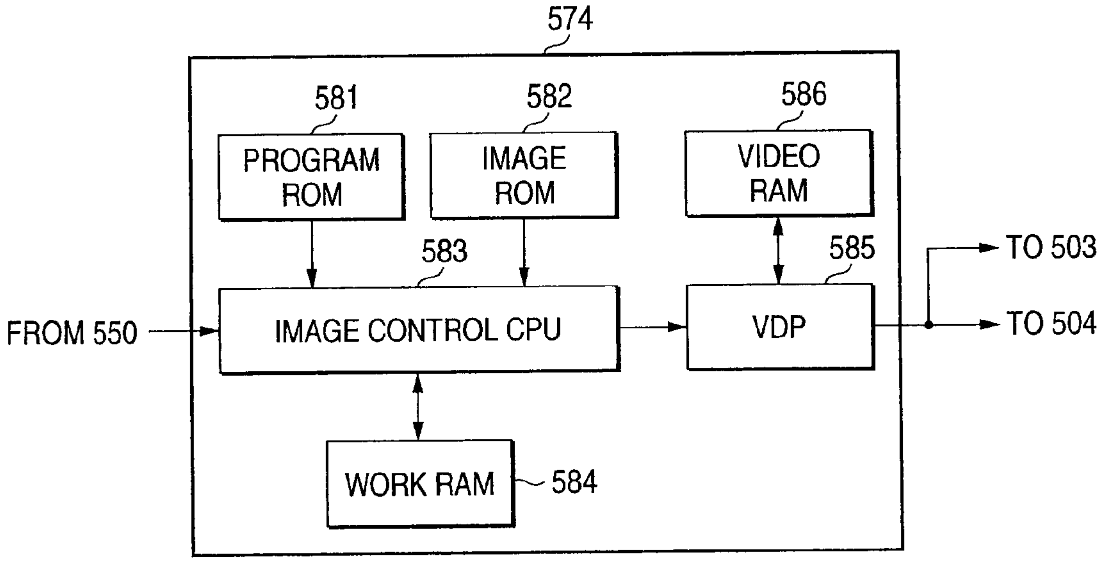
FIG. 31 is a block diagram to schematically show a liquid crystal drive circuit of a liquid crystal display.

The dot data (bitmap data) to form the images of the symbol rows shown in the first reel band 601 to the fifth reel band 605 is stored in image ROM 582 (see FIG. 31).

The symbol rows shown in the first reel band 601 to the fifth reel band 605 differ from each other in symbol arrangement, and each symbol row is provided by appropriately combining 13 types of symbols of LOBSTER, SHARK, FISH, PUNK, OCTOPUS, CRAB, WORM, A, K, Q, J, WILD, and SARDINE.

Figure 29:
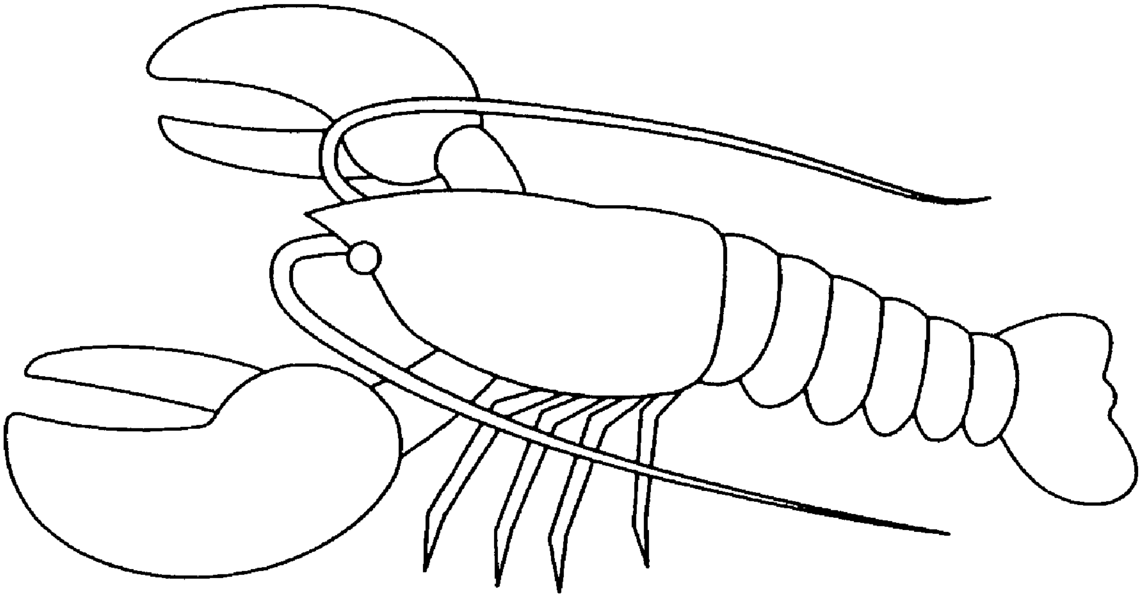
FIG. 29 is a schematic drawing to show a symbol of LOBSTER.

LOBSTER shows a symbol of lobster, as shown in FIG. 29. SHARK, FISH, PUNK, OCTOPUS, CRAB, WORM and SARDINE show images of shark, fish, a person holding a gutter, octopus, crab, worm and sardine although not shown. A, K, Q, J, and WILD show symbols of letters.

If a predetermined number of symbols of LOBSTER, SHARK, FISH, PUNK, OCTOPUS, CRAB, WORM, A, K, Q, J are stopped on the display from the left end along the activated line of the first pay line L1 to the twenty-fifth pay line L25, a predetermined credit count is added as the credit owned by the player (see FIG. 34).

SARDINE is a so-called scatter symbol; if two or more SARDINE symbols are stopped in total on the variable display sections 521 to 525 regardless of the activated pay line, a predetermined credit count is added as the credit owned by the player (see FIG. 34). Further, SARDINE is also a bonus game transition symbol to make a transition to a bonus game; if four or more SARDINE symbols are stopped in total on the variable display sections 521 to 525 regardless of the activated pay line, the player can make a transition to a bonus game.

WILD is a wild symbol used to replace any other symbol than SARDINE (scatter symbol).

If the player presses any of the RED PLAY 1 LINE button 539, the PLAY 2 LINES button 540, the PLAY 5 LINES button 541, the PLAY 20 LINES button 542, or the BLACK PLAY 25 LINES button 543 and a game is started, the symbol rows shown in the first reel band 601 to the fifth reel band 605 are scrolled from the top to the bottom in the variable display sections 521 to 525 and three symbols are stopped on each of the variable display sections after the expiration of a predetermined time.

Further, various winning combinations (see FIG. 34) are preset based on different types of combinations of the symbols and when the symbol combination corresponding to any winning combination stops on the activated pay line, the award is added to the credit in response to the winning combination. If four or more SARDINE symbols are stopped at the same time on the variable display sections regardless of the pay line, a transition is made to a bonus game.

Figure 30:
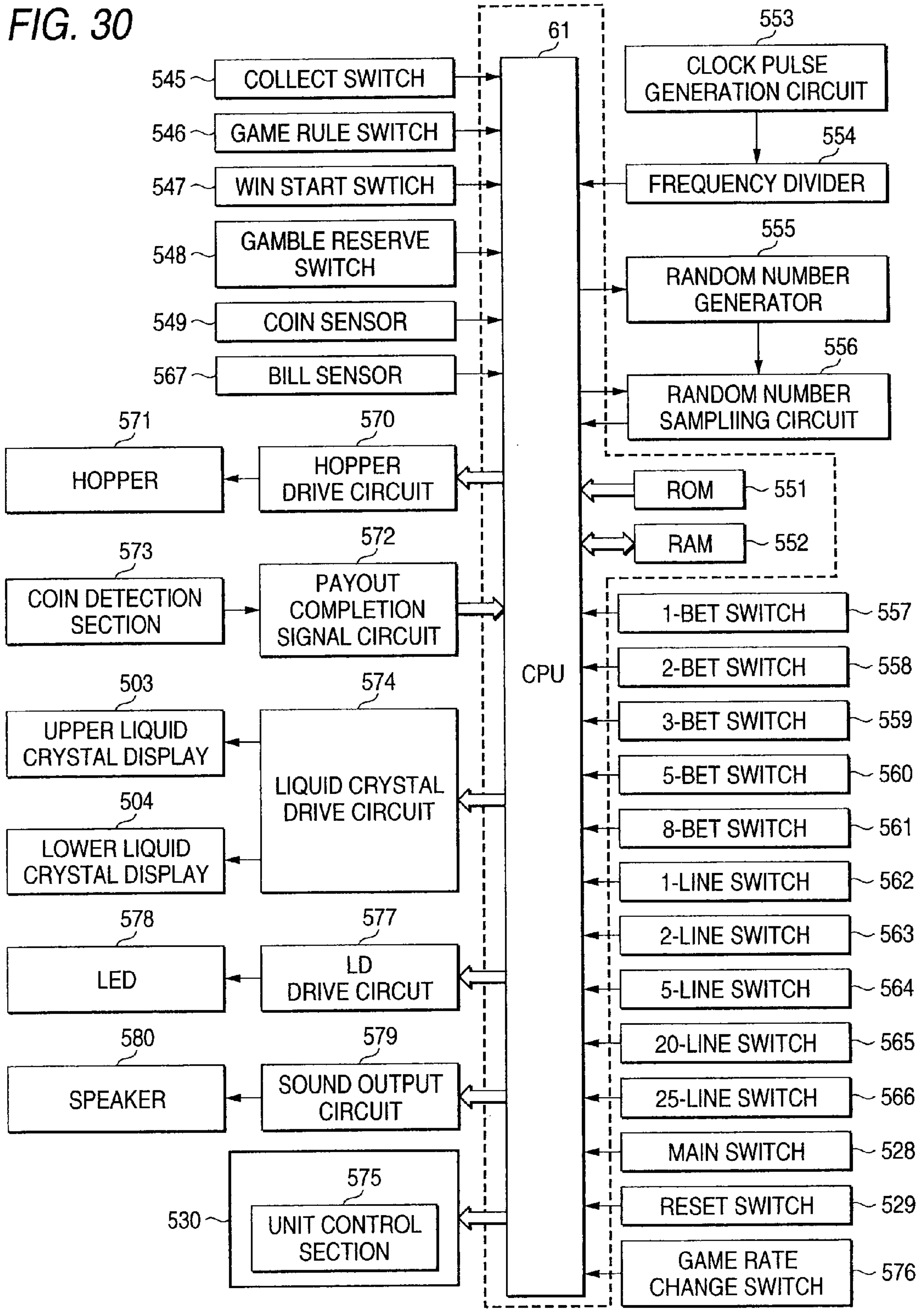
FIG. 30 is a block diagram to schematically show a control system of the slot machine according to the third embodiment.

Next, the configuration of a control system of the slot machine 501 will be discussed with reference to FIG. 30. FIG. 30 is a block diagram to schematically show the control system of the slot machine 501.

In FIG. 30, the control system of the slot machine 501 basically has the CPU 550 as the nucleus to which ROM 551 and RAM 552 are connected. The ROM 551 stores a main processing program described later, a base game processing program, a bonus game processing program, probability change mode processing program, a symbol lottery table 568 for determining the stopped symbols by lottery (see FIG. 33), winning combinations based on the stopped symbol combinations, an award table 569 for setting the credit to be paid out based on the winning combinations (see FIG. 34), and other various programs and data tables required for controlling the slot machine 501. The RAM 552 is memory for temporarily storing the current credit count owned by the player, the current game rate set in the slot machine 501 (the credit count per bet required for activating a pay line), and various pieces of data on which the CPU 550 performed operations.

A clock pulse generation circuit 553 for generating a reference clock pulse and a frequency divider 554 are connected to the CPU 550, and a random number generator 555 for generating a random number and a random number sampling circuit 556 are also connected to the CPU 550. The random number sampled through the random number sampling circuit 556 is used for various lotteries of winning combinations. Further, connected to the CPU 550 are the COLLECT switch 545 disposed in the COLLECT button 531, the GAME RULES switch 546 disposed in the GAME RULES button 532, the 1-BET switch 557 disposed in the BET 1 PER LINE button 533, the 2-BET switch 558 disposed in the BET 2 PER LINE button 534, the 3-BET switch 559 disposed in the BET 3 PER LINE button 535, the 5-BET switch 560 disposed in the BET 5 PER LINE button 536, the 8-BET switch 561 disposed in the BET 8 PER LINE button 537, the WIN START switch 547 disposed in the WIN START FEATURE button 538, the 1-LINE switch 562 disposed in the RED PLAY 1 LINE button 539, the 2-LINES switch 563 disposed in the PLAY 2 LINES button 540, the 5-LINES switch 564 disposed in the PLAY 5 LINES button 541, the 20-LINES switch 565 disposed in the PLAY 20 LINES button 542, the 25-LINES switch 566 disposed in the BLACK PLAY 25 LINES button 543, the GAMBLE RESERVE switch 548 disposed in the GAMBLE RESERVE button 544, the game rate change switch 576 disposed in the game rate change button 513, the main switch 528, and the reset switch 529. The CPU 550 controls the slot machine to execute the operation corresponding to the pressed button based on the switch signal output from each switch as each button is pressed.

Further, the coin sensor 549 placed in the coin insertion section 509 and the bill sensor 567 placed in the bill insertion section 510 are connected to the CPU 550. The coin sensor 549 detects a coin input from the coin insertion section 509, and the CPU 550 calculates the number of input coins based on the coin detection signal output from the coin sensor 549. The bill sensor 567 detects the denomination of each bill input from the bill insertion section 510. The CPU 550 calculates the credit count equivalent to the denomination of the input bill based on the bill detection signal output from the bill sensor 567.

The hopper 571 is connected to the CPU 550 through a hopper drive circuit 570. When the CPU 550 outputs a drive signal to the hopper drive circuit 570, the hopper 571 pays out a predetermined number of coins from the coin payout opening 515.

The coin detection section 573 is connected to the CPU 550 through a payout completion signal circuit 572. The coin detection section 573 is placed in the coin payout opening 515. If the coin detection section 573 detects that a predetermined number of coins have been paid out from the coin payout opening 515, the coin detection section 573 outputs a coin payout detection signal to the payout completion signal circuit 572, which then outputs a payout completion signal to the CPU 550. Further, the upper liquid crystal display 503 and the lower liquid crystal display 504 are connected to the CPU 550 through a liquid crystal drive circuit 574 and are controlled by the CPU 550.

The liquid crystal drive circuit 574 includes program ROM 581, image ROM 582, an image control CPU 583, work RAM 584, a VDP (Video Display Processor) 585, and video RAM 586, as shown in FIG. 31. The program ROM 581 stores an image control program and various selection tables involved in display on the upper liquid crystal display 503 and the lower liquid crystal display 504. The image ROM 582 stores dot data to form images of the symbol rows in the first reel band 601 to the fifth reel band 605 in FIG. 28 to be displayed on the lower liquid crystal display 504 (or the variable display sections 521 to 525), the game rate display section 511, the owned credit count display section 512, etc., for example.

The image control CPU 583 determines the images to be displayed on the upper liquid crystal display 503 and the lower liquid crystal display 504 from among the dot data previously stored in the image ROM 582 in accordance with the image control program previously stored in the program ROM 581 based on the parameters set in the CPU 550. Further, on the lower liquid crystal display 504, the image control CPU 583 displays the owned credit count stored in the RAM 552 on the owned credit count display section 512 and displays the game rate on the game rate display section 511. The work RAM 584 is provided as temporary storage means for the image control CPU 583 to execute the image control program. The VDP 585 forms an image responsive to the display contents determined by the image control CPU 583 and outputs the image to the upper liquid crystal display 503 and the lower liquid crystal display 504. Accordingly, for example, the symbol rows shown in the reel bands 601 to 605, etc., are scrolled on the lower liquid crystal display 504 (or the variable display sections 521 to 525). The video RAM 586 is provided as temporary storage means for the VDP 585 to form an image.

LEDs 578 are also connected to the CPU 550 through an LED drive circuit 577. A large number of LEDs 578 are disposed on the front of the slot machine 501 and are lighted under the control of the LED drive circuit 577 based on a drive signal from the CPU 550 in producing various effects.

A sound output circuit 579 and a speaker 580 are also connected to the CPU 550. The speaker 580 produces various effect sounds in producing various effects based on an output signal from the sound output circuit 579.

The receipt print unit 530 is also connected to the CPU 550. The receipt print unit 530 is a unit including a paper transport unit, a printer, and a cutter, and a unit control section 575 controls the receipt print unit 530 based on a command transmitted from the CPU 550. Specifically, as a signal of the COLLECT switch 545 is input, the CPU 550 transmits a command for starting to transport paper, and the unit control section 575 starts transporting roll paper by the paper transport unit. Further, the CPU 550 transmits data of the credit count to be printed on paper based on the credit count owned by the player stored in the RAM 552, and the unit control section 575 controls the printer to print the corresponding credit count on roll paper. When roll paper of a predetermined length has been transported, the unit control section 575 drives the cutter for cutting the roll paper and creates a receipt printing the game play result.

Figure 32:
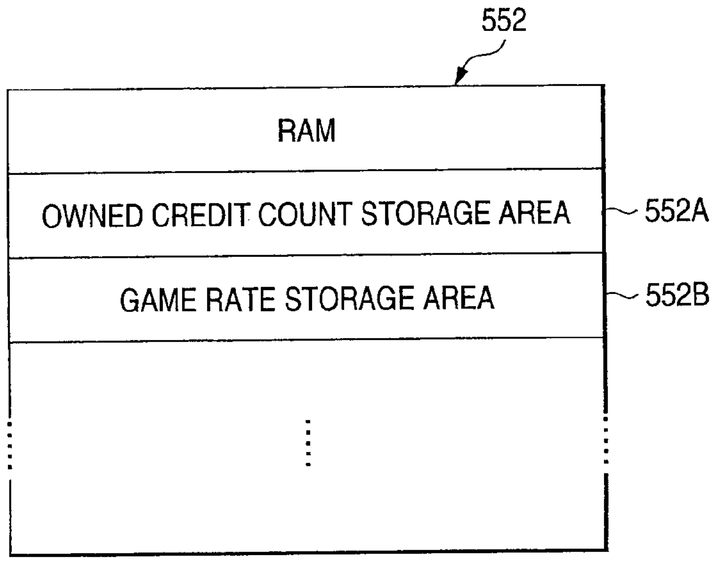
FIG. 32 is a drawing to show storage areas of RAM according to the third embodiment.

FIG. 32 is a schematic drawing to show various storage areas provided in the RAM 552. As shown in FIG. 32, the RAM 552 is provided with an owned credit count storage area 552A for storing the current credit count owned by the player. It is also provided with a game rate storage area 552B for storing the current game rate of the slot machine 501. The current credit count owned by the player stored in the owned credit count storage area 552A is displayed on the credit count display section 512 of the lower liquid crystal display 504 (see FIG. 24). The current game rate stored in the game rate storage area 552B is displayed on the game rate display section 511 (see FIG. 24).

Next, the symbol lottery table 568 stored in the ROM 551 and used in determining the symbols to be stopped on the stop display areas 711 to 713, 721 to 723, 731 to 733, 741 to 743, and 751 to 753 (see FIG. 25) for a player to play a base game and a bonus game using the five variable display sections 521 to 525 with the slot machine 501 will be discussed with reference to FIG. 33. FIG. 33 is a drawing to show the symbol lottery table for determining the symbols to be stopped on the variable display sections by lottery.

The symbol lottery table 568 is a lottery table for determining the symbols to be stopped on the first activated pay line L1 including the second stop display areas 712, 722, 732, 742, and 752 by lottery based on the random number sampled by the random number sampling circuit 556. As the symbols to be stopped in the second stop display areas 712, 722, 732, 742, and 752 are determined, the symbols to be stopped in the first and third stop display areas 211, 213, 221, 223, 231, 233, 241, 243, 251, and 253 above and below the second stop display areas are also determined from the symbol arrangements of the reel bands (see FIG. 28). Specifically, the symbol with the code number smaller than the code number determined based on the random number by one is stopped in the first stop display areas 711, 721, 731, 741, and 751, and the symbol with the code number larger than the code number determined based on the random number by one is stopped in the third stop display areas 713, 723, 733, 743, and 753.

In the slot machine 501 according to the third embodiment, the symbols to be stopped on the activated pay line L1 are determined for each of the variable display sections 521 to 525. In the symbol lottery table 568, code numbers 00 to 29 are assigned to the symbols displayed in the first reel band 601 to the fifth reel band 605 (see FIG. 28) in order from the top to the bottom, and the random numbers corresponding to the code numbers are set, as shown in FIG. 33.

The CPU 550 samples five random numbers through the random number sampling circuit 556 so as to correspond to the variable display sections 521 to 525 at the game start time, and determines the symbol to be stopped in the second stop display area 712, 722, 732, 742, 752 for each of the variable display sections 521 to 525.

Next, winning combinations and their awards for a player to play a base game and a bonus game using the five variable display sections 521 to 525 with the slot machine 501 will be discussed with reference to FIG. 34. FIG. 34 is a drawing to show the award table 569 listing the winning combinations and their awards for a player to play a game using the five variable display sections; it shows the award if the bet count per activated pay line is one. Therefore, if the bet count is one, the value of the award shown in FIG. 34 is added to the credit; if the bet count is two or more, the value of the award shown in FIG. 34 multiplied by the bet count is added to the credit.

For example, when the player plays a game with three bets on each activated pay line, if four continuous LOBSTER symbols are stopped on any activated pay line, the player can gain "2500×3=7500 credits" as the award.

When the player starts playing a game with MAX bet (setting the 25 pay lines all to activated pay lines and the bet count on each activated pay line as the maximum value eight), if five continuous LOBSTER symbols are stopped on the activated pay line on the variable display sections 521 to 525, the player wins JP (Jack pot) in place of the award "6000." If the player wins JP, the player can gain the credit count of the cumulative of several percent of the credit count betted from the preceding JP winning time to the current time.

The SARDINE symbol is also a trigger symbol for making a transition to a bonus game. If four or more SARDINE symbols occur (are stopped) at the same time on the variable display sections 521 to 525 regardless of the activated pay line, the player can gain the above-mentioned award and can also make a transition to a bonus game.

The bonus game is a game started as a specific condition is satisfied in a base game and generally is often a game advantageous to the player. In the embodiment, when a transition is made to a bonus game, 15 to 25 successive games are automatically played in response to the lottery result at the time of making a transition to the bonus game without betting credit.

Figure 35:
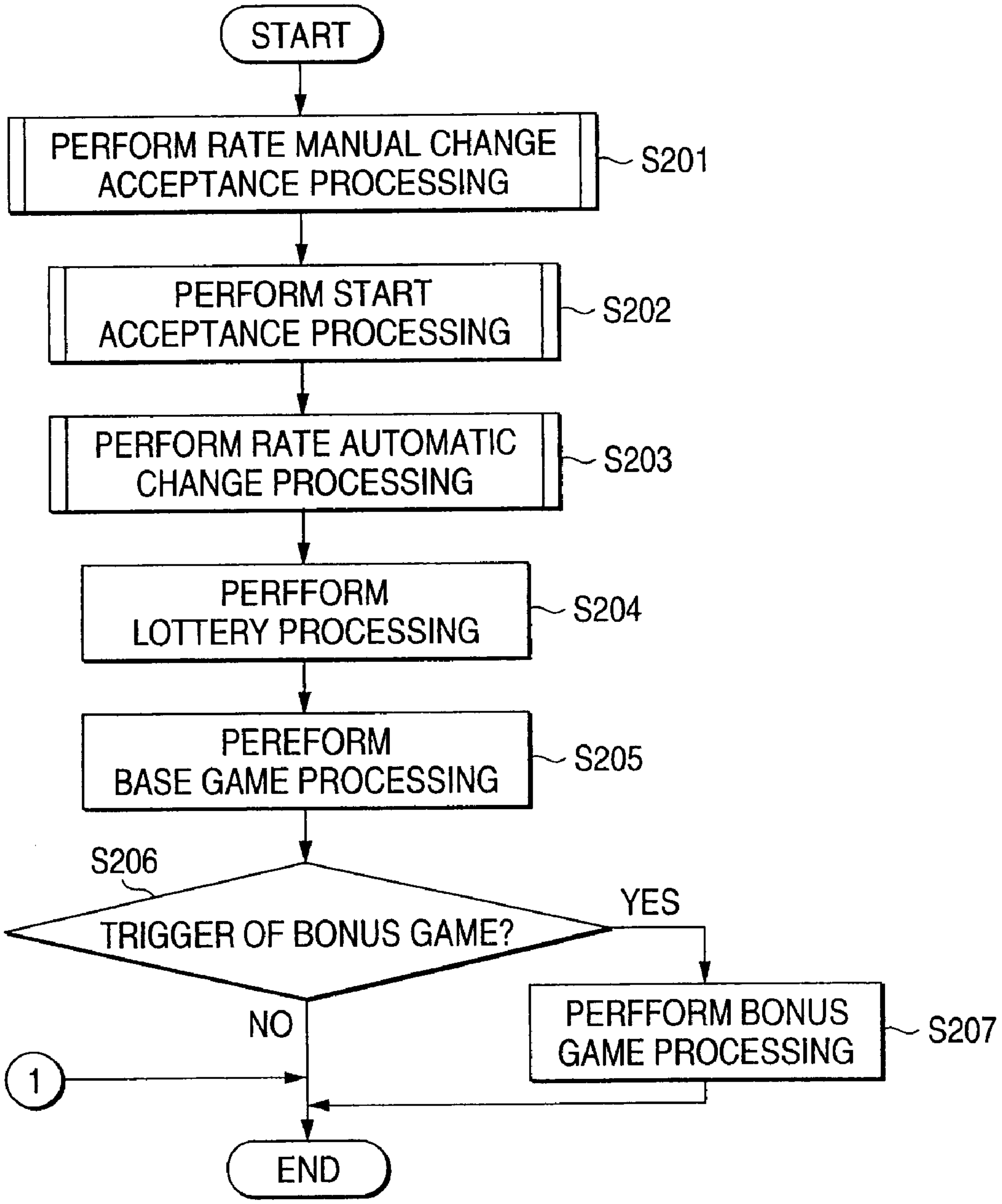
FIG. 35 is a flowchart of a main processing program of the slot machine according to the third embodiment.

Subsequently, the main processing program of the slot machine 501 according to the third embodiment having the configuration described above will be discussed with reference to FIG. 35. FIG. 35 is a flowchart of the main processing program in the slot machine according to the embodiment. Programs shown below in flowcharts of FIGS. 35 to 38 are stored in the ROM 551 and the RAM 552 included in the slot machine 501 and are executed by the CPU 550.

First, at step 201 (S201), rate manual change acceptance processing is performed. This processing is processing of changing the current game rate (the credit count per bet required for activating a pay line) based on operation of the game rate change button 513. In the slot machine 501 according to the embodiment, the current game rate is changed among the three types of "one dollar (one credit)," "25 cents (0.25 credit)," and "five cents (0.05 credit)."

Next, at S202, start acceptance processing is performed. This processing is processing of accepting a switch signal output from the 1-BET switch 557, the 2-BET switch 558, the 3-BET switch 559, the 5-BET switch 560, the 8-BET switch 561, the 1-LINE switch 562, the 2-LINES switch 563, the 5-LINES switch 564, the 20-LINES switch 565, or the 25-LINES switch 566 based on operation of the BET 1 PER LINE button 533, operation of the BET 2 PER LINE button 534, operation of the BET 3 PER LINE button 535, operation of the BET 5 PER LINE button 536, operation of the BET 8 PER LINE button 537, operation of the RED PLAY 1 LINE button 539, operation of the PLAY 2 LINES button 540, operation of the PLAY 5 LINES button 541, operation of the PLAY 20 LINES button 542, or operation of the BLACK PLAY 25 LINES button 543. When the switch signal output from the 1-LINE switch 562, the 2-LINES switch 563, the 5-LINES switch 564, the 20-LINES switch 565, or the 25-LINES switch 566 is accepted, a game is started.

Subsequently, at S203, rate automatic change processing is performed. This processing is processing of calculating the necessary credit count particularly when the player bets setting the maximum number of lines (in the embodiment, 25 lines) as the activated pay lines based on the switch signal accepted at S202 and lowering the current game rate if the current credit count is insufficient to the credit count required for activating all pay lines for allowing the player to play a game. Then, the process proceeds to S204.

At S204, various types of lottery processing are performed based on the switch signal output from the 1-LINE switch 562, the 2-LINES switch 563, the 5-LINES switch 564, the 20-LINES switch 565, or the 25-LINES switch 566. Specifically, the five random numbers provided in a one-to-one correspondence with the variable display sections 521 to 525 are sampled by the random number sampling circuit 556 and the code numbers are determined from the symbol lottery table 568 in FIG. 33. Further, the symbols to be stopped on each of the variable display sections 521 to 525 are determined for each of the variable display sections 521 to 525 based on the code numbers and the first reel band 601 to the fifth reel band 605.

At S205, base game processing (variable display and stop display of symbols, credit payout, etc.,) is performed. Then, the process proceeds to S6 and whether or not the player wins a bonus game is determined. Specifically, if four or more SARDINE symbols are stopped in total on the variable display sections 521 to 525 regardless of the activated pay line in the lottery processing (S204), the player wins a bonus game (YES at S206) and therefore the process proceeds to S207 and bonus game processing is performed and then the main processing program is terminated. On the other hand, if three or less SARDINE symbols are stopped in total on the variable display sections 521 to 525 regardless of the activated pay line in the lottery processing (S204), the player does not win a bonus game (NO at S206) and therefore the main processing program is terminated.

Figure 36:
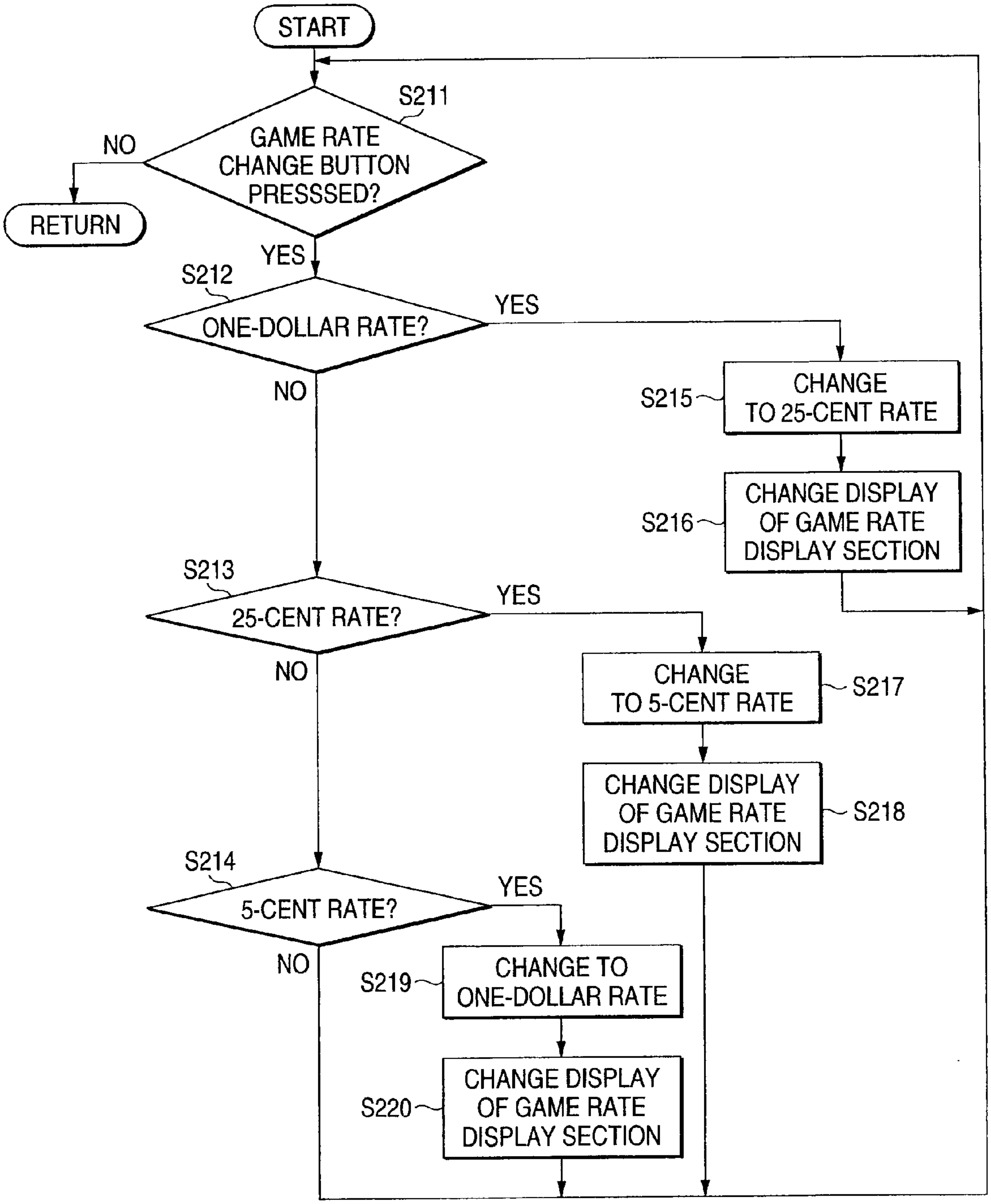
FIG. 36 is a flowchart of a rate manual change acceptance processing program of the slot machine according to the third embodiment.

Subsequently, the rate manual change acceptance processing program at S201 executed in the slot machine 501 will be discussed with reference to FIG. 36. FIG. 36 is a flowchart of the rate manual change acceptance processing program according to the embodiment. The rate manual change acceptance processing is processing of changing the current game rate (the credit count per bet required for activating a pay line) among the three types of "one dollar (one credit)," "25 cents (0.25 credit)," and "five cents (0.05 credit)" based on operation of the game rate change button 513.

First, at S211, the CPU 550 determines whether or not the game rate change button 513 is pressed based on the switch signal from the game rate change switch 576. If it is not determined that the game rate change button 513 is pressed (NO at S211), the rate manual change acceptance processing is exited and the subroutine is returned to the main processing.

On the other hand, if it is determined that the game rate change button 513 is pressed (YES at S211), the game rate stored in the game rate storage area 552B of the RAM 552 is read and the current game rate of the slot machine 501 is determined according to S212 to S214.

If the current game rate is determined the one-dollar rate (YES at S212), the current game rate is changed from "one dollar (one credit)" to "25 cents (0.25 credit)." Specifically, the game rate stored in the game rate storage area 552B of the RAM 552 is updated to "25 cents" (S215) and the display of the game rate display section 511 of the lower liquid crystal display 504 is changed to "25 cents" (S216).

If the current game rate is not determined the one-dollar rate (NO at S212) and is determined the 25-cent rate (YES at S213), the current game rate is changed from "25 cents (0.25 credit)" to "five cents (0.05 credit)." Specifically, the game rate stored in the game rate storage area 552B of the RAM 552 is updated to "five cents" (S217) and the display of the game rate display section 511 of the lower liquid crystal display 504 is changed to "five cents" (S218).

If the current game rate is not determined the 25-cent rate (NO at S213) and is determined the five-cent rate (YES at S214), the current game rate is changed from "five cents (0.05 credit)" to "one dollar (one credit)." Specifically, the game rate stored in the game rate storage area 552B of the RAM 552 is updated to "one dollar" (S219) and the display of the game rate display section 511 of the lower liquid crystal display 504 is changed to "one dollar" (S220).

If the current game rate is not determined the five-cent rate (NO at S214), the process returns to S11 and again the processing is continued.

Figure 37:
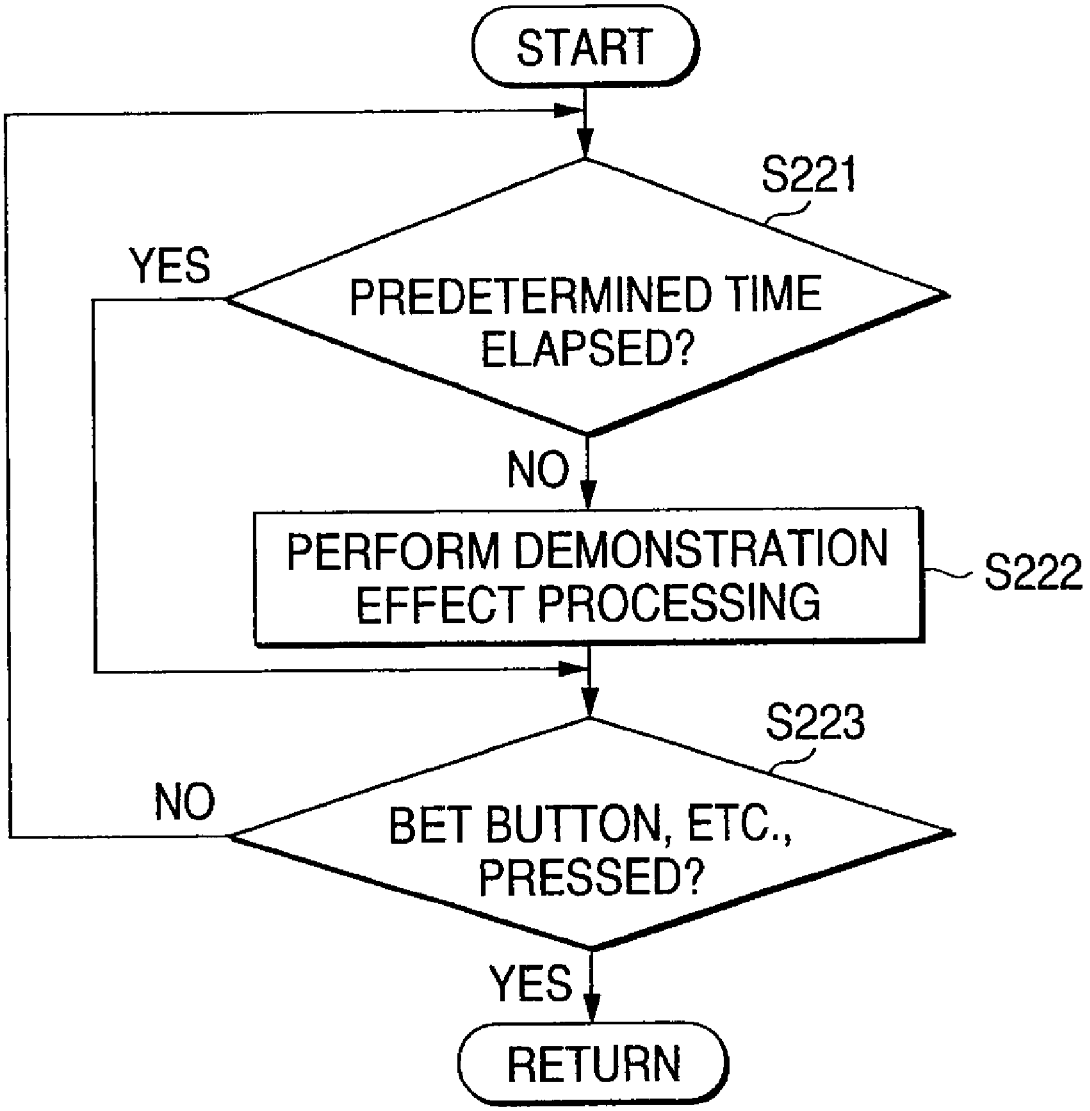
FIG. 37 is a flowchart of a start acceptance processing program of the slot machine according to the third embodiment.

Subsequently, the start acceptance processing executed at S2 in the slot machine 501 according to the third embodiment will be discussed with reference to FIG. 37. FIG. 37 is a flowchart of the start acceptance processing program according to the embodiment.

In the start acceptance processing, first at S221, the CPU 550 determines whether or not a predetermined time (for example, 15 seconds) has elapsed. If it is not determined that the predetermined time has elapsed (NO at S221), the process proceeds to S223. On the other hand, if it is determined that the predetermined time has elapsed (YES at S221), demonstration effects are produced on the upper liquid crystal display 503 and the lower liquid crystal display 504 at S22 and then the process proceeds to S223.

At S223, whether or not the player operates the RED PLAY 1 LINE button 539, the PLAY 2 LINES button 540, the PLAY 5 LINES button 541, the PLAY 20 LINES button 542, or the BLACK PLAY 25 LINES button 543 is determined. If the player operates the RED PLAY 1 LINE button 539, only one pay line is set as the activated line and the bet count corresponding to any of the BET buttons 533 to 537 previously pressed by the player is bet on the activated pay line. Likewise, if the player operates the PLAY 2 LINES button 540, two pay lines are set as the activated lines and the bet count corresponding to any of the BET buttons 533 to 537 previously pressed by the player is bet on each of the activated pay lines, and a game is started. If the player operates the PLAY 5 LINES button 541, five pay lines are set as the activated lines and the bet count corresponding to any of the BET buttons 533 to 537 previously pressed by the player is bet on each of the activated pay lines. If the player operates the PLAY 20 LINES button 542, 20 pay lines are set as the activated lines and the bet count corresponding to any of the BET buttons 533 to 537 previously pressed by the player is bet on each of the activated pay lines. If the player operates the BLACK PLAY 25 LINES button 543, all 25 pay lines are set as the activated lines and the bet count corresponding to any of the BET buttons 33 to 37 previously pressed by the player is bet on each of the activated pay lines.

If it is determined that the player does not operate any of the buttons such as the RED PLAY 1 LINE button 539, (NO at S223), the process returns to S21 and the above-described processing is repeated.

In the determination processing (S223), a determination may be made based on not only the operation signals, but also on any other input signal.

Figure 38:
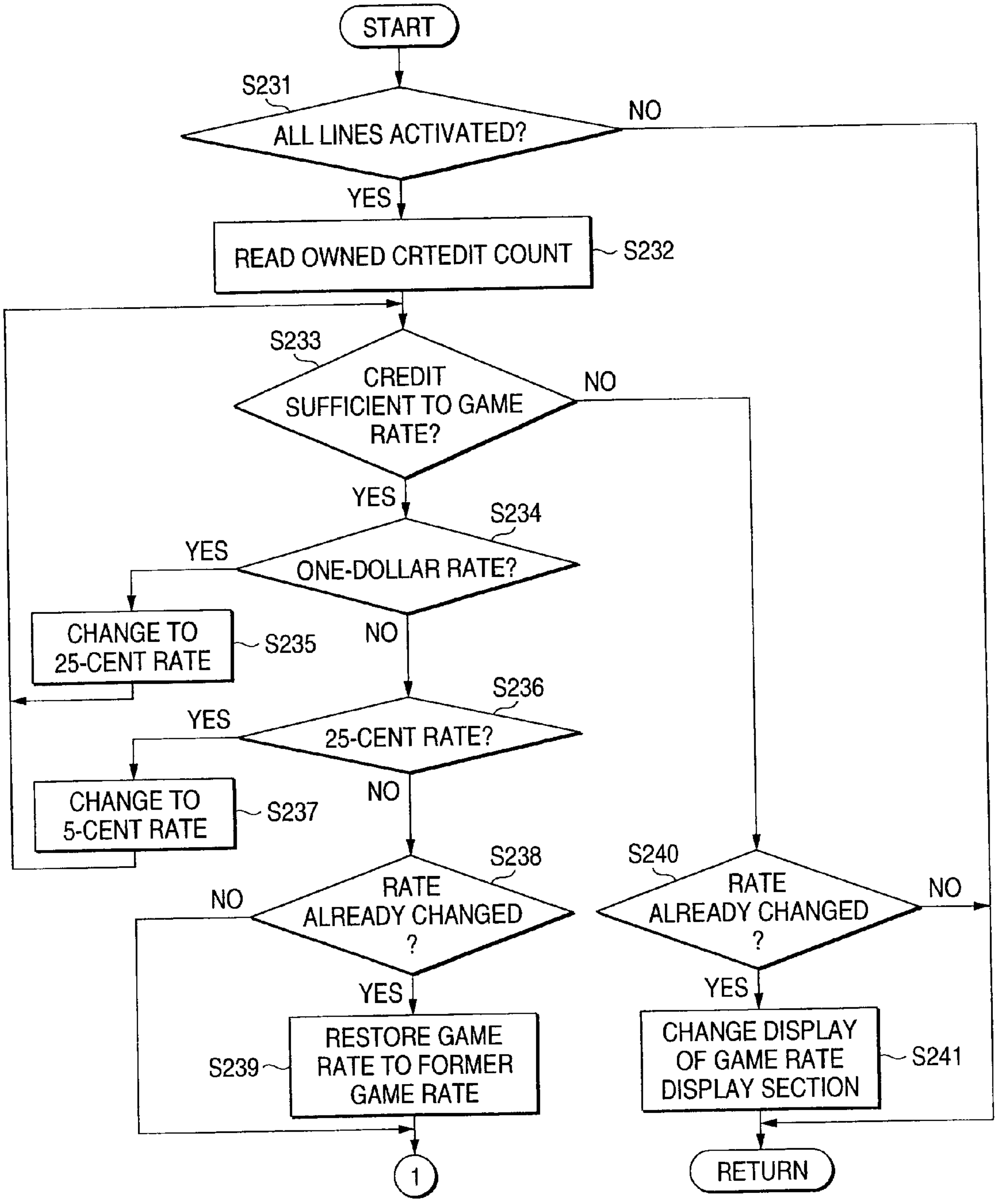
FIG. 38 is a flowchart of a rate automatic change processing program of the slot machine according to the third embodiment.

Next, the rate automatic change processing program at S203 executed in the slot machine 501 will be discussed with reference to FIG. 38. FIG. 38 is a flowchart of the rate automatic change processing program according to the third embodiment. The rate automatic change processing is processing of changing the current game rate (the credit count per bet required for activating a pay line) to the lower rate among the three types of "one dollar (one credit)," "25 cents (0.25 credit)," and "five cents (0.05 credit)" when the player plays a game betting on all pay lines set as the activated pay lines and the current credit count is insufficient to the credit count required for betting.

First, at S231, the CPU 550 determines whether or not the current game is started with the activated pay lines set to the first pay line to the twenty-fifth pay line (25 lines) based on the switch signal accepted in the start acceptance processing at S202. If it is not determined that the current game is started with the activated pay lines set to the 25 pay lines (NO at S231), the rate automatic change processing is exited and the subroutine is returned to the main processing.

On the other hand, if it is determined that the game is started with all lines set as activated lines (YES at S231), subsequently the current credit count owned by the player stored in the owned credit count storage area 552A of the RAM 552 is read (S232).

Further, the CPU 550 compares between the read owned credit count and the credit count required for activating all pay lines based on the bet count per pay line set with any of the BET buttons 533 to 537 for determining whether or not the owned credit is sufficient for the required credit count (S233). The credit count required for activating all pay lines varies depending on the current game rate of the slot machine 501; it is "bet count per pay line×25" credits if the current game rate is the "one-dollar rate;" "bet count per pay line×6.25" credits if the current game rate is the "25-cent rate;" or "bet count per pay line×1.25" credits if the current game rate is the "5-cent rate."

If it is determined that the owned credit is insufficient to the required credit count (YES at S233), subsequently whether or not the current game rate set in the slot machine 501 is "one dollar (one credit)" is determined (S234). The current game rate of the slot machine 501 is derived by reading the value stored in the game rate storage area 552B of the RAM 552.

If the current game rate is one dollar (YES at S234), the game rate is changed from "one dollar (one credit)" to "25 cents (0.25 credit)" at S235. Specifically, the game rate stored in the game rate storage area 552B of the RAM 552 is updated to "25 cents."

On the other hand, if the current game rate is not determined the one-dollar rate (NO at S234) and is determined the 25-cent rate (YES at S236), the current game rate is changed from "25 cents (0.25 credit)" to "five cents (0.05 credit)" at S237. Specifically, the game rate stored in the game rate storage area 552B of the RAM 552 is updated to "five cents."

Further, if the current game rate is not determined the 25-cent rate (NO at S236), namely, is determined the five-cent rate, subsequently whether or not the game rate is changed at S235 or S237 is determined (S238). If it is determined that the game rate is changed (YES at S238), the game rate is restored to the former game rate (S239). Then, the subroutine is returned to the main processing and the processing is terminated.

On the other hand, if it is not determined that the game rate is changed (NO at S238), the game rate is not changed and then the subroutine is returned to the main processing and the processing is terminated.

If the game rate is set to five cents, when it is determined that the owned credit is insufficient to the required credit count (YES at S233), the game rate cannot be lowered any more and therefore the player needs to input a new coin or lessen the bet count per pay line to start playing a game.

If it is determined that the owned credit is sufficient for the required credit count (NO at S233), subsequently whether or not the game rate is changed at S235 or S237 is determined (S240). If it is determined that the game rate is changed (YES at S240), the display of the game rate display section 511 of the lower liquid crystal display 504 is changed based on the new game rate (S241).

On the other hand, if it is not determined that the game rate is changed (NO at S240), the rate automatic change processing is exited and the subroutine is returned to the main processing.

As described above, in the slot machine 501 according to the third embodiment, if the player starts playing a game by setting all pay lines of the first to twenty-fifth pay lines as the activated pay lines (YES at S231) and it is determined that the current owned credit count is insufficient to the credit count required for activating all pay lines (YES at S233), the current game rate set in the slot machine 501 (the credit count per bet required for activating a pay line) is changed to a lower game rate (S235, S237). Thus, the player can continue playing a game according to all desired activated pay lines based on the automatically changed game rate without adding any coin or operating the game rate change button 513. Therefore, the player can play a game concentratedly and comfortably without concern for the remaining credit count owned by the player at present; the convenience of the player is improved.

Particularly, the convenience of the player who bets successively in a comparatively short time activating all pay lines every time is improved.

If it is determined that the current owned credit count is insufficient to the credit count required for activating all pay lines (YES at S233), first the current game rate is lowered to the game rate closest to the current game rate among the preset game rates (in the third embodiment, the three types of "one dollar," "25 cents," and "five cents") and again whether or not the current owned credit count is insufficient to the required credit count is checked (S233). Thus, if the stored credit count is insufficient to the required credit count, it is made possible for the player to play a game under the game play condition closest to the condition desired by the player. Therefore, there is no fear that the player may be given an unforeseen disadvantage.

Further, the current game rate set in the slot machine 501 is displayed on the game rate display section 511 of the lower liquid crystal display 504, so that if the game rate changes, the player can be informed that the game rate changes. Therefore, if the game rate is changed against player's will, there is no fear that the player may be given an unforeseen disadvantage.

It is to be understood that the present invention is not limited to the third embodiment and various improvements and modifications may be made without departing from the spirit and the scope of the present invention.

For example, in the third embodiment, when the player activate all pay lines, whether or not the owned credit count is insufficient to the credit count required for the MAX bet is determined and if the owned credit count is insufficient to the required credit count, the current game rate is changed to the lower rate. However, the lines set as the activated lines by the player are not limited to all pay lines.

For example, if the player wants to always set only five lines as the activated lines this day to play a game, the player presses the PLAY 5 LINES button 541 every time in the start acceptance processing (S202), whereby the number of lines set as the activated pay lines becomes five every time and a game is started. At the time, the credit count required for betting may be calculated based on the setup number of the activated pay lines and may be compared with the current owned credit count and if the owned credit count is insufficient to the required credit count, the current game rate may be changed to the lower rate.

Accordingly, the player who bets successively in a comparatively short time with the same number of the activated pay lines every time can also continue playing a game according to the desired number of the activated pay lines based on the automatically changed game rate without adding any coin or operating the game rate change button 513. Therefore, the player can play a game concentratedly and comfortably without concern for the remaining credit count owned by the player at present; the convenience of the player is improved.

Further, the necessary credit count may be calculated for any desired number of activated pay lines set by the player in addition to the above-mentioned number of the activated pay lines and may be compared with the current owned credit count and if the owned credit count is insufficient to the necessary credit count, the current game rate may be changed to the lower rate.

In the third embodiment, to stop the symbols on the variable display sections 521 to 525, the five random numbers provided in a one-to-one correspondence with the variable display sections 521 to 525 are sampled by the random number sampling circuit 556 and the symbols to be stopped are determined based on the sampled random numbers, the code numbers determined according to the symbol lottery table 568, and the first reel band 601 to the fifth reel band 605 and further the winning combination and its award are determined based on the stopped symbols and the award table 569. However, first a winning combination may be determined by lottery based on the random number and the symbols to be stopped on the variable display sections 521 to 525 may be determined based on the lottery result of the winning combination.

In the slot machine according to the embodiment, if the player presses the COLLECT button 531, a receipt describing the credit count is ejected as payout, but as many coins as the number of coins corresponding to the credit count may be paid out using the hopper 571. At the time, the part corresponding to the credit less than the denomination of the used coin is discarded (for example, if 1.25 credit is to be paid out from a slot machine that can accept only one-dollar coins, only a one-dollar coin corresponding to one credit is paid out).

As describe above with reference to the embodiments, there is provided a gaming machine (for example, slot machine 1) including a game medium storing unit (for example, RAM 63) for storing a game medium; abetting unit (for example, 1-BET button 18, REPEAT BET button 19, 10-BET button 20, MAXBET button 21) for betting game medium stored in the game medium storing unit based on a predetermined bet count; a game rate storing unit (for example, RAM 63) for storing the unit game value (game rate) (for example, one credit, 0.5 credit, 0.05 credit) of the value of a game medium per bet, bet through the betting unit; and a payout unit (for example, receipt print unit 40) for paying out game medium based on the bet count bet through the betting unit, the unit game value stored in the game rate storing unit, and the game result, characterized by having: a determination unit (for example, CPU 61, S33) for determining whether or not the value of the game media stored in the game medium storing unit is insufficient to the value of the game media required for the predetermined bet count; and a game rate changing unit (for example, CPU 61, S35, S37) for changing the unit game value stored in the game rate storing unit from a first game rate (for example, one credit) stored at present to a second game rate (for example, 0.25 credit, 0.05 credit) lower than the first game rate if the determination unit determines that the value of the game media stored in the game medium storing unit is insufficient to the value of the game media required for the predetermined bet count.

According to the configuration above, when it is determined that the value of the game media stored in the game medium storing unit is insufficient to the value of the game media required for the predetermined bet count bet through the betting unit, the unit game value of the value of the game medium per bet is changed from the first game rate to the second game rate lower than the first game rate, so that the player can continue playing a game according to any desired bet count based on the automatically changed unit game value without performing any other special operation. Therefore, the player can play a game concentratedly and comfortably without concern for the remaining game media stored at present and the convenience of the player for playing a game is improved.

The gaming machine may be configured that the predetermined bet count is the maximum bet count that can be bet in one game through the betting unit (for example, 1-BET button 18, REPEAT BET button 19, 10-BET button 20, MAXBET button 21).

According to the configuration above, when it is determined that the value of the game media stored in the game medium storing unit is insufficient to the value of the game media required for the maximum bet count bet through the betting unit, the unit game value of the value of the game medium per bet is changed from the first game rate to the second game rate lower than the first game rate, so that the player can continue playing a game according to the maximum bet count based on the automatically changed unit game value without performing any other special operation. Therefore, particularly, the player who bets successively in a comparatively short time according to the maximum bet count every time can play a game concentratedly and comfortably without concern for the value of the remaining game media stored at present and the convenience of the player for playing a game is improved.

The gaming machine may be configured that the predetermined bet count is the bet count bet through the betting unit (for example, 1-BET button 18, REPEAT BET button 19, 10-BET button 20, MAXBET button 21) in the preceding game.

According to the configuration above, when it is determined that the value of the game media stored in the game medium storing unit is insufficient to the value of the game media required for the same bet count as the preceding bet count bet through the betting unit, the unit game value of the value of the game medium per bet is changed from the first game rate to the second game rate lower than the first game rate, so that the player can continue playing a game according to the same bet count as the preceding bet count based on the automatically changed unit game value without performing any other special operation. Therefore, particularly, the player who bets successively in a comparatively short time according to the same bet count as the preceding bet count every time can play a game concentratedly and comfortably without concern for the value of the remaining game media stored at present and the convenience of the player for playing a game is improved.

The gaming machine may be configured that the second game rate (for example, 0.25 credit, 0.05 credit) involves different types of game medium values and if the determination unit (for example, CPU 61, S33) determines that the value of the game media stored in the game medium storing unit is insufficient to the value of the game media required for the predetermined bet count, the game rate changing unit (for example, CPU 61, S35, S37) changes the first game rate (for example, one credit) stored in the game rate storing unit (for example, RAM 63) to the highest second game rate (for example, 0.25 credit) of the second game medium values in the range in which the value of the game media stored in the game medium storing unit meets the value of the game media required for the predetermined bet count.

According to the configuration above, when it is determined that the value of the game media stored in the game medium storing unit is insufficient to the value of the game media required for the predetermined bet count bet through the betting unit, the unit game value is changed from the first game rate to the highest second game rate in the range in which the value of the game media stored in the game medium storing unit meets the value of the game media required, so that if the stored game value is insufficient to the required game value, it is made possible for the player to play a game under the game play condition closest to the condition desired by the player. Therefore, there is no fear that the player may be given an unforeseen disadvantage.

The gaming machine may further include a display (for example, game rate display section 23) for displaying the unit game value (for example, one credit, 0.5 credit, 0.05 credit) stored in the game rate storing unit (for example, RAM 63).

According the configuration above, the current unit game value stored in the game rate storing unit is displayed, so that if the unit game value changes, the player can be informed that the unit game value changes. Therefore, if the unit game value is changed against player's will, there is no fear that the player may be given an unforeseen disadvantage.

As describe above with reference to the embodiments, there is provided a gaming machine (for example, slot machine 201) including a betting unit (for example, 1-BET button 218, REPEAT BET button 219, 10-BET button 220, MAXBET button 221) for betting a game medium; a game medium storing unit (for example, RAM 263) for previously storing game media bet through the betting unit; and a minimum game rate storing unit (for example, RAM 263) for storing the minimum game value (for example, one credit, 0.3 credit, 0.25 credit, 0.05 credit) of the value of a game medium of the minimum unit that can be bet through the betting unit, characterized by having a determination unit (for example, CPU 261, S113) for determining whether or not the value of the game media stored in the game medium storing unit is insufficient to the minimum game value stored in the minimum game rate storing unit; and a minimum game rate changing unit (for example, CPU 261, S115, S117) for changing the minimum game value stored in the minimum game rate storing unit from a first minimum game value (for example, one dollar) stored at present to a second minimum game value (for example, 0.3 credit, 0.25 credit, 0.05 credit) lower than the first minimum game value if the determination unit determines that the value of the game media stored in the game medium storing unit is insufficient to the minimum game value stored in the minimum game rate storing unit.

In the gaming machine, there may be configured that the player bets based on the first minimum game value in the normal mode and when the first minimum game value is changed to the second minimum game value by the minimum game rate changing unit, when the value of the game media stored in the game medium storing unit meets the first minimum game value as the result of the later game play, again the game value may be restored to the first minimum game value.

In the gaming machine configured as above, when it is determined that the value of the game media stored in the game medium storing unit is insufficient to the minimum game value of a game medium of the minimum unit that can be bet, the minimum game value is changed from the first minimum game value to the second minimum game value lower than the first minimum game value, so that the player can play a game using the fractional credit based on the automatically changed minimum game value without performing any other special operation if a fraction occurs in the stored game media. Therefore, the player can spend all remaining game media to play a game and the convenience of the player is improved. On the other hand, for the game arcade, it is not feared that the profit may be remarkably decreased as the player changes the minimum game value, and the profit of the game arcade is secured.

The gaming machine may be configured that the second minimum game value (for example, 0.25 credit, 0.05 credit) involves different types of game medium values and if the determination unit (for example, CPU 261, S113) determines that the value of the game media stored in the game medium storing unit is insufficient to the minimum game value stored in the minimum game rate storing unit, the minimum game rate changing unit (for example, CPU 261, S115, S117) changes the first minimum game value (for example, one dollar) stored in the minimum game rate storing unit (for example, RAM 263) to the highest second minimum game value (for example, 0.25 credit) of the second minimum game values in the range in which the value of the game media stored in the game medium storing unit meets the minimum game value stored in the minimum game rate storing unit.

In the gaming machine configured as above, when it is determined that the value of the game media stored in the game medium storing unit is insufficient to the minimum game value of a game medium of the minimum unit that can be bet, the minimum game value is changed from the first minimum game value to the highest second minimum game value in the range in which the stored credit meets the minimum game value stored in the minimum game rate storing unit. Thus, if the stored game medium value is insufficient to the game value, it is made possible for the player to play a game without waste under the game play condition closest to the condition desired by the player.

The gaming machine may be configured that the second minimum game value (for example, 0.3 credit) is the value of game media stored in the game medium storing unit (for example, RAM 263) at the point in time at which the determination unit (for example, CPU 261, S113) determines that the value of the game media stored in the game medium storing unit is insufficient to the minimum game value stored in the minimum game rate storing unit.

In the gaming machine configured as above, when it is determined that the value of the game media stored in the game medium storing unit is insufficient to the minimum game value of a game medium of the minimum unit that can be bet, the value of stored game media at the point in time at which it is determined that the value of the game media stored in the game medium storing unit is insufficient to the minimum game value is adopted. Thus, the player can completely consume game media to bet regardless of what value the value of the stored game media is. Therefore, the convenience of the player is more improved.

The gaming machine may further include a display (for example, game rate display section 223) for displaying the minimum game value (for example, one credit, 0.3 credit, 0.25 credit, 0.05 credit) stored in the minimum game rate storing unit (for example, RAM 263).

In the gaming machine configured as above, the current minimum game value stored in the game rate storing unit is displayed, so that if the minimum game value changes, the player can be informed that the minimum game value changes. Therefore, if the minimum game value is changed against player's will, there is no fear that the player may be given an unforeseen disadvantage.

As describe above with reference to the embodiments, there is provided a gaming machine (for example, slot machine 501) including a game medium storing unit (for example, RAM 552) for storing a game medium; variable display (for example, lower liquid crystal display 504) for variably displaying a plurality of symbols on a plurality of pay lines; a stop controller (for example, CPU 550) for controlling the symbols to be stopped on the pay line; a betting unit (for example, RED PLAY 1 LINE button 539, PLAY 2 LINES button 540, PLAY 5 LINES button 541, PLAY 20 LINES button 542, BLACK PLAY 25 LINES button 543) for setting a predetermined number of pay lines of the plurality of pay lines as activated lines based on the game media stored in the game medium storing unit; a game rate storing unit (for example, RAM 552) for storing the unit line value (for example, one dollar, 25 cents, or five cents) of the value of a game medium required per pay line to set as an activated line through the betting unit; and a payout unit (for example, receipt print unit 530) for paying out a game medium to a player if the symbols stopped on the variable display by the stop controller become a predetermined combination along the activated pay line, characterized by having a determination unit (for example, CPU 550, S233) for determining whether or not the number of the game media stored in the game medium storing unit is insufficient to the value of the game media required for setting the predetermined number of pay lines as the activated lines; and game rate changing unit (for example, CPU 550, S235, S237) for changing the unit line value stored in the game rate storing unit from a first unit line value (for example, one credit) stored at present to a second unit line value (for example, 0.25 credit or 0.05 credit) lower than the first unit value if the determination unit determines that the number of the game media stored in the game medium storing unit is insufficient to the required game medium value.

In the gaming machine, there may be configured that the player bets based on the first unit line value in the normal mode and if the first unit line value is changed to the second unit line value by the game rate changing unit, when the value of the game media stored in the game medium storing unit meets the first unit line value as the result of the later game play, again the game value may be restored to the first unit line value.

According to the configuration above, when it is determined that the value of the game media stored in the game medium storing unit is insufficient to the value of the game media required for setting a predetermined number of pay lines as activated lines through the betting unit, the unit line value of the value of the game medium required per pay line is changed from the first unit line value to the second unit line value lower than the first unit line value, so that the player can continue playing a game according to any desired number of activated pay lines based on the automatically changed unit line value without performing any other special operation. Therefore, the player can play a game concentratedly and comfortably without concern for the remaining game media stored at present and the convenience of the player for playing a game is improved.

The gaming machine may be configured that the predetermined number of pay lines are the maximum number of pay lines that can be set as activated lines in one game through the betting unit (for example, RED PLAY 1 LINE button 539, PLAY 2 LINES button 540, PLAY 5 LINES button 541, PLAY 20 LINES button 542, BLACK PLAY 25 LINES button 543).

According to the configuration above, when it is determined that the value of the game media stored in the game medium storing unit is insufficient to the value of the game media required for activating the maximum number of pay lines that can be set as the activated lines in one game through the betting unit, the unit line value of the value of the game medium per pay line is changed from the first unit line value to the second unit line value lower than the first unit line value, so that the player can continue playing a game according to the maximum number of activated pay lines based on the automatically changed unit line value without performing any other special operation. Therefore, particularly, the player who bets successively in a comparatively short time according to the maximum number of activated pay lines every time can play a game concentratedly and comfortably without concern for the value of the remaining game media stored at present and the convenience of the player for playing a game is improved.

The gaming machine may be configured that the predetermined number of pay lines are the pay lines set as activated lines through the betting unit (for example, RED PLAY 1 LINE button 539, PLAY 2 LINES button 540, PLAY 5 LINES button 541, PLAY 20 LINES button 542, BLACK PLAY 25 LINES button 543) in the preceding game.

According to the configuration above, when it is determined that the value of the game media stored in the game medium storing unit is insufficient to the value of the game media required for activating the same number of pay lines as set as the activated lines in the preceding game through the betting unit, the unit line value of the value of the game medium required per pay line is changed from the first unit line value to the second unit line value lower than the first unit line value, so that the player can continue playing a game according to the same number of activated pay lines as in the preceding game based on the automatically changed unit line value without performing any other special operation. Therefore, particularly, the player who bets successively in a comparatively short time according to the same number of activated pay lines every time can play a game concentratedly and comfortably without concern for the value of the remaining game media stored at present and the convenience of the player for playing a game is improved.

The gaming machine may be configured that the second unit line value (for example, 0.25 credit, 0.05 credit) involves different types of game medium values and if the determination unit (for example, CPU 550, S233) determines that the number of the game media stored in the game medium storing unit is insufficient to the required game medium value, the game rate changing unit (for example, CPU 550, S235, S237) changes the first unit line value (for example, one credit) stored in the game rate storing unit (for example, RAM 552) to the highest second unit line value (for example, 0.25 credit)

of the second unit line values in the range in which the value of the game media stored in the game medium storing unit meets the value of the game media required for setting the predetermined number of pay lines as the activated lines.

According to the configuration above, when it is determined that the value of the game media stored in the game medium storing unit is insufficient to the value of the game media required for activating the predetermined number of pay lines through the betting unit, the unit line value is changed from the first unit line value to the highest second unit line value in the range in which the value of the game media stored in the game medium storing unit meets the required game medium value, so that if the stored game value is insufficient to the required game value, it is made possible for the player to play a game under the game play condition closest to the condition desired by the player. Therefore, there is no fear that the player may be given an unforeseen disadvantage.

The gaming machine may further include a display (for example, game rate display section 511) for displaying the unit line value (for example, one credit, 0.25 credit, 0.05 credit) stored in the game rate storing unit (for example, RAM 552).

According to the configuration above, the current unit line value stored in the game rate storing unit is displayed, so that if the unit line value changes, the player can be informed that the unit line value changes. Therefore, if the unit line value is changed against player's will, there is no fear that the player may be given an unforeseen disadvantage.

In the above description, there are described in detail of three independent embodiments of the first, the second and the third embodiments to which the present invention is applied. However, one skilled in the art may arbitrary combine the subject matters included in the three embodiments to thereby provide a roulette apparatus or a roulette gaming machine having the advantages described above with respect to the three embodiments.

In the above description, the three embodiments are described of slot machines that provides a slot game to the player. However, the present invention may be applied to any types of gaming machines that provide games other than the slot game. One example of such gaming machines to which the present invention may be applied is a gaming machine that provides a game of video poker to the player.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A gaming machine comprising:

a game processing unit that performs game processing to provide a game to a player;

a game medium storing unit that stores a game medium;

a betting unit that allows the player to bet the game medium stored in the game medium storing unit by a predetermined bet count in the game provided by the game processing unit;

a game rate storing unit that stores a game rate that declares a counter value of the game medium per one bet that is bet by the player through the betting unit;

a payout unit that pays out a predetermined amount of the game medium in accordance with the bet count, the game rate, and a result of the game;

a determination unit that determines whether or not a value of the game medium stored in the game medium storing unit is insufficient compared to a value of the game medium required for the bet, which is calculated by multiplying the bet count by the game rate;

a game rate changing unit that changed the game rate stored in the game rate storing unit from a first game rate that is presently stored into a second game rate lower than the first game rate when the determination unit determines that the value of the game medium stored in the game medium storing unit is less than the value of the game medium required for the bet such that the player plays a subsequent game at the second game rate;

and a game rate change switch that allows the player to change the game rate stored in the game rate storing unit.

2. The gaming machine according to claim 1, wherein the game rate stored in the game rate storing unit is configured not to be changed by the player.

3. The gaming machine according to claim 1, wherein the predetermined bet count is a maximum bet count that is configured to be bet in one game through the betting unit.

4. The gaming machine according to claim 1, wherein the predetermined bet count is a bet count that is bet by the player through the betting unit in the preceding game.

5. The gaming machine according to claim 1, wherein, the second game rate includes a plurality of game rates different with each other, and when the determination unit determines that the value of the game medium stored in the game medium storing unit is insufficient to the value of the game medium required for the bet, the game rate changing unit changes the game rate stored in the game rate storing unit from the first game rate into the highest one of the second game rates in which the value of the game medium stored in the game medium storing unit satisfies the value of the game medium required for the bet.

6. The gaming machine according to claim 1, further comprising: a display that displays the game rate stored in the game rate storing unit.

7. The gaming machine according to claim 1, wherein the game processing unit includes:

a variable display that variably displays a plurality of symbols on a plurality of pay lines; and a controller that controls the symbols to be stopped on the pay lines.

8. The gaming machine according to claim 7, wherein the betting unit allows the player to bet the game medium stored in the game medium storing unit by a predetermined bet count in the game to activate a predetermined number of the pay lines as activated pay lines.

9. The gaming machine according to claim 8, wherein the payout unit pays out a predetermined amount of the game medium in accordance with the game rate and a combination of the symbols stopped on the variable display on the activated pay lines.

10. A gaming machine allowing a player to play a game at a plurality of game rates comprising:

a storing unit that stores a remaining credit count owned by the player at present, plural kinds of game rates necessary for performing one bet in the game, and a program for executing a game;

a game rate change switch that allows the player to change the game rate stored in a game rate storing unit;

a game rate display unit which displays a game rate which is set within the plural kinds of game rates; and a CPU which executes a game at the set game rate in accordance with the program stored in the storing unit, wherein the CPU further executes the following steps of:

determining whether or not the set game rate is changed to a lower rate based on the set game rate and the remaining credit count before the game is started; and allowing the game rate display unit, when the determination that the game rate is changed to the lower rate is made, to display the changed lower game rate.

* * * * *